(12) United States Patent
Zhang et al.

(10) Patent No.: US 11,803,451 B2
(45) Date of Patent: Oct. 31, 2023

(54) APPLICATION EXCEPTION RECOVERY

(71) Applicant: Huawei Technologies Co., Ltd., Shenzhen (CN)

(72) Inventors: Liang Zhang, Shanghai (CN); Zhijun Lu, Shenzhen (CN); Yu Li, Beijing (CN); Zhi Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 145 days.

(21) Appl. No.: 17/424,045

(22) PCT Filed: Dec. 11, 2019

(86) PCT No.: PCT/CN2019/124425
§ 371 (c)(1),
(2) Date: Jul. 19, 2021

(87) PCT Pub. No.: WO2020/147462
PCT Pub. Date: Jul. 23, 2020

(65) Prior Publication Data
US 2022/0075696 A1     Mar. 10, 2022

(30) Foreign Application Priority Data

Jan. 20, 2019   (CN) .......................... 201910050667.5

(51) Int. Cl.
*G06F 11/00* (2006.01)
*G06F 11/14* (2006.01)
(Continued)

(52) U.S. Cl.
CPC ...... *G06F 11/1471* (2013.01); *G06F 9/45504* (2013.01); *G06F 11/0751* (2013.01); *G06F 11/1482* (2013.01); *G06F 21/52* (2013.01)

(58) Field of Classification Search
CPC ............. G06F 11/0751; G06F 11/1471; G06F 11/1482
See application file for complete search history.

(56) References Cited

U.S. PATENT DOCUMENTS 6,701,454 B1   3/2004   Fischer et al.
6,816,984 B1   11/2004  Snyder et al.
(Continued)

FOREIGN PATENT DOCUMENTS

CN   102236587 A   11/2011
CN   102779177 A   11/2012
(Continued)

OTHER PUBLICATIONS

"Series H: Audiovisual and Multimedia Systems Infrastructure of Audiovisual Services—Coding of Moving Video Advanced Video Coding for Generic Audiovisual Services," ITU-T, Telecommunication Standardization Sector of ITU, H.264, Apr. 2017, 812 pages.

*Primary Examiner* — Joshua P Lottich
(74) *Attorney, Agent, or Firm* — SLATER MATSIL, LLP

(57) ABSTRACT

An application exception recovery method, an electronic device, a storage medium storing the recovery method, and a recovery apparatus, the method including, storing page information of an exception page, in response to that an exception occurs in at least one application installed on an electronic device, wherein the exception page is a page displayed by the at least one application in response to the exception occurring, displaying a mask, wherein the mask is a picture displayed on at least a window of the at least one application during restart of the at least one application, restarting the at least one application, wherein restarting the at least one application comprises creating the exception page, and removing the mask.

18 Claims, 63 Drawing Sheets

(51) Int. Cl.
*G06F 9/455* (2018.01)
*G06F 11/07* (2006.01)
*G06F 21/52* (2013.01)

(56) References Cited

U.S. PATENT DOCUMENTS

| | | | | |
|---|---|---|---|---|
| 7,962,961 | B1* | 6/2011 | Griffin | G06F 21/577 |
| | | | | 709/224 |
| 10,042,695 | B1 | 8/2018 | Karppanen | |
| 2006/0200702 | A1 | 9/2006 | Canning et al. | |
| 2008/0109683 | A1* | 5/2008 | Erwin | G06F 11/0709 |
| | | | | 714/E11.029 |
| 2008/0177994 | A1* | 7/2008 | Mayer | G06F 16/00 |
| | | | | 709/224 |
| 2009/0013208 | A1* | 1/2009 | DiMuzio | G06F 11/0748 |
| | | | | 707/999.005 |
| 2014/0189435 | A1* | 7/2014 | Manuel-Devadoss | |
| | | | | H04L 41/0253 |
| | | | | 714/43 |
| 2015/0161089 | A1 | 6/2015 | Zhou et al. | |
| 2015/0254726 | A1* | 9/2015 | Cassidy | H04L 67/55 |
| | | | | 705/14.58 |
| 2015/0324254 | A1 | 11/2015 | Prasad et al. | |
| 2018/0225578 | A1* | 8/2018 | Vyas | G06N 20/00 |
| 2018/0322015 | A1 | 11/2018 | Chacon et al. | |
| 2018/0329768 | A1* | 11/2018 | Bikumala | G06F 11/079 |
| 2019/0347149 | A1* | 11/2019 | Panigrahi | G06F 16/24578 |

FOREIGN PATENT DOCUMENTS

| | | |
|---|---|---|
| CN | 104077194 A | 10/2014 |
| CN | 105468478 A | 4/2016 |
| CN | 106371946 A | 2/2017 |
| CN | 106372251 A | 2/2017 |
| CN | 106502820 A | 3/2017 |
| CN | 106598704 A | 4/2017 |
| CN | 106648971 A | 5/2017 |
| CN | 108415734 A | 8/2018 |
| CN | 109032828 A | 12/2018 |
| JP | 2004151861 A | 5/2004 |
| JP | 3751277 B2 | 3/2006 |

\* cited by examiner

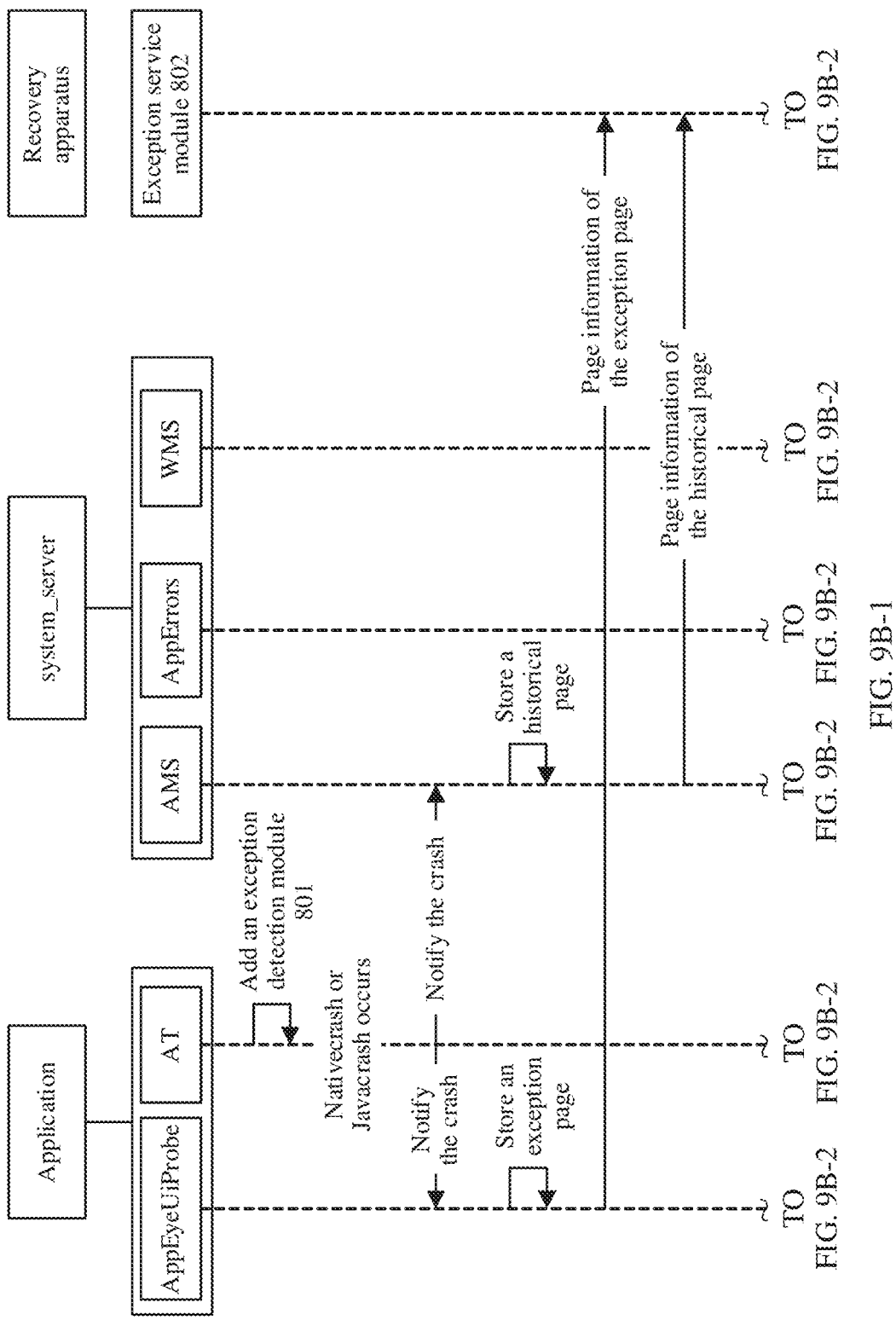

APPLICATION EXCEPTION RECOVERY

CROSS REFERENCE TO RELATED APPLICATIONS

This application is a National Stage of International Application No. PCT/CN2019/124425 filed on Dec. 11, 2019, which claims priority to Chinese Patent Application No. 201910050667.5, filed on Jan. 20, 2019. Both of the aforementioned applications are hereby incorporated by reference in their entireties.

TECHNICAL FIELD

The present invention relates to the field of electronic device technologies, and in particular, to an application exception recovery method, an electronic device running the recovery method, a storage medium storing the recovery method, and an application exception recovery apparatus.

BACKGROUND

Currently, in an electronic device product, a quantity of applications installed by a user is increasing, and sources of the applications are different.

Stability degrees of these applications are also different. An application crash (crash) and application not responding are problems that greatly affect user experience.

The application crash represents that an application crashes or an application stops running. The application crash is mainly caused by the following factors: Temporary application data is damaged, external data is abnormal, timing is inconsistent, resources are leaked, an operation that is not allowed by an operating system is performed, and the like. If the application is restarted after the application crashes, the exception may be recovered. A specific page to which the application is restarted is not determined. Generally, the application is restarted to a home page of the application. In this case, the user needs to operate the application again to return to a page displayed on the foreground when the exception occurs, but data that has been entered on the page such as edited content is lost.

Regardless of whether at least one application is manually restarted or automatically restarted after the at least one application is closed, user's work is interrupted, the user needs to spend extra energy on manual recovery because the application cannot be restarted to a page displayed when a crash occurs, and user discomfort is caused because of a page loss.

SUMMARY

Embodiments of this application provide an application exception recovery method.

According to a first aspect, an application exception recovery method is provided. At least one application is installed on an electronic device, and the method includes: in response to that an exception occurs in the at least one application, storing page information of an exception page, where the exception page is a page displayed by the at least one application when the exception occurs; displaying a mask, where the mask is a picture displayed on at least a window of the at least one application during restart of the application; restarting the application, where restarting the application includes creating the exception page; and removing the mask. According to the recovery method, the page information of the page displayed by the at least one application when the exception occurs can be stored in time when the exception occurs, thereby providing a basis for subsequent recovery to the page. For example, recovery to the exception page is implemented by restarting the at least one application. In this application, a page displayed by an application when an exception occurs is referred to as an exception page for short, so that readability of this application is better. After the exception occurs, a user usually sees a process in which the at least one application is closed and restarted. Even if automatic restart saves manual tapping time and can implement recovery to the exception page, the user still seems to see a black screen because the exception page is closed after the exception occurs. After the exception occurs, the mask is displayed on the window of the application to block the process in which the application is closed and restarted, so that the user does not feel that the page is abnormally lost, and content seen by the user during recovery can be determined. Depending on an implementation, a display range of the mask may also be an entire screen, so that the mask is displayed on at least the window of the application. When the restart process is completed, the exception page is created. In addition, when the exception page can be displayed, the mask needs to be removed because the mask is not needed and the window of the application needs to be vacated to display the exception page on the foreground. Removing the mask means that the mask is not displayed on the foreground. For example, the mask is removed by using a function info.snapshotWindow.dismiss( ). After the mask is removed, the created exception page can be displayed on the foreground. In an implementation, restarting the application includes: creating the exception page and making the page displayable. For example, the exception page is created by using a function onCreate( ), so that the mask can be displayed by using onStart( ).

In some possible implementations of the first aspect, in response to that the exception occurs in the at least one application, it is checked whether the page information of the exception page can be stored; and when it is determined that the page information of the page displayed by the at least one application when the exception occurs can be stored, the page information of the exception page is stored.

In some possible implementations of the first aspect, in response to that the exception occurs in the at least one application, it is checked whether the page information of the exception page can be stored; and when it is determined that the page information of the exception page cannot be stored, a procedure of the method is ended. For example, some applications may add a security label to a specific page, which means that a snapshot of the page is not expected to be obtained. In this implementation, it is considered that such a page having a security label is a page whose page information cannot be stored. This is because the page having such a flag is usually a security-related page, for example, a payment page. After the procedure of the method is ended, the application exits. When the recovery method can be continued to be run until the application is restarted, a cleanup operation is first performed in ActivityManagerService in the method, where the cleanup operation includes cleaning up page information and stack information and ending a process started by the application. After the recovery method is ended, the application cannot be restarted. In this case, a native system usually performs a cleanup procedure.

In some possible implementations of the first aspect, the mask includes a page snapshot of the exception page. If the page displayed when the exception occurs is used as the mask, the user can feel that the current page is not lost. In other words, the user may be unaware of exception occurrence and recovery.

In some possible implementations of the first aspect, the page information includes redirection information used to redirect to the page to which the page information belongs and user operation information on the page to which the page information belongs. In some possible implementations of the first aspect, the redirection information is included in an intent, and the user operation information is included in a bundle. Basic drawing information of each page is stored in a program package of the at least one application. Therefore, only information that indicates a to-be-started page, that is, the intent, and impact exerted by the user on the page, that is, the bundle, need to be stored, so that the page can be completely reproduced.

In some possible implementations of the first aspect, the method further includes: storing page information of a historical page when the exception occurs, where the historical page means all pages that are displayed between a moment at which the at least one application is started and a moment at which a previous page of the exception page is displayed. In this implementation, at least a part of a page redirection path on which the at least one application is restarted to the exception page when the exception occurs can be recovered. In some possible implementations of the first aspect, the storing page information of a historical page when the exception occurs includes: obtaining, from an activity manager in an operating system, the page information of the historical page that is recorded by the system; and storing the page information of the historical page. The activity manager is a page management service in the operating system. For example, the activity manager is referred to as an activity manager service in an Android® system in full name.

In some possible implementations of the first aspect, the method further includes: in response to that the page information of the historical page is stored, combining the page information of the exception page and the page information of the historical page, and restarting the at least one application.

In some possible implementations of the first aspect, the method further includes: in response to that the page information of the historical page is stored, checking whether the exception page and the historical page belong to a same application; and when the exception page and the historical page belong to a same application, combining the page information of the exception page and the page information of the historical page, and restarting the at least one application; or when the exception page and the historical page belong to different applications, ending the procedure of the method.

In some possible implementations of the first aspect, the combining the page information of the exception page and the page information of the historical page includes: constructing the page information of the historical page and the page information of the exception page into an array in a form of a stack, where the page information of the historical page is pushed into the stack first, and the page information of the exception page is pushed on the top of the stack. This implementation provides a data structure for recovery to the exception page.

In some possible implementations of the first aspect, the restarting the at least one application includes: initiating page creation based on the array, where the exception page is first created. In this implementation, recovery to the exception page is implemented, and when a back button is pressed, rollback can be performed in a page sequence of the at least one application generated when the exception occurs. In this implementation, the method can implement restart to the page displayed when the exception occurs, and can further implement, when the user presses the back (back) button, recovery of at least a part of a path on which the at least one application is restarted to the exception page when the exception occurs. Specifically, although all pages from the exception page to a start page are loaded into the page information array, whether a part or all of the path can be recovered when the back button is pressed depends on application settings. For some applications, rollback from a current page to a start page may be implemented by using the back button. However, for some other applications, when the back button is pressed on a specific page, the application directly exits and a home screen of the electronic device is switched to. For example, in WeChat, by pressing a back button on a Moments entry page, a home page of WeChat, that is, a start page, cannot be displayed, but WeChat exits and a home screen of an electronic device on which WeChat is installed is switched to.

In some possible implementations of the first aspect, when it is determined that the page information of the exception page cannot be stored, the procedure of the method is ended.

In some possible implementations of the first aspect, the application exception includes an application crash and application not responding. The application crash usually represents that an application crashes. The application not responding means that an application does not respond to a user operation within specified duration. The crash is also referred to as a crash.

In some possible implementations of the first aspect, during display of the mask, it is checked whether the exception is a repeated crash; and if the exception is a repeated crash, the procedure of the method is ended; or if the exception is not a repeated crash, the method is continued. The repeated crash means, for example, that a time interval between a current crash and a previous crash is within specific duration such as 1 min based on system_server records in the operating system of the electronic device. In some other possible implementations, when the repeated crash is detected, a pop-up box is displayed to indicate that the at least one application repeatedly crashes, a recovery operation such as upgrade, uninstallation and reinstallation, or buffer clear needs to be performed for first duration, and then the procedure of the method is ended. When the repeated crash occurs, the at least one application is restarted to the exception page, but the user may still encounter another crash after a few operations. Therefore, in this implementation, a step of detecting the repeated crash is provided; and when the repeated crash occurs, the procedure of the method is directly ended, or a detection result of the repeated crash is notified to the user and the procedure of the method is ended after an available recovery method is prompted.

In some possible implementations of the first aspect, a time interval used for determining the repeated crash is set. For example, the time interval is set to 1 min. In this case, the repeated crash means that the time interval between the previous crash and the current crash is within 1 min.

In some possible implementations of the first aspect, when the historical page and the exception page belong to a same application, a prompt pop-up box of the operating system of the electronic device for the application exception is intercepted. Some operating systems display prompt pop-up boxes for application exceptions such as an application crash and ANR. According to the recovery method in this embodiment, the application is automatically restarted. Therefore, there is no need to notify the user of the exception by using the pop-up box, so that the pop-up box can be intercepted. In addition, an objective of first determining that the historical page and the exception page belong to a same application is to ensure that the application can be restarted by using the recovery method and then to intervene in a pop-up box of the native system.

In some possible implementations of the first aspect, when the historical page and the exception page belong to a same application, and the current crash is not a repeated crash, a prompt pop-up box of the operating system of the electronic device for the application exception is intercepted. When the application exception is an application crash, if the recovery method is designed to end the procedure of the method when the repeated crash occurs, to determine that the application can be restarted by using the recovery method, whether the current crash is a repeated crash further needs to be checked in addition to that whether the historical page and the exception page belong to a same application is checked.

In some possible implementations of the first aspect, the at least one application applicable to the recovery method is managed. For example, the management may include adding and/or deleting the at least one application. For example, the electronic device stores a list of applications that can be recovered when an exception occurs, and may read the list and use the list as a list of applications applicable to the recovery method. For example, when the electronic device is delivered from a factory, an original list of applications that can be recovered when an exception occurs is stored in the operating system. For example, a path is system/etc/hiview/erecovery_config.xml. For example, the electronic device may download, from a server that has a corresponding protocol with the operating system, a dynamic list of applications that can be recovered when an exception occurs, and update the dynamic list. For example, the electronic device stores the dynamic list in a path data/system/hiview/erecovery_config.xml. For example, after downloading the dynamic list or updating the dynamic list, the electronic device broadcasts the dynamic list for reading. For example, the dynamic list is preferentially read, or the original list is read when the dynamic list does not exist or cannot be read.

In some possible implementations of the first aspect, an application exception learning method includes: detecting an application exception signal provided by the operating system of the electronic device. For example, when the operating system is the Android® system, an uncaughtExcetpion interface is invoked to detect the application exception signal. The application crash is, for example, a Java crash. An uncaught Java exception causes an Android® native mechanism to provide a pop-up box before the program exits, to notify the user of the exception, and the user may select to, for example, restart or forcibly exit the program. The pop-up box makes the user perceive that an exception occurs but the exception is not recovered. Consequently, a user operation is interrupted, and user discomfort is caused. In this implementation, an exception indication signal provided by the operating system is detected and intercepted, so that an opportunity of intercepting a pop-up box is also obtained.

In some possible implementations of the first aspect, an application exception learning method includes: registering a signal catcher with the operating system of the electronic device to detect the application exception. For example, when the operating system is the Android® system, one signal catcher (signal catcher) is registered with runtime (runtime) to detect a native crash. Currently, the native crash usually is a crash caused by an error in a program compiled by using C/C++. More broadly, the native crash is a crash caused by an error in a program running outside a virtual machine. For example, in the current Android® operating system, no exception is thrown (throw) when the native crash occurs. Therefore, in this implementation, the signal catcher is registered to actively detect the native crash, so that the native crash can be detected in time and subsequent processing can be performed.

In some possible implementations of the first aspect, an application exception learning method includes: detecting processing duration of a message queue in a process (main thread) of the at least one application; and when it is detected that a user operation is not processed within first duration, determining that the application exception occurs. For example, when the operating system is the Android® system, an event handler is registered with runtime. For example, the event handler is named as ANREventHandler. The first duration is specified in the event handler, and the event handler detects that, for example, a user tap operation is performed on a specific message in the message queue in the main thread of the at least one application. When the processing duration exceeds the first duration, it is determined that the ANR occurs.

In some possible implementations of the first aspect, the method further includes: querying whether the at least one application specifies a picture as the mask, where when the at least one application specifies a picture as the mask, the mask includes the picture specified by the at least one application; or when the at least one application does not specify a picture as the mask, the mask includes the page snapshot of the exception page. In this implementation, the picture specified by the at least one application such as an interesting picture may be used as the mask, thereby improving user experience during waiting for recovery of the at least one application.

In some possible implementations of the first aspect, screen display of the electronic device includes a status bar at the top of the uppermost layer and a navigation bar at the bottom of the uppermost layer. When the mask is displayed, the navigation bar may be hidden, or both the navigation bar and the status bar may be hidden. In some possible implementations of the first aspect, the mask further includes a snapshot of the navigation bar when the navigation bar is hidden. These implementations provide a plurality of options for whether the navigation bar and the status bar are displayed on the window during recovery of the at least one application and during display of the mask. For example, both the navigation bar and the status bar are displayed, so that the user can press a home button to return to the home screen. Alternatively, the navigation bar may be hidden, or both the navigation bar and the status bar may be hidden, so that the user is attentive to a difference between screen display that is recovering and a normal page. Alternatively, only the snapshot of the navigation bar is added to the mask, in other words, the user cannot obtain a response corresponding to a menu option of the navigation bar even if the user taps the menu option. Because the recovery process is generally between 300 ms to 2 s and the time is relatively short, and descriptions of the recovery process may be displayed on the mask, a probability of operating the navigation bar by the user during this period is relatively low, and only the snapshot of the navigation bar can be simply displayed.

According to a second aspect, an electronic device is provided, including a memory, a processor, and a computer program that is stored in the memory and that can run on the processor. When the processor executes the computer program, the electronic device is enabled to implement the application exception recovery method according to any implementation of the first aspect. Specifically, the following method may be implemented: In some possible implementations of the second aspect, the electronic device implements the application exception recovery method, at least one application is installed on the electronic device, and the method includes: in response to that an exception occurs in the at least one application, storing page information of an exception page, where the exception page is a page displayed by the at least one application when the exception occurs; displaying a mask, where the mask is a picture displayed on at least a window of the at least one application during restart of the application; restarting the application, where restarting the application includes creating the exception page; and removing the mask. According to the recovery method, the page information of the page displayed by the at least one application when the exception occurs can be stored in time when the exception occurs, thereby providing a basis for subsequent recovery to the page. For example, recovery to the exception page is implemented by restarting the at least one application. In this application, a page displayed by an application when an exception occurs is referred to as an exception page for short, so that readability of this application is better. After the exception occurs, a user usually sees a process in which the at least one application is closed and restarted. Even if automatic restart saves manual tapping time and can implement recovery to the exception page, the user still seems to see a black screen because the exception page is closed after the exception occurs. After the exception occurs, the mask is displayed on the window of the application to block the process in which the application is closed and restarted, so that the user does not feel that the page is abnormally lost, and content seen by the user during recovery can be determined. Depending on an implementation, a display range of the mask may also be an entire screen, so that the mask is displayed on at least the window of the application. When the restart process is completed, the exception page is created. In addition, when the exception page can be displayed, the mask needs to be removed because the mask is not needed and the window of the application needs to be vacated to display the exception page on the foreground. Removing the mask means that the mask is not displayed on the foreground. For example, the mask is removed by using a function info.snapshotWindow.dismiss( ). After the mask is removed, the created exception page can be displayed on the foreground. In an implementation, restarting the application includes: creating the exception page and making the page displayable. For example, the exception page is created by using a function onCreate( ), so that the mask can be displayed by using onStart( ).

In some possible implementations of the second aspect, in the application exception recovery method implemented by the electronic device, in response to that the exception occurs in the at least one application, it is checked whether the page information of the exception page can be stored; and when it is determined that the page information of the page displayed by the at least one application when the exception occurs can be stored, the page information of the exception page is stored. In some possible implementations of the second aspect, in the application exception recovery method implemented by the electronic device, in response to that the exception occurs in the at least one application, it is checked whether the page information of the exception page can be stored; and when it is determined that the page information of the exception page cannot be stored, a procedure of the method is ended. For example, some applications may add a security label to a specific page, which means that a snapshot of the page is not expected to be obtained. In this implementation, it is considered that such a page having a security label is a page whose page information cannot be stored. This is because the page having such a flag is usually a security-related page, for example, a payment page. After the procedure of the method is ended, the application exits. When the recovery method can be continued to be run until the application is restarted, a cleanup operation is first performed in ActivityManagerService in the method, where the cleanup operation includes cleaning up page information and stack information and ending a process started by the application. After the recovery method is ended, the application cannot be restarted. In this case, a native system usually performs a cleanup procedure.

In some possible implementations of the second aspect, in the application exception recovery method implemented by the electronic device, the mask includes a page snapshot of the exception page. If the page displayed when the exception occurs is used as the mask, the user can feel that the current page is not lost. In other words, the user may be unaware of exception occurrence and recovery.

In some possible implementations of the second aspect, in the application exception recovery method implemented by the electronic device, the page information includes redirection information used to redirect to the page to which the page information belongs and user operation information on the page to which the page information belongs. In some possible implementations of the second aspect, in the application exception recovery method implemented by the electronic device, the redirection information is included in an intent, and the user operation information is included in a bundle. Basic drawing information of each page is stored in a program package of the at least one application. Therefore, only information that indicates a to-be-started page, that is, the intent, and impact exerted by the user on the page, that is, the bundle, need to be stored, so that the page can be completely reproduced.

In some possible implementations of the second aspect, in the application exception recovery method implemented by the electronic device, page information of a historical page is stored when the exception occurs, where the historical page means all pages that are displayed between a moment at which the at least one application is started and a moment at which a previous page of the exception page is displayed. In this implementation, at least a part of a page redirection path on which the at least one application is restarted to the exception page when the exception occurs can be recovered. In some possible implementations of the second aspect, the storing page information of a historical page when the exception occurs includes: obtaining, from an activity manager in an operating system, the page information of the historical page that is recorded by the system; and storing the page information of the historical page. The activity manager is a page management service in the operating system. For example, the activity manager is referred to as an activity manager service in an Android® system in full name.

In some possible implementations of the second aspect, in the application exception recovery method implemented by the electronic device, in response to that the page information of the historical page is stored, the page information of the exception page and the page information of the historical page are combined, and the at least one application is restarted.

In some possible implementations of the second aspect, in the application exception recovery method implemented by the electronic device, in response to that the page information of the historical page is stored, it is checked whether the exception page and the historical page belong to a same application; and when the exception page and the historical page belong to a same application, the page information of the exception page and the page information of the historical page are combined, and the at least one application is restarted; or when the exception page and the historical page belong to different applications, the procedure of the method is ended.

In some possible implementations of the second aspect, in the application exception recovery method implemented by the electronic device, the combining the page information of the exception page and the page information of the historical page includes: constructing the page information of the historical page and the page information of the exception page into an array in a form of a stack, where the page information of the historical page is pushed into the stack first, and the page information of the exception page is pushed on the top of the stack. This implementation provides a data structure for recovery to the exception page.

In some possible implementations of the second aspect, in the application exception recovery method implemented by the electronic device, the restarting the at least one application includes: initiating page creation based on the array, where the exception page is first created. In this implementation, recovery to the exception page is implemented, and when a back button is pressed, rollback can be performed in a page sequence of the at least one application generated when the exception occurs. In this implementation, the method can implement restart to the page displayed when the exception occurs, and can further implement, when the user presses the back (back) button, recovery of at least a part of a path on which the at least one application is restarted to the exception page when the exception occurs. Specifically, although all pages from the exception page to a start page are loaded into the page information array, whether a part or all of the path can be recovered when the back button is pressed depends on application settings. For some applications, rollback from a current page to a start page may be implemented by using the back button. However, for some other applications, when the back button is pressed on a specific page, the application directly exits and a home screen of the electronic device is switched to. For example, in WeChat, by pressing a back button on a Moments entry page, a home page of WeChat, that is, a start page, cannot be displayed, but WeChat exits and a home screen of an electronic device on which WeChat is installed is switched to.

In some possible implementations of the second aspect, in the application exception recovery method implemented by the electronic device, when it is determined that the page information of the exception page cannot be stored, the procedure of the method is ended.

In some possible implementations of the second aspect, in the application exception recovery method implemented by the electronic device, the application exception includes an application crash and application not responding. The application crash usually represents that an application crashes. The application not responding means that an application does not respond to a user operation within specified duration. The crash is also referred to as a crash.

In some possible implementations of the second aspect, in the application exception recovery method implemented by the electronic device, during display of the mask, it is checked whether the exception is a repeated crash; and if the exception is a repeated crash, the procedure of the method is ended; or if the exception is not a repeated crash, the method is continued. The repeated crash means, for example, that a time interval between a current crash and a previous crash is within specific duration such as 1 min based on system_server records in the operating system of the electronic device. In some other possible implementations, when the repeated crash is detected, a pop-up box is displayed to indicate that the at least one application repeatedly crashes, a recovery operation such as upgrade, uninstallation and reinstallation, or buffer clear needs to be performed for first duration, and then the procedure of the method is ended. When the repeated crash occurs, the at least one application is restarted to the exception page, but the user may still encounter another crash after a few operations. Therefore, in this implementation, a step of detecting the repeated crash is provided; and when the repeated crash occurs, the procedure of the method is directly ended, or a detection result of the repeated crash is notified to the user and the procedure of the method is ended after an available recovery method is prompted.

In some possible implementations of the second aspect, in the application exception recovery method implemented by the electronic device, a time interval used for determining the repeated crash is set. For example, the time interval is set to 1 min. In this case, the repeated crash means that the time interval between the previous crash and the current crash is within 1 min.

In some possible implementations of the second aspect, in the application exception recovery method implemented by the electronic device, when the historical page and the exception page belong to a same application, a prompt pop-up box of the operating system of the electronic device for the application exception is intercepted. Some operating systems display prompt pop-up boxes for application exceptions such as an application crash and ANR. According to the recovery method in this embodiment, the application is automatically restarted. Therefore, there is no need to notify the user of the exception by using the pop-up box, so that the pop-up box can be intercepted. In addition, an objective of first determining that the historical page and the exception page belong to a same application is to ensure that the application can be restarted by using the recovery method and then to intervene in a pop-up box of the native system.

In some possible implementations of the second aspect, in the application exception recovery method implemented by the electronic device, when the historical page and the exception page belong to a same application, and the current crash is not a repeated crash, a prompt pop-up box of the operating system of the electronic device for the application exception is intercepted. When the application exception is an application crash, if the recovery method is designed to end the procedure of the method when the repeated crash occurs, to determine that the application can be restarted by using the recovery method, whether the current crash is a repeated crash further needs to be checked in addition to that whether the historical page and the exception page belong to a same application is checked.

In some possible implementations of the second aspect, in the application exception recovery method implemented by the electronic device, the at least one application applicable to the recovery method is managed. For example, the management may include adding and/or deleting the at least one application. For example, the electronic device stores a list of applications that can be recovered when an exception occurs, and may read the list and use the list as a list of applications applicable to the recovery method. For example, when the electronic device is delivered from a factory, an original list of applications that can be recovered when an exception occurs is stored in the operating system. For example, a path is system/etc/hiview/erecovery_config.xml. For example, the electronic device may download, from a server that has a corresponding protocol with the operating system, a dynamic list of applications that can be recovered when an exception occurs, and update the dynamic list. For example, the electronic device stores the dynamic list in a path data/system/hiview/erecovery_config.xml. For example, after downloading the dynamic list or updating the dynamic list, the electronic device broadcasts the dynamic list for reading. For example, the dynamic list is preferentially read, or the original list is read when the dynamic list does not exist or cannot be read.

In some possible implementations of the second aspect, in the application exception recovery method implemented by the electronic device, an application exception learning method includes: detecting an application exception signal provided by the operating system of the electronic device. For example, when the operating system is the Android® system, an uncaughtExcetpion interface is invoked to detect the application exception signal. The application crash is, for example, a Java crash. An uncaught Java exception causes an Android® native mechanism to provide a pop-up box before the program exits, to notify the user of the exception, and the user may select to, for example, restart or forcibly exit the program. The pop-up box makes the user perceive that an exception occurs but the exception is not recovered. Consequently, a user operation is interrupted, and user discomfort is caused. In this implementation, an exception indication signal provided by the operating system is detected and intercepted, so that an opportunity of intercepting a pop-up box is also obtained.

In some possible implementations of the second aspect, in the application exception recovery method implemented by the electronic device, an application exception learning method includes: registering a signal catcher with the operating system of the electronic device to detect the application exception. For example, when the operating system is the Android® system, one signal catcher (signal catcher) is registered with runtime (runtime) to detect a native crash. Currently, the native crash usually is a crash caused by an error in a program compiled by using C/C++. More broadly, the native crash is a crash caused by an error in a program running outside a virtual machine. For example, in the current Android® operating system, no exception is thrown (throw) when the native crash occurs. Therefore, in this implementation, the signal catcher is registered to actively detect the native crash, so that the native crash can be detected in time and subsequent processing can be performed.

In some possible implementations of the second aspect, in the application exception recovery method implemented by the electronic device, an application exception learning method includes: detecting processing duration of a message queue in a process (main thread) of the at least one application; and when it is detected that a user operation is not processed within first duration, determining that the application exception occurs. For example, when the operating system is the Android® system, an event handler is registered with runtime. For example, the event handler is named as ANREventHandler. The first duration is specified in the event handler, and the event handler detects that, for example, a user tap operation is performed on a specific message in the message queue in the main thread of the at least one application. When the processing duration exceeds the first duration, it is determined that the ANR occurs.

In some possible implementations of the second aspect, in the application exception recovery method implemented by the electronic device, it is queried whether the at least one application specifies a picture as the mask, where when the at least one application specifies a picture as the mask, the mask includes the picture specified by the at least one application; or when the at least one application does not specify a picture as the mask, the mask includes the page snapshot of the exception page. In this implementation, the picture specified by the at least one application such as an interesting picture may be used as the mask, thereby improving user experience during waiting for recovery of the at least one application.

In some possible implementations of the second aspect, in the application exception recovery method implemented by the electronic device, screen display of the electronic device includes a status bar at the top of the uppermost layer and a navigation bar at the bottom of the uppermost layer. When the mask is displayed, the navigation bar may be hidden, or both the navigation bar and the status bar may be hidden. In some possible implementations of the second aspect, in the application exception recovery method implemented by the electronic device, the mask further includes a snapshot of the navigation bar when the navigation bar is hidden. These implementations provide a plurality of options for whether the navigation bar and the status bar are displayed on the window during recovery of the at least one application and during display of the mask. For example, both the navigation bar and the status bar are displayed, so that the user can press a home button to return to the home screen. Alternatively, the navigation bar may be hidden, or both the navigation bar and the status bar may be hidden, so that the user is attentive to a difference between screen display that is recovering and a normal page. Alternatively, only the snapshot of the navigation bar is added to the mask, in other words, the user cannot obtain a response corresponding to a menu option of the navigation bar even if the user taps the menu option. Because the recovery process is generally between 300 ms to 2 s and the time is relatively short, and descriptions of the recovery process may be displayed on the mask, a probability of operating the navigation bar by the user during this period is relatively low, and only the snapshot of the navigation bar can be simply displayed.

According to a third aspect, a computer storage medium is provided, including computer instructions. When the computer instructions are run on an electronic device, the electronic device is enabled to perform the application exception recovery method according to any implementation of the first aspect. Specifically, in some possible implementations of the third aspect, the electronic device performs the application exception recovery method, at least one application is installed on the electronic device, and the method includes: in response to that an exception occurs in the at least one application, storing page information of an exception page, where the exception page is a page displayed by the at least one application when the exception occurs; displaying a mask, where the mask is a picture displayed on at least a window of the at least one application during restart of the application; restarting the application, where restarting the application includes creating the exception page; and removing the mask. According to the recovery method, the page information of the page displayed by the at least one application when the exception occurs can be stored in time when the exception occurs, thereby providing a basis for subsequent recovery to the page. For example, recovery to the exception page is implemented by restarting the at least one application. In this application, a page displayed by an application when an exception occurs is referred to as an exception page for short, so that readability of this application is better. After the exception occurs, a user usually sees a process in which the at least one application is closed and restarted. Even if automatic restart saves manual tapping time and can implement recovery to the exception page, the user still seems to see a black screen because the exception page is closed after the exception occurs. After the exception occurs, the mask is displayed on the window of the application to block the process in which the application is closed and restarted, so that the user does not feel that the page is abnormally lost, and content seen by the user during recovery can be determined. Depending on an implementation, a display range of the mask may also be an entire screen, so that the mask is displayed on at least the window of the application. When the restart process is completed, the exception page is created. In addition, when the exception page can be displayed, the mask needs to be removed because the mask is not needed and the window of the application needs to be vacated to display the exception page on the foreground. Removing the mask means that the mask is not displayed on the foreground. For example, the mask is removed by using a function info.snapshotWindow. dismiss( ). After the mask is removed, the created exception page can be displayed on the foreground. In an implementation, restarting the application includes: creating the exception page and making the page displayable. For example, the exception page is created by using a function onCreate( ), so that the mask can be displayed by using onStart( ).

In some possible implementations of the third aspect, in the application exception recovery method performed by the electronic device, in response to that the exception occurs in the at least one application, it is checked whether the page information of the exception page can be stored; and when it is determined that the page information of the page displayed by the at least one application when the exception occurs can be stored, the page information of the exception page is stored. In some possible implementations of the third aspect, in the application exception recovery method performed by the electronic device, in response to that the exception occurs in the at least one application, it is checked whether the page information of the exception page can be stored; and when it is determined that the page information of the exception page cannot be stored, a procedure of the method is ended. For example, some applications may add a security label to a specific page, which means that a snapshot of the page is not expected to be obtained. In this implementation, it is considered that such a page having a security label is a page whose page information cannot be stored. This is because the page having such a flag is usually a security-related page, for example, a payment page. After the procedure of the method is ended, the application exits. When the recovery method can be continued to be run until the application is restarted, a cleanup operation is first performed in ActivityManagerService in the method, where the cleanup operation includes cleaning up page information and stack information and ending a process started by the application. After the recovery method is ended, the application cannot be restarted. In this case, a native system usually performs a cleanup procedure. In some implementations, restarting the application includes: creating the exception page, and removing the mask after the restart is completed, so as to display the created exception page on the foreground.

In some possible implementations of the third aspect, in the application exception recovery method performed by the electronic device, the mask includes a page snapshot of the exception page. If the page displayed when the exception occurs is used as the mask, the user can feel that the current page is not lost. In other words, the user may be unaware of exception occurrence and recovery.

In some possible implementations of the third aspect, in the application exception recovery method performed by the electronic device, the page information includes redirection information used to redirect to the page to which the page information belongs and user operation information on the page to which the page information belongs. In some possible implementations of the third aspect, in the application exception recovery method performed by the electronic device, the redirection information is included in an intent, and the user operation information is included in a bundle. Basic drawing information of each page is stored in a program package of the at least one application. Therefore, only information that indicates a to-be-started page, that is, the intent, and impact exerted by the user on the page, that is, the bundle, need to be stored, so that the page can be completely reproduced.

In some possible implementations of the third aspect, in the application exception recovery method performed by the electronic device, page information of a historical page is stored when the exception occurs, where the historical page means all pages that are displayed between a moment at which the at least one application is started and a moment at which a previous page of the exception page is displayed. In this implementation, at least a part of a page redirection path on which the at least one application is restarted to the exception page when the exception occurs can be recovered. In some possible implementations of the third aspect, the storing page information of a historical page when the exception occurs includes: obtaining, from an activity manager in an operating system, the page information of the historical page that is recorded by the system; and storing the page information of the historical page. The activity manager is a page management service in the operating system. For example, the activity manager is referred to as an activity manager service in an Android® system in full name.

In some possible implementations of the third aspect, in the application exception recovery method performed by the electronic device, in response to that the page information of the historical page is stored, the page information of the exception page and the page information of the historical page are combined, and the at least one application is restarted.

In some possible implementations of the third aspect, in the application exception recovery method performed by the electronic device, in response to that the page information of the historical page is stored, it is checked whether the exception page and the historical page belong to a same application; and when the exception page and the historical page belong to a same application, the page information of the exception page and the page information of the historical page are combined, and the at least one application is restarted; or when the exception page and the historical page belong to different applications, the procedure of the method is ended.

In some possible implementations of the third aspect, in the application exception recovery method performed by the electronic device, the combining the page information of the exception page and the page information of the historical page includes: constructing the page information of the historical page and the page information of the exception page into an array in a form of a stack, where the page information of the historical page is pushed into the stack first, and the page information of the exception page is pushed on the top of the stack. This implementation provides a data structure for recovery to the exception page.

In some possible implementations of the third aspect, in the application exception recovery method performed by the electronic device, the restarting the at least one application includes: initiating page creation based on the array, where the exception page is first created. In this implementation, recovery to the exception page is implemented, and when a back button is pressed, rollback can be performed in a page sequence of the at least one application generated when the exception occurs. In this implementation, the method can implement restart to the page displayed when the exception occurs, and can further implement, when the user presses the back (back) button, recovery of at least a part of a path on which the at least one application is restarted to the exception page when the exception occurs. Specifically, although all pages from the exception page to a start page are loaded into the page information array, whether a part or all of the path can be recovered when the back button is pressed depends on application settings. For some applications, rollback from a current page to a start page may be implemented by using the back button. However, for some other applications, when the back button is pressed on a specific page, the application directly exits and a home screen of the electronic device is switched to. For example, in WeChat, by pressing a back button on a Moments entry page, a home page of WeChat, that is, a start page, cannot be displayed, but WeChat exits and a home screen of an electronic device on which WeChat is installed is switched to.

In some possible implementations of the third aspect, in the application exception recovery method performed by the electronic device, when it is determined that the page information of the exception page cannot be stored, the procedure of the method is ended.

In some possible implementations of the third aspect, in the application exception recovery method performed by the electronic device, the application exception includes an application crash and application not responding. The application crash usually represents that an application crashes. The application not responding means that an application does not respond to a user operation within specified duration. The crash is also referred to as a crash.

In some possible implementations of the third aspect, in the application exception recovery method performed by the electronic device, during display of the mask, it is checked whether the exception is a repeated crash; and if the exception is a repeated crash, the procedure of the method is ended; or if the exception is not a repeated crash, the method is continued. The repeated crash means, for example, that a time interval between a current crash and a previous crash is within specific duration such as 1 min based on system_server records in the operating system of the electronic device. In some other possible implementations, when the repeated crash is detected, a pop-up box is displayed to indicate that the at least one application repeatedly crashes, a recovery operation such as upgrade, uninstallation and reinstallation, or buffer clear needs to be performed for first duration, and then the procedure of the method is ended. When the repeated crash occurs, the at least one application is restarted to the exception page, but the user may still encounter another crash after a few operations. Therefore, in this implementation, a step of detecting the repeated crash is provided; and when the repeated crash occurs, the procedure of the method is directly ended, or a detection result of the repeated crash is notified to the user and the procedure of the method is ended after an available recovery method is prompted.

In some possible implementations of the third aspect, in the application exception recovery method performed by the electronic device, a time interval used for determining the repeated crash is set. For example, the time interval is set to 1 min. In this case, the repeated crash means that the time interval between the previous crash and the current crash is within 1 min.

In some possible implementations of the third aspect, in the application exception recovery method performed by the electronic device, when the historical page and the exception page belong to a same application, a prompt pop-up box of the operating system of the electronic device for the application exception is intercepted. Some operating systems display prompt pop-up boxes for application exceptions such as an application crash and ANR. According to the recovery method in this embodiment, the application is automatically restarted. Therefore, there is no need to notify the user of the exception by using the pop-up box, so that the pop-up box can be intercepted. In addition, an objective of first determining that the historical page and the exception page belong to a same application is to ensure that the application can be restarted by using the recovery method and then to intervene in a pop-up box of the native system.

In some possible implementations of the third aspect, in the application exception recovery method performed by the electronic device, when the historical page and the exception page belong to a same application and the current crash is not a repeated crash, a prompt pop-up box of the operating system of the electronic device for the application exception is intercepted. When the application exception is an application crash, if the recovery method is designed to end the procedure of the method when the repeated crash occurs, to determine that the application can be restarted by using the recovery method, whether the current crash is a repeated crash further needs to be checked in addition to that whether the historical page and the exception page belong to a same application is checked.

In some possible implementations of the third aspect, in the application exception recovery method performed by the electronic device, the at least one application applicable to the recovery method is managed. For example, the management may include adding and/or deleting the at least one application. For example, the electronic device stores a list of applications that can be recovered when an exception occurs, and may read the list and use the list as a list of applications applicable to the recovery method. For example, when the electronic device is delivered from a factory, an original list of applications that can be recovered when an exception occurs is stored in the operating system. For example, a path is system/etc/hiview/erecovery_config.xml. For example, the electronic device may download, from a server that has a corresponding protocol with the operating system, a dynamic list of applications that can be recovered when an exception occurs, and update the dynamic list. For example, the electronic device stores the dynamic list in a path data/system/hiview/erecovery_config.xml. For example, after downloading the dynamic list or updating the dynamic list, the electronic device broadcasts the dynamic list for reading. For example, the dynamic list is preferentially read, or the original list is read when the dynamic list does not exist or cannot be read.

In some possible implementations of the third aspect, in the application exception recovery method performed by the electronic device, an application exception learning method includes: detecting an application exception signal provided by the operating system of the electronic device. For example, when the operating system is the Android® system, an uncaughtExcetpion interface is invoked to detect the application exception signal. The application crash is, for example, a Java crash. An uncaught Java exception causes an Android® native mechanism to provide a pop-up box before the program exits, to notify the user of the exception, and the user may select to, for example, restart or forcibly exit the program. The pop-up box makes the user perceive that an exception occurs but the exception is not recovered. Consequently, a user operation is interrupted, and user discomfort is caused. In this implementation, an exception indication signal provided by the operating system is detected and intercepted, so that an opportunity of intercepting a pop-up box is also obtained.

In some possible implementations of the third aspect, in the application exception recovery method performed by the electronic device, an application exception learning method includes: registering a signal catcher with the operating system of the electronic device to detect the application exception. For example, when the operating system is the Android® system, one signal catcher (signal catcher) is registered with runtime (runtime) to detect a native crash. Currently, the native crash usually is a crash caused by an error in a program compiled by using C/C++. More broadly, the native crash is a crash caused by an error in a program running outside a virtual machine. For example, in the current Android® operating system, no exception is thrown (throw) when the native crash occurs. Therefore, in this implementation, the signal catcher is registered to actively detect the native crash, so that the native crash can be detected in time and subsequent processing can be performed.

In some possible implementations of the third aspect, in the application exception recovery method performed by the electronic device, an application exception learning method includes: detecting processing duration of a message queue in a process (main thread) of the at least one application; and when it is detected that a user operation is not processed within first duration, determining that the application exception occurs. For example, when the operating system is the Android® system, an event handler is registered with runtime. For example, the event handler is named as ANREventHandler. The first duration is specified in the event handler, and the event handler detects that, for example, a user tap operation is performed on a specific message in the message queue in the main thread of the at least one application. When the processing duration exceeds the first duration, it is determined that the ANR occurs.

In some possible implementations of the third aspect, in the application exception recovery method performed by the electronic device, it is queried whether the at least one application specifies a picture as the mask, where when the at least one application specifies a picture as the mask, the mask includes the picture specified by the at least one application; or when the at least one application does not specify a picture as the mask, the mask includes the page snapshot of the exception page. In this implementation, the picture specified by the at least one application such as an interesting picture may be used as the mask, thereby improving user experience during waiting for recovery of the at least one application.

In some possible implementations of the third aspect, in the application exception recovery method performed by the electronic device, screen display of the electronic device includes a status bar at the top of the uppermost layer and a navigation bar at the bottom of the uppermost layer. When the mask is displayed, the navigation bar may be hidden, or both the navigation bar and the status bar may be hidden. In some possible implementations of the third aspect, in the application exception recovery method performed by the electronic device, the mask further includes a snapshot of the navigation bar when the navigation bar is hidden. These implementations provide a plurality of options for whether the navigation bar and the status bar are displayed on the window during recovery of the at least one application and during display of the mask. For example, both the navigation bar and the status bar are displayed, so that the user can press a home button to return to the home screen. Alternatively, the navigation bar may be hidden, or both the navigation bar and the status bar may be hidden, so that the user is attentive to a difference between screen display that is recovering and a normal page. Alternatively, only the snapshot of the navigation bar is added to the mask, in other words, the user cannot obtain a response corresponding to a menu option of the navigation bar even if the user taps the menu option. Because the recovery process is generally between 300 ms to 2 s and the time is relatively short, and descriptions of the recovery process may be displayed on the mask, a probability of operating the navigation bar by the user during this period is relatively low, and only the snapshot of the navigation bar can be simply displayed.

According to a fourth aspect, a computer program product is provided. When the computer program product is run on a computer, the computer is enabled to perform the application exception recovery method according to any possible implementation of the first aspect.

According to a fifth aspect, an application exception recovery apparatus is provided. The recovery apparatus is arranged in an electronic device. The recovery apparatus includes an exception service module and an exception detection module. The electronic device further includes at least one application. The exception detection module is an event handler running in a process of the at least one application, and when the exception detection module detects that an exception occurs in the at least one application, the at least one application learns that the exception occurs. When the at least one application learns of the application exception from the exception detection module, the at least one application stores page information of an exception page, and transmits the stored page information of the exception page to the exception service module, where the exception page is a page displayed by the at least one application when the exception occurs, and the exception service module is a service configured in an operating system of the electronic device. The exception service module displays a mask when receiving the page information of the exception page from the at least one application, where the mask is a picture displayed on at least a window of the at least one application during restart of the at least one application. The exception service module restarts the application, where restarting the application includes creating the exception page. The exception service module removes the mask, so as to display the created exception page on the foreground. According to the recovery apparatus, the page information of the page displayed by the at least one application when the exception occurs can be stored in time when the exception occurs. In this application, the page is referred to as an exception page for short. This provides a basis for subsequent recovery to the page. For example, recovery to the exception page is implemented by restarting the at least one application. After the exception occurs, a user usually sees a process in which the at least one application is closed and restarted. Even if automatic restart saves manual tapping time and can implement recovery to the exception page, the user still seems to see a black screen because the exception page is closed after the exception occurs. After the exception occurs, the mask is displayed on the screen to block the process in which the application is closed and restarted, so that the user does not feel that the page is abnormally lost, and content seen by the user during recovery can be determined. Depending on an implementation, a display range of the mask may also be an entire screen, so that the mask is displayed on at least the window of the application. When the restart process is completed, the exception page is created. In addition, when the exception page can be displayed, the mask needs to be removed because the mask is not needed and the window of the application needs to be vacated to display the exception page on the foreground. Removing the mask means that the mask is not displayed on the foreground. For example, the mask is removed by using a function info.snapshotWindow.dismiss( ). After the mask is removed, the created exception page can be displayed on the foreground. In an implementation, restarting the application includes: creating the exception page and making the page displayable. For example, the exception page is created by using a function onCreate( ), so that the mask can be displayed by using onStart( ).

In some possible implementations of the fifth aspect, the application exception includes an application crash and application not responding. The application crash usually represents that an application crashes. The application not responding means that an application does not respond to a user operation within specified duration. The crash is also referred to as a crash.

In some possible implementations of the fifth aspect, when the at least one application learns that the exception occurs in the at least one application, the application checks whether the page information of the exception page can be stored, and stores the page information of the exception page when determining that the page information of the exception page can be stored. For example, some applications may add a security label to a specific page, which means that a snapshot of the page is not expected to be obtained. In this implementation, it is considered that such a page having a security label is a page whose page information cannot be stored. This is because the page having such a flag is usually a security-related page, for example, a payment page.

In some possible implementations of the fifth aspect, the mask includes a page snapshot of the exception page. If the page displayed when the exception occurs is used as the mask, the user can feel that the current page is not lost. In other words, the user may be unaware of exception occurrence and recovery.

In some possible implementations of the fifth aspect, the page information includes redirection information used to redirect to the page to which the page information belongs and user operation information on the page to which the page information belongs. In some possible implementations of the first aspect, the redirection information is included in an intent, and the user operation information is included in a bundle. Basic drawing information of each page is stored in a program package of the at least one application. Therefore, only information that indicates a to-be-started page, that is, the intent, and impact exerted by the user on the page, that is, the bundle, need to be stored, so that the page can be completely reproduced.

In some possible implementations of the fifth aspect, the exception service module includes an application exception interface, configured to receive the page information of the exception page from the at least one application.

In some possible implementations of the fifth aspect, the exception service module includes a stack storage interface, configured to store page information of a historical page when the exception occurs, where the historical page means all pages that are displayed between a moment at which the at least one application is started and a moment at which a previous page of the exception page is displayed. In this implementation, at least a part of a page redirection path on which the at least one application is restarted to the exception page when the exception occurs can be recovered. In some possible implementations of the fifth aspect, the storing page information of a historical page when the exception occurs includes: obtaining, from an activity manager in an operating system, the page information of the historical page that is recorded by the system; and storing the page information of the historical page. The activity manager is a page management service in the operating system. For example, the activity manager is referred to as an activity manager service in an Android® system in full name.

In some possible implementations of the fifth aspect, the exception service module includes an exception query interface, configured to: when a type of the exception is an application crash, query whether the exception is a repeated crash. The repeated crash means, for example, that a time interval between a current crash and a previous crash is within specific duration such as 1 min based on system_server records in the operating system of the electronic device. In some other possible implementations, when the exception query interface detects the repeated crash, the exception service module displays a pop-up box to indicate that the at least one application repeatedly crashes, and recovery operations such as upgrade, reinstallation, and buffer clear need to be performed until the first duration. When the repeated crash occurs, the at least one application is restarted to the exception page, but the user may still encounter another crash after a few operations. Therefore, in this implementation, a component of detecting the repeated crash is provided; and when the repeated crash occurs, a detection result of the repeated crash is notified to the user and an available recovery method is prompted.

In some possible implementations of the fifth aspect, the exception service module includes a configuration manager, configured to set a time interval used for determining the repeated crash. For example, the configuration manager sets the time interval to 1 min. In this case, the repeated crash means that the time interval between the previous crash and the current crash is within 1 min. In some possible implementations of the fifth aspect, the configuration manager is configured to manage the at least one application applicable to the recovery apparatus. For example, the recovery apparatus may include a list of the at least one application applicable to the recovery apparatus, and the management may include adding and/or deleting the at least one application. For example, the electronic device stores a list of applications that can be recovered when an exception occurs, and the configuration manager may read the list and use the list as a list of applications applicable to the recovery apparatus. For example, when the electronic device is delivered from a factory, an original list of applications that can be recovered when an exception occurs is stored in the operating system. For example, a path is system/etc/hiview/ erecovery_config.xml. For example, the electronic device may download, from a server that has a corresponding protocol with the operating system, a dynamic list of applications that can be recovered when an exception occurs, and update the dynamic list. For example, the electronic device stores the dynamic list in a path data/system/hiview/erecovery_config.xml. For example, after downloading the dynamic list or updating the dynamic list, the electronic device broadcasts the dynamic list, so that the configuration manager can read the dynamic list. For example, the configuration manager preferentially reads the dynamic list, and reads the original list when the dynamic list does not exist or cannot be read.

In some possible implementations of the fifth aspect, the exception service module includes an exception state storage part, configured to store the page information of the exception page received through the application exception interface and the information about the historical page stored through the stack storage interface.

In some possible implementations of the fifth aspect, the exception detection module detects the application exception by detecting an application exception signal provided by the operating system of the electronic device. For example, when the operating system is the Android® system, the exception detection module registers a handler for invoking an interface UncaughtExcetpionHandler with runtime to detect the application exception signal. The application crash is, for example, a Java crash. An uncaught Java exception causes an Android® native mechanism to provide a pop-up box before the program exits, to notify the user of the exception, and the user may select to, for example, restart or forcibly exit the program. The pop-up box makes the user perceive that an exception occurs but the exception is not recovered. Consequently, a user operation is interrupted, and user discomfort is caused. In this implementation, an exception indication signal provided by the operating system is detected and intercepted, so that an opportunity of intercepting a pop-up box is also obtained.

In some possible implementations of the fifth aspect, the exception detection module registers a signal catcher with the operating system of the electronic device to detect the application exception. For example, when the operating system is the Android® system, the exception detection module is a signal catcher (signal catcher) registered with runtime (runtime) to detect a native crash. Currently, the native crash usually is a crash caused by an error in a program compiled by using C/C++. More broadly, the native crash is a crash caused by an error in a program running outside a virtual machine. For example, in the current Android® operating system, no exception is thrown (throw) when the native crash occurs. Therefore, in this implementation, the signal catcher is registered to actively detect the native crash, so that the native crash can be detected in time and subsequent processing can be performed.

In some possible implementations of the fifth aspect, the exception detection module detects processing duration of a message queue in a process (main thread) of the at least one application; and when it is detected that a user operation is not processed within first duration, determines that the application exception occurs. For example, when the operating system is the Android® system, the exception detection module registers an event handler with runtime. For example, the event handler is named as ANREventHandler. The first duration is specified in the event handler, and the event handler detects that, for example, a user tap operation is performed on a specific message in the message queue in the main thread of the at least one application. When the processing duration exceeds the first duration, it is determined that the ANR occurs.

In some possible implementations of the fifth aspect, the exception state storage part combines the page information of the exception page and the page information of the historical page when detecting that the page information of the exception page and the page information of the historical page are stored.

In some possible implementations of the fifth aspect, when detecting that the page information of the exception page and the page information of the historical page are stored, the exception state storage part checks whether the exception page and the historical page belong to a same application, and combines the page information of the exception page and the page information of the historical page when the exception page and the historical page belong to a same application.

In some possible implementations of the fifth aspect, the recovery apparatus further includes a pop-up interception module, and the pop-up interception module is a function configured in an application exception processing class in the operating system of the electronic device; when the operating system learns of the exception, the application exception processing class is run, and communicates with the exception service module when the application exception processing class is run; and when the historical page and the exception page belong to a same application, the pop-up interception module intercepts a prompt pop-up box of the operating system of the electronic device for the exception. Some operating systems display prompt pop-up boxes for application exceptions such as an application crash and ANR. According to the recovery method in this embodiment, the application is automatically restarted. Therefore, there is no need to notify the user of the exception by using the pop-up box, so that the pop-up box can be intercepted. In addition, an objective of first determining that the historical page and the exception page belong to a same application is to ensure that the application can be restarted by using the recovery method and then to intervene in a pop-up box of the native system.

In some possible implementations of the fifth aspect, the recovery apparatus further includes a pop-up interception module. The pop-up interception module is a function arranged in an application exception processing class in an operating system of the electronic device, and the class for processing the application exception runs when the operating system learns that the application is abnormal, when this class is running, it communicates with the exception service module. When the historical page and the exception page belong to a same application and the current crash is not a repeated crash, the pop-up interception module intercepts the prompt pop-up box of the operating system of the electronic device for the application exception. When the application exception is an application crash, if the recovery method is designed to end the procedure of the method when the repeated crash occurs, to determine that the application can be restarted by using the recovery method, whether the current crash is a repeated crash further needs to be checked in addition to that whether the historical page and the exception page belong to a same application is checked.

In some possible implementations of the fifth aspect, the combining the page information of the exception page and the page information of the historical page includes: constructing the page information of the historical page and the page information of the exception page into an array in a form of a stack, where the page information of the historical page is pushed into the stack first, and the page information of the exception page is pushed on the top of the stack. This implementation provides a data structure for recovery to the exception page. When the array is read, the exception page at the top of the stack is read and re-created first, so that recovery to the exception page is implemented.

In some possible implementations of the fifth aspect, the exception service module restarts the at least one application based on the combination of the page information of the exception page and the page information of the historical page. In some possible implementations of the fifth aspect, the recovery apparatus includes an application start part, configured to initiate page creation based on the array, where the exception page is first created. In this implementation, recovery to the exception page is implemented, and when a back button is pressed, rollback can be performed in a page sequence of the at least one application generated when the exception occurs. In this implementation, the method can implement restart to the page displayed when the exception occurs, and can further implement, when the user presses the back (back) button, recovery of at least a part of a path on which the at least one application is restarted to the exception page when the exception occurs. Specifically, although all pages from the exception page to a start page are loaded into the page information array, whether a part or all of the path can be recovered when the back button is pressed depends on application settings. For some applications, rollback from a current page to a start page may be implemented by using the back button. However, for some other applications, when the back button is pressed on a specific page, the application directly exits and a home screen of the electronic device is switched to. For example, in WeChat, by pressing a back button on a Moments entry page, a home page of WeChat, that is, a start page, cannot be displayed, but WeChat exits and a home screen of an electronic device on which WeChat is installed is switched to.

In some possible implementations of the fifth aspect, the exception service module is further configured to query whether the at least one application specifies a picture as the mask, where when the at least one application specifies a picture as the mask, the mask includes the picture specified by the at least one application; or when the at least one application does not specify a picture as the mask, the mask includes the page snapshot of the exception page. In this implementation, the picture specified by the at least one application such as an interesting picture may be used as the mask, thereby improving user experience during waiting for recovery of the at least one application.

In some possible implementations of the fifth aspect, screen display of the electronic device includes a status bar at the top of the uppermost layer and a navigation bar at the bottom of the uppermost layer. When the mask is displayed, the navigation bar may be hidden, or both the navigation bar and the status bar may be hidden. In some possible implementations of the first aspect, the mask further includes a snapshot of the navigation bar when the navigation bar is hidden. These implementations provide a plurality of options for whether the navigation bar and the status bar are displayed on the window during recovery of the at least one application and during display of the mask. For example, both the navigation bar and the status bar are displayed, so that the user can press a home button to return to the home screen. Alternatively, the navigation bar may be hidden, or both the navigation bar and the status bar may be hidden, so that the user is attentive to a difference between screen display that is recovering and a normal page. Alternatively, only the snapshot of the navigation bar is added to the mask, in other words, the user cannot obtain a response corresponding to a menu option of the navigation bar even if the user taps the menu option. Because the recovery process is generally between 300 ms to 2 s and the time is relatively short, and descriptions of the recovery process may be displayed on the mask, a probability of operating the navigation bar by the user during this period is relatively low, and only the snapshot of the navigation bar can be simply displayed.

According to a sixth aspect, an electronic device is provided. The electronic device includes at least one application and the application exception recovery apparatus according to any implementation of the fifth aspect of this application.

According to a seventh aspect, a method for manufacturing an electronic device is provided. The method includes: arranging the application exception recovery apparatus according to the fifth aspect of the present invention in the electronic device, where the arranging the application exception recovery apparatus according to the fifth aspect of the present invention in the electronic device includes: arranging an exception service module at an application framework layer of an operating system, arranging code of an exception handler at the application framework layer, and registering the exception handler with runtime of the operating system, so that the exception handler runs in a process of an application when the application runs on the electronic device; and installing the operating system on the electronic device.

According to the application exception recovery method and the application exception recovery apparatus provided in the embodiments of this application, manual tap-to-restart is omitted after the at least one application is closed, so that a time for recovering to normal use is shortened. In addition, after recovery to a page displayed when an exception occurs is implemented, the user can continue to perform an operation before the exception occurs, so that secure and comfortable operation experience is achieved.

The foregoing and other aspects of this application are clearer and easier in descriptions of the following (a plurality of) embodiments.

BRIEF DESCRIPTION OF THE DRAWINGS

FIG. 5A-01 and FIG. 5A-02 show an exception recovery method according to an embodiment of this application;

FIG. 5B-01 and FIG. 5B-02 show an exception recovery method according to an embodiment of this application;

FIG. 9A, FIG. 9B-1, and FIG. 9B-2 respectively show a structure of a recovery apparatus and an example working procedure of the recovery apparatus according to an embodiment of this application;

FIG. 18A-01 and FIG. 18A-02 show an application exception recovery method according to an embodiment of this application and an application scenario of an application exception recovery apparatus according to the embodiment of this application;

FIG. 18B-01 and FIG. 18B-02 show an application exception recovery method according to an embodiment of this application and an application scenario of an application exception recovery apparatus according to the embodiment of this application.

DETAILED DESCRIPTION OF ILLUSTRATIVE EMBODIMENTS

Figure 1:
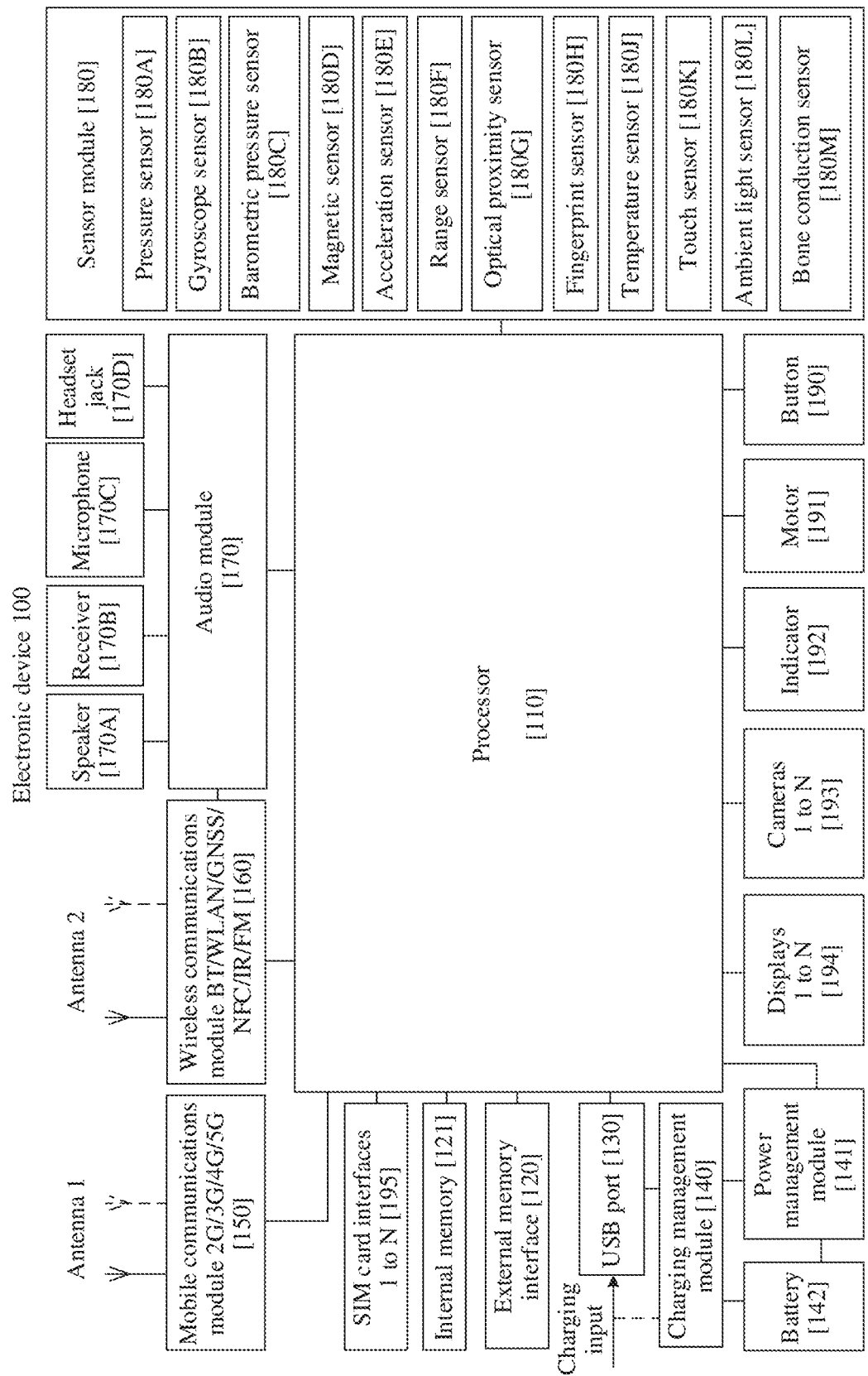
FIG. 1 is a schematic structural diagram of an electronic device 100 according to an embodiment of this application.

The following describes technical solutions in the embodiments of this application with reference to the accompanying drawings in the embodiments of this application. In descriptions of the embodiments of this application, unless otherwise specified, "/" means "or". For example, A/B may represent A or B. In this specification, "and/or" describes only an association for describing associated objects and represents that three relationships may exist. For example, A and/or B may represent the following three cases: Only A exists, both A and B exist, and only B exists. In addition, in the descriptions of the embodiments of this application, "a plurality of" means two or more than two.

The following terms such as "first" and "second" are merely intended for a purpose of description, and shall not be understood as an indication or implication of relative importance or implicit indication of a quantity of indicated technical features. Therefore, there is a limitation that features such as "first" and "second" may explicitly or implicitly include one or more features. In the descriptions of the embodiments of this application, unless otherwise specified, "a plurality of" means two or more than two.

All code in this application is an example. A person skilled in the art may think of various variations based on factors such as used programming language, a specific requirement, and a personal habit without departing from an idea of this application.

To clearly describe the embodiments of this application, concepts that may appear in some subsequent embodiments are first described.

Runtime (runtime): The runtime is also referred to as a runtime environment (runtime environment) or a runtime system (runtime system), and is an environment in which semi-compiled or fully compiled runtime code runs on a target machine.

Process (process): The process is a running activity of at least one application about a data set, and is a basic unit of performing resource allocation and scheduling by an operating system (for example, an Android® system). Each process occupies one address space, and the at least one application runs on the operating system in a form of one or more processes to implement a corresponding function.

Thread (thread): The thread is an entity of the process, and is a basic unit that is smaller than the process and that can run independently. Threads that belong to a same process can share all resources of the process. One thread can create and cancel another thread, and a plurality of threads in a same process can be executed concurrently.

Application thread (application thread): The application thread is a thread generated during running of the at least one application. After these threads are created, the runtime system mounts the threads to one list (list).

Application (application, APP): The application is at least one piece of application software that can enable a computing device to execute a task for a user of the computing device.

Activity: The activity is at least one application component that provides a screen for user interaction to complete a task. The activity is a basic unit for interaction between a user and an electronic device.

Intent: The intent is a mode of communication between components of at least one application in Android®. The intent usually describes a to-be-executed action and is usually used as a parameter. For example, when the at least one application needs to start an activity, an intent object needs to be defined to specify a to-be-started activity.

Bundle: The bundle is a package used for transferring information in the Android® system, and can be used to package any object that can be serialized and a basic type.

Snapshot (snapshot): The snapshot in this application is a copy of a displayed picture. A snapshot of a page is a copy of page display, that is, a screenshot of a currently displayed part of the page.

Event handler (Event handler): The event handler is a callback subfunction, and is used to process an input received in a program.

Native system: In this application, the native system is an operating system that is set before delivery in terms of application exception recovery. The operating system is usually provided by an electronic device manufacturer or an operating system supplier, and includes Android®, iOS®, Microsoft®, Windows®, and the like. For the Android® system, the native system means an Android open source project (Android Open-Source Project, AOSP).

system_server: system_server is a process that runs a service in the operating system, and is a basic service provider and a basic system running requirement. system_server is a name in Android®, and there may be another name in another operating system. However, if the name is essentially a basic service provider and a process that runs a service in the operating system, the name falls within a scope of the term system_server in this application.

Service (Service): The service is an application component that can run in the background of the electronic device and that does not have a user interface. The service can be invoked by another component.

Listen: A listener (callback function) or a similar signal collection apparatus is registered with an observed object. When the observed object is changed, a change notification can be automatically obtained.

Foreground display: Display is performed in a status that can be observed or perceived by the user, for example, an application that is interacting with the user. The display may also be expressed as display in the foreground, foreground display, and the like.

Crash (crash): The crash indicates that a user process or a system process exits because an exception occurs during execution.

An application exception recovery method provided in the embodiments of this application is run on the electronic device. An application exception recovery apparatus provided in the embodiments of this application is arranged in the electronic device. Corresponding to a product on the market, the electronic device may correspond to a smartphone, a portable phone, a game console, a television, a display unit, a head-up display unit used for a vehicle, a notebook computer, a laptop computer, a tablet personal computer (PC), a personal media player (PMP), a personal digital assistant (PDA), or the like. The electronic device may alternatively be implemented as a communications terminal having a communications module, and the communications terminal may communicate with an external electronic device such as a server, or may perform an operation by interacting with an external electronic device.

To facilitate understanding of the application exception recovery method and the application exception recovery apparatus provided in the embodiments of this application, an example structure of the electronic device and an example structure of a software structure of the electronic device are first briefly described with reference to FIG. 1 and FIG. 2.

FIG. 1 is a schematic structural diagram of an electronic device 100 according to an embodiment of this application.

The electronic device 100 may include a processor 110, a display 194, and a touch sensor 180K. The processor 110 may include a memory. Optionally, the electronic device 100 may further include an internal memory 121, an external memory interface 120, a USB port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a SIM card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, an ambient light sensor 180L, a bone conduction sensor 180M, and the like.

It can be understood that the structure shown in this embodiment of the present invention does not constitute a specific limitation on the electronic device 100. In some other embodiments of this application, the electronic device 100 may include more or fewer components than those shown in the figure, or may combine some components, or may split some components, or may have different component configurations. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (Neural-network Processing Unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further arranged in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call through a Bluetooth headset.

The PCM interface may also be configured to: perform audio communication; and sample, quantize, and encode an analog signal. In some embodiments, the audio module 170 may be coupled to the wireless communications module 160 through the PCM bus interface. In some embodiments, the audio module 170 may alternatively transfer an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect to the processor 110 and the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music through a Bluetooth headset.

The MIPI interface may be configured to connect to the processor 110 and a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect to the processor 110, the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is a port that conforms to USB standard specifications, and may be specifically a mini USB port, a micro USB port, a USB type C port, or the like. The USB port may be configured to connect to a charger to charge the electronic device 100, or may be configured to transmit data between the electronic device 100 and a peripheral device, or may be configured to connect to a headset to play audio through the headset, or may be configured to connect to another electronic device such as an AR device.

It can be understood that an interface connection relationship between the modules shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger.

A wireless communication function of the electronic device 100 may be implemented through the antenna module 1, the antenna module 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands.

The mobile communications module 150 may provide a solution, applied to the electronic device 100, to wireless communication including 2G, 3G, 4G, 5G, or the like. In some embodiments, at least some function modules of the mobile communications module 150 may be arranged in the processor 110. In some embodiments, at least some function modules of the mobile communications module 150 and at least some modules of the processor 110 may be arranged in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing.

The wireless communications module 160 may provide a solution, applied to the electronic device 100, to wireless communication including a wireless local area network (wireless local area networks, WLAN), Bluetooth (bluetooth, BT), a global navigation satellite system (global navigation satellite system, GNSS), frequency modulation (frequency modulation, FM), near field communication (near field communication, NFC), an infrared (infrared, IR) technology, or the like.

The electronic device 100 implements a display function by using the GPU, the display 194, the application processor, and the like. The GPU is a microprocessor for image processing, and connects to the display 194 and the application processor. The GPU is configured to: perform mathematical and geometric calculation, and perform graphics rendering. The processor 110 may include one or more GPUs that execute a program instruction to generate or change display information.

The display 194 is configured to display an image, a video, and the like. The display 194 includes a display panel. The display panel may be an LCD (liquid crystal display, liquid crystal display), an OLED (organic light-emitting diode, organic light-emitting diode), an active-matrix organic light emitting diode (active-matrix organic light emitting diode, AMOLED), a flexible light-emitting diode (flex light-emitting diode, FLED), Miniled, MicroLed, Micro-oLed, a quantum dot light emitting diode (quantum dot light emitting diodes, QLED), or the like. In some embodiments, the electronic device 100 may include one or N displays, where N is a positive integer greater than 1.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The memory 121 may include a program storage area and a data storage area. The program storage area may store an operating system, an application required by at least one function (for example, a sound play function or an image play function), and the like. The data storage area may store data (for example, audio data and a phone book) created when the electronic device 100 is used, and the like. In addition, the memory 121 may include a high-speed random access memory, or may include a non-volatile memory, for example, at least one magnetic disk storage device, a flash memory, or a universal flash storage (universal flash storage, UFS).

The touch sensor 180K is also referred to as a "touch panel". The touch sensor 180K may be arranged in the display 194. The touch sensor 180K and the display 194 constitute a touchscreen that is also referred to as a "touchscreen". The touch sensor 180K is configured to detect a touch operation performed on or near the touchscreen. The touch sensor may transfer the detected touch operation to the application processor, to determine a type of a touch event, and may provide a corresponding visual output related to the touch operation through the display 194. In some other embodiments, the touch sensor 180K may also be arranged on a surface of the electronic device 100 at a position different from that of the display 194.

The button 190 includes a power button, a volume button, and the like. The button may be a mechanical button, or may be a touch button. The electronic device 100 may receive a button input, and generate a button signal input related to a user setting and function control of the electronic device 100.

A software system of the electronic device 100 may use a layered architecture, an event-driven architecture, a microkernel architecture, a micro service architecture, or a cloud architecture. In this embodiment of the present invention, an Android® system with a layered architecture is used as an example to illustrate the software structure of the electronic device 100.

Figure 2:
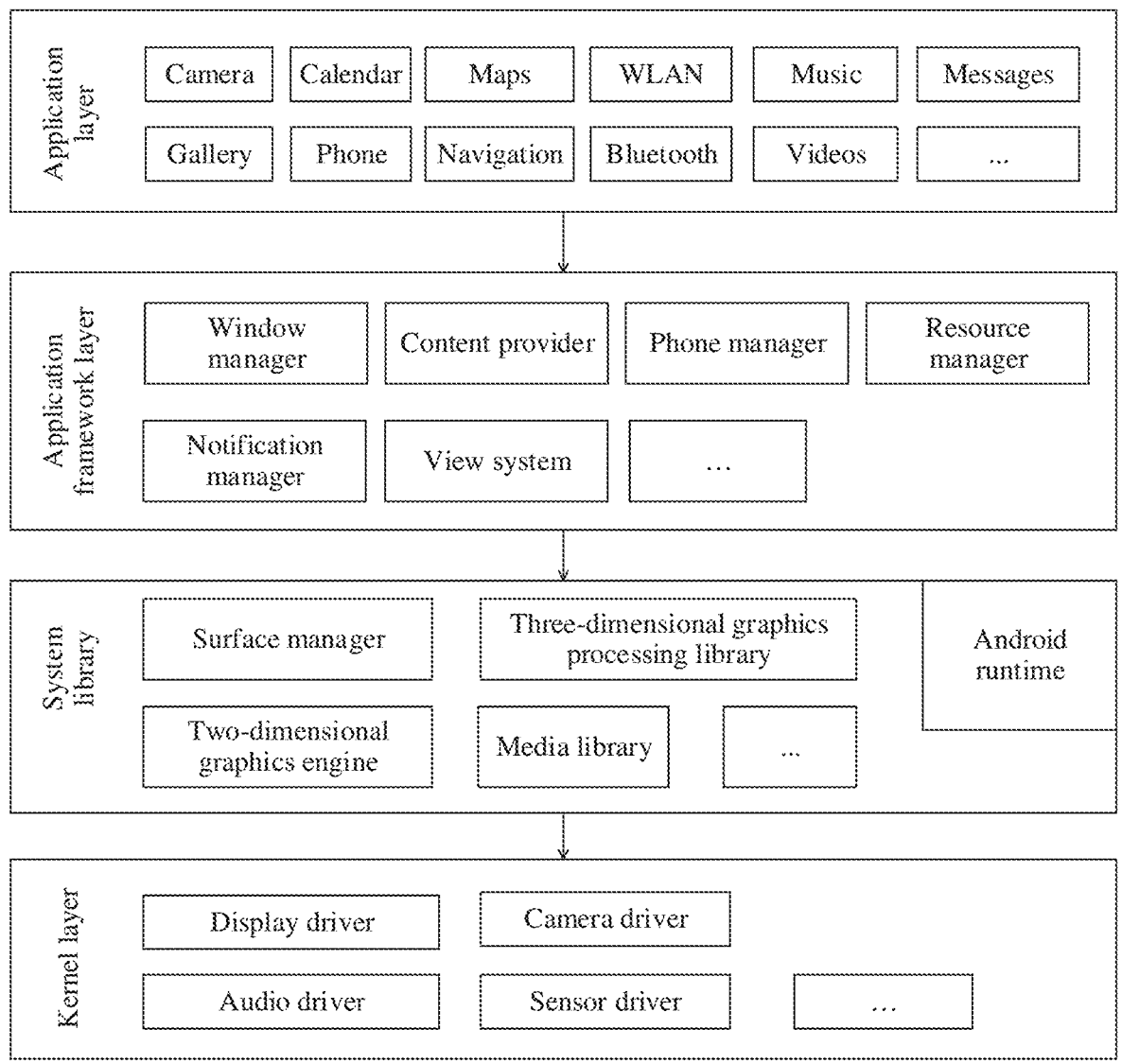
FIG. 2 is a block diagram of a software structure of an electronic device 100 according to an embodiment of the present invention.

FIG. 2 is a block diagram of the software structure of the electronic device 100 according to an embodiment of the present invention.

In the layered architecture, software is divided into several layers, and each layer has a clear role and task. The layers communicate with each other through a software interface. In some embodiments, the Android® system is divided into four layers: an application layer, an application framework layer, an Android® runtime (Android® runtime) and system library, and a kernel layer from top to bottom.

The application layer may include a series of application packages.

As shown in FIG. 2, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

Figure 4:
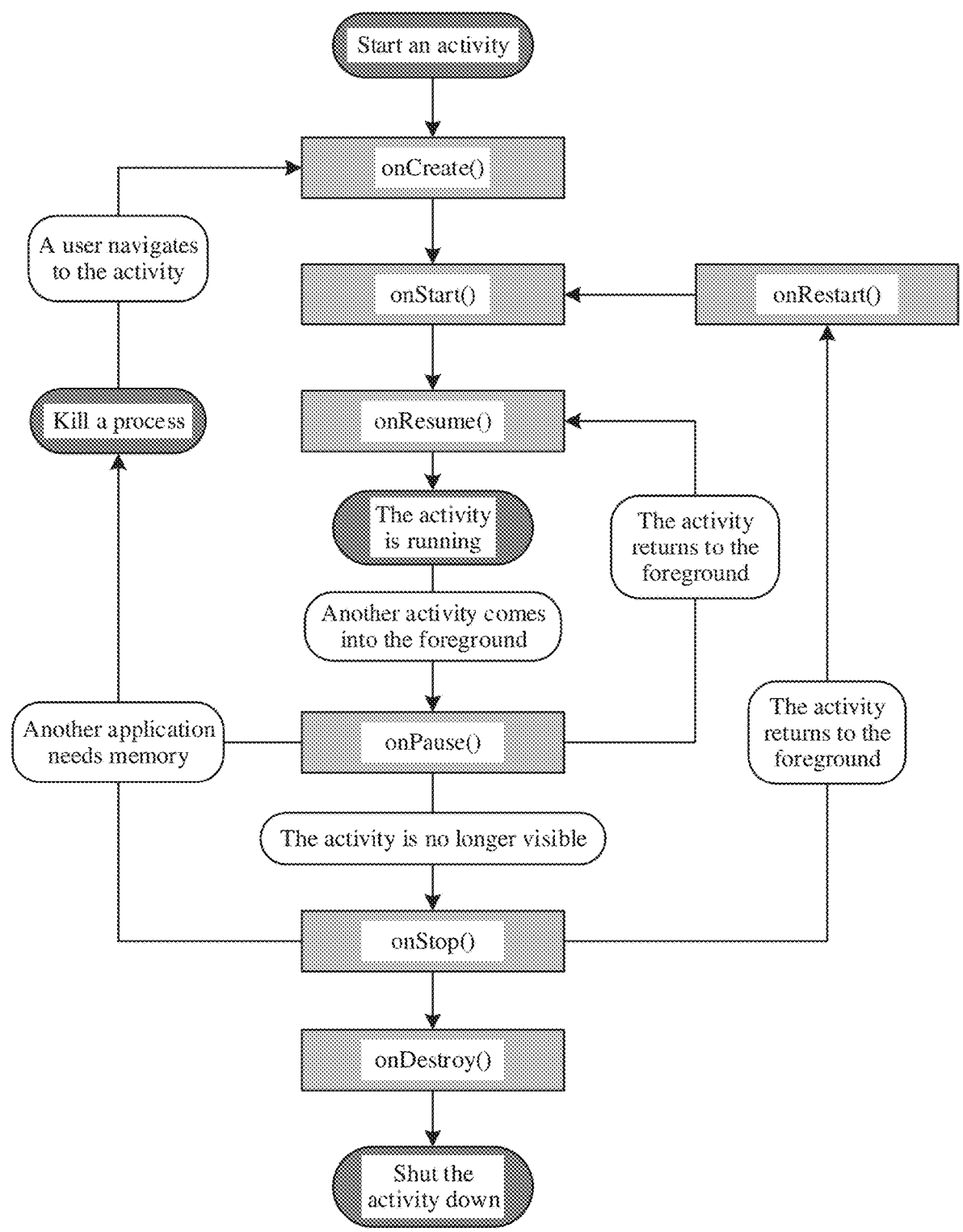
FIG. 4 shows a lifecycle of an activity.

As shown in FIG. 4, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, an address book, and the like.

The view system includes visual controls such as a control for text displaying and a control for image displaying. The view system may be configured to construct an application. A display interface may include one or more views. For example, a display interface including a notification icon of Messages may include a text display view and an image display view.

The phone manager is configured to provide a communication function of the electronic device 100, for example, management of a call status (including answering or declining).

The resource manager provides various resources for an application, for example, a localized string, an icon, an image, a layout file, and a video file.

The notification manager enables an application to display notification information in a status bar, and may be configured to convey a notification message. The notification manager may automatically disappear after a short pause without requiring user interaction. For example, the notification manager is configured to: notify download completion, provide a message notification, and the like. The notification manager may alternatively be a notification that appears in a top status bar of the system in a graph form or a scroll bar text form, for example, a notification of an application running on the background or a notification that appears on a screen in a form of a pop-up box. For example, text information is prompted in the status bar, an alert sound is produced, the electronic device vibrates, or an indicator light blinks.

The Android® runtime includes a core library and a virtual machine. The Android® runtime is responsible for scheduling and management of the Android® system.

The core library includes two parts: a function that needs to be invoked in Java language and a core library of Android®.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Currently, in the electronic device, for example, in an intelligent terminal product, a quantity of applications installed by a user is increasing, sources of the applications are different, and stability degrees of these applications are also different. Application exceptions such as an application crash and application not responding are problems that greatly affect user experience.

Figure 3:
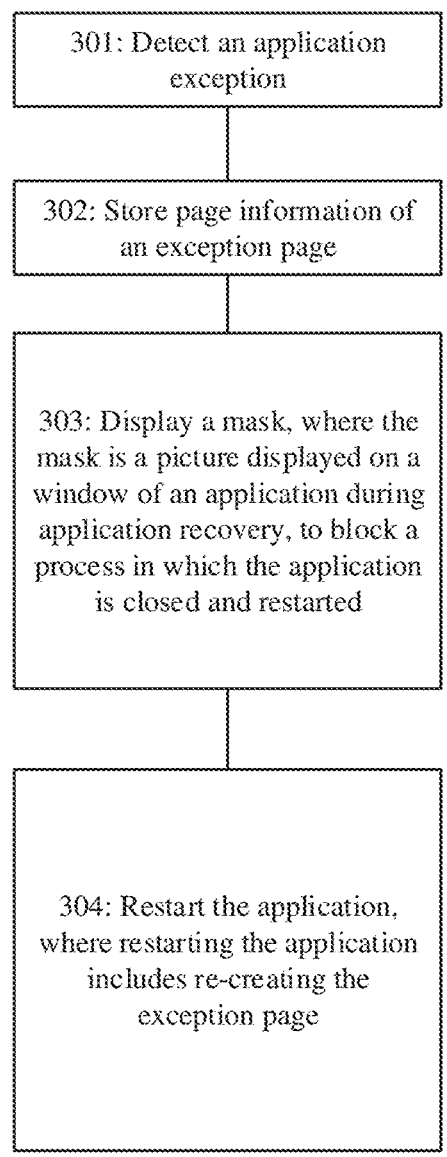
FIG. 3 is a flowchart of an application exception recovery method according to an embodiment of this application.

FIG. 3 is a flowchart of an application exception recovery method according to an embodiment of this application. In step 301, an application exception is detected. The application exception may include an application crash and application not responding.

The application crash means abnormal running stop of an application, and represents that the application crashes or stops running. The application crash is mainly caused by the following factors: Temporary application data is damaged, external data is abnormal, timing is inconsistent, resources are leaked, an operation that is not allowed by an operating system is performed, and the like. The application crash is further classified into a Java crash and a native crash. The native crash is also referred to as tombstone. The Java crash means that an exception that leads to a crash occurs in application code that can be run on a virtual machine, and generally means that an exception occurs in code written in Java. The native crash means that an exception that leads to a crash occurs in application code that cannot be run on a virtual machine, and generally means that an exception occurs in code written in C or C++.

The application not responding means that an application does not respond to a user operation within specified duration such as 5s. For example, a new message in WeChat is not displayed after being tapped, or a camera is not started after a camera application icon is tapped. This type of application not responding is referred to as ANR (Application Not Responding) in an Android® operating system.

In step 302, page information of a page displayed by at least one application when the exception occurs is stored. For ease of description, a page displayed by an application when an exception occurs is referred to as an exception page for short below. The page information includes redirection information used to redirect to the page to which the page information belongs and user operation information on the page to which the page information belongs. The redirection information is included in an intent, and the user operation information is included in a bundle. Basic drawing information of each page is stored in a program package of the at least one application. Therefore, only information that indicates a to-be-started page, that is, the intent, and impact exerted by the user on the page, that is, the bundle, need to be stored, so that the page can be completely reproduced.

The intent is a common data transmission structure provided by the Android® operating system for communication between activities or between the operating system and an activity. In this application, the activity may be equivalent to a page. Specifically, the activity is an application component, and the user may interact with a screen provided by the activity, to perform an operation, for example, make a call, take a photo, send an email, or view a map. Each activity obtains a window for drawing a user interface of the activity. Therefore, the activity is a basic unit for application user interface interaction.

To better understand an intent mechanism and help understand the following further descriptions of a manner of storing an intent and a bundle, a lifecycle of an activity is described herein, as shown in FIG. 4. Two callback methods onCreate( ) and onDestroy( ) respectively correspond to page creation and page destroy; onStart( ) and onStop( ) respectively indicate that a page is visible and a page is no longer visible; and onResume( ) and onPause( ) respectively indicate that a page is editable (focusable) and a page is not editable (not focusable). If a page is not in onDestroy (destroyed) after the page is in onStop (no longer visible), onRestart( ) is invoked when the page is started again. If a page is in onDestroy, onCreate( ) is invoked when the page is started again. A Google native system further provides a group of SDK (software development kit, SDK) interfaces onSaveInstanceState( ) and onRestoreInstanceState( ) of an application for interaction between the operating system and the application. This group of interfaces is mainly used to store some states in the activity, for example, various user interface (user interface, UI) states in the activity. onSaveInstanceState( ) is executed immediately after onPause( ) or onStop( ), and onRestoreInstanceState( ) is executed between onStart( ) and onResume( ). In other words, when the activity is destroyed and re-created by the "system", these UI states may be stored by the system.

When an application needs to start a page, an intent needs to be defined first to specify a to-be-started page. In this implementation, an intent of the exception page is, for example, Intent {act=Android®.intent.action.MAIN cat=[Android®.intent.category.LAUNCHER] flg=0x10200000 cmp=com.example.z00371290.myapplication/.MainActivity bnds=[16,1652][297,2037]}, where an application and a page to which the intent belongs are specified. The intent is created by using new Intent( ), and then the page can be started based on an object of the intent by invoking startActivity( ). Sample code is startActivity (intent). Therefore, the intent of the exception page is stored in step 502, to prepare for recovery to the exception page. For example, in response to the application exception, the intent of the exception page may be obtained by using activity.getIntent ( ), where getIntent is a function name, and "activity" is an object executed by using the function and is the exception page herein.

After the page is displayed, the user may exert impact on the page through, for example, editing, and the impact exerted by the user is stored in the bundle. The bundle is a package used for transferring information in the Android® system, and can be used to package any object that can be serialized and a basic type. Generally, one bundle may be created by using a bundle bundle=new Bundle( ). The bundle may be transferred across processes by using the intent. The bundle may be integrated into the intent for transferring and invoking by using Intent.putBundleExtra( ). In step 302, the bundle of the exception page may also be stored, so that not only recovery to the exception page is implemented during recovery, but also the impact exerted by the user on the page when the exception occurs such as an entered character can be recovered after the recovery. Therefore, the user is more unaware of exception occurrence and page recovery. However, storing a bundle is not mandatory but optional.

For example, in response to the application exception, onSaveInstanceState( ) described in FIG. 4 is invoked to store the bundle. Sample code is as follows:
@Override
public void onSaveInstanceState(Bundle outState, PersistableBundle outPersistentState) {
super.onSaveInstanceState(outState, outPersistentState);
Herein, }outstate is an externally transferred container for storing; outPersistentState is used for a persistent process; super indicates that a parent class is also stored in the foregoing code; and outState is a container transferred from the outside of the activity, and is used by the activity to load bundle information into the container. In addition, outPersistentState is also an externally transferred container. When the application sets a persistent attribute R.attr.persistableMode for the activity, outPersistentState is used by the activity to load persistent bundle information, so that the information can be used when the activity is started next time. If a target activity is not persistent, NULL (null) may be transferred to the container. Moreover, super indicates that parent class information is also stored.

During code execution, in other words, when onSaveInstanceState( ) is invoked, states of all controls of the activity are stored recursively. It should be noted that a focus such as a cursor may not be stored in this process. Whether a focus can be stored depends on whether an application to which a page belongs provides a focus storing function for the control.

In step 302, the page information may be stored by an application process, and then the application process may transmit the page information to a system process such as a preset exception service process in the system by using a cross-process communication mechanism such as AIDL (Android® interface definition language). In some other implementations, the page information may alternatively be directly stored by the system process.

In step 303, a mask is displayed, where the mask is a picture displayed on a window of the application during application recovery, to block a process in which the application is closed and restarted. A display range of the mask may also be an entire screen.

In terms of mask selection, whether the application specifies a picture as the mask may be queried. When learning that the exception occurs, the application provides a preset picture such as an interesting picture by using, for example, a function Snapshot onAppErrorHappened( ), to alleviate user discomfort during application recovery. The application may invoke a specified interface to implement cross-process communication with an application exception recovery service on a system side by using the AIDL, to provide the recovery service with provided picture data. Then, the recovery service invokes addWindow( ) to enable a window manager to cover the window of the application with the picture.

When it is queried that the application does not specify a picture as the mask, a snapshot of the exception page may be used as the mask, so that the user feels that the exception page is not lost. For example, when learning that the exception occurs, the application initiates reading of the snapshot of the exception page by using the following code:

HwTaskSnapshotWrapper
snapshotWrapper=HwWindowManager.getForegroundTaskSnapshotWrapper(true);

In this case, the exception service on the system side reads the snapshot of the exception page in windowstate in a windows manager at a system framework layer, and uses addWindow( ) to enable the window manager to cover the window of the application with the snapshot. In some implementations, when learning that the exception occurs, the application first determines whether the snapshot of the currently displayed exception page is suitable to be obtained. A page such as a security-related page is labeled with a security label by an application, for example, WindowManager.LayoutParams.FLAG_SECURE. The application considers that a snapshot of such a page is not suitable to be obtained, and therefore does not initiate the foregoing reading of the snapshot of the exception page.

Sample code for displaying the mask is as follows:
info.snapshotWindow=new CrashSnapshotWindow(mContext, snapshot, info.packageName);
It means that a specified picture snapshot is used to create an interface first, and then the interface is displayed by using a pop-up mechanism of the operating system.

In step 304, the application is restarted, where restarting the application includes re-creating the exception page; and the mask is removed to display the exception page after the exception page is created and can be displayed. The application may be started by invoking an interface startActivities( ), for example, by using a statement startActivities (Intent[ ] intents, Bundle options). The intents include a set of intents of a to-be-created page, for example, those described in step 502. The intent herein may also carry a bundle. The intents may be designed as follows: The intent of the exception page is read first during restart, so that the exception page is created first, thereby implementing recovery to the exception page.

In addition, the system does not automatically integrate the bundle into the intent when storing the page information, and accordingly, the bundle is not automatically obtained and used during page re-creation. Therefore, after startActivities( ) is invoked, the bundle may be obtained from the intent and loaded into r.state by using, for example, the following code:

Bundle prevStoredState=r.intent.getBundleExtra("hwerecovery_bundle");
if (prevStoredState !=null) {
if(Log.HWINFO) {
Log.i("onAppCrashing", "ActivityThread restore prevStoredState:"+prevStoredState);
}
r.state=prevStoredState;
{
Then, r.state is used as an input parameter during page creation:
@Override
protected void onCreate(Bundle r.state) {
super.onCreate(r.state);
}
All code in this application is an example. A person skilled in the art may think of various variations based on factors such as used programming language, a specific requirement, and a personal habit without departing from an idea of this application.

After the exception page is created and can be displayed, the mask is no longer needed, and the window of the application needs to be vacated to display the exception page. Therefore, the window manager is notified to remove the mask and display the exception page. For example, the application notifies the application exception service on the system side after the application is restarted and the exception page can be displayed. The notification may be performed by starting a completed flag (flag), or by calling back ApplicationIdle, or by calling back ApplicationFullyDrawn. After the application exception service learns that the restart is completed, the application exception service indicates, for example, by using info.snapshotWindow.dismiss( ), the window manager to remove the mask.

The entire recovery process usually consumes 100 ms to 2 s. Therefore, the user only sees an interesting picture or stays on the exception page for a short period of time, and then can perform previous work including continuing to edit unfinished text, without being disturbed by the application exception.

Figures 1, 5A:
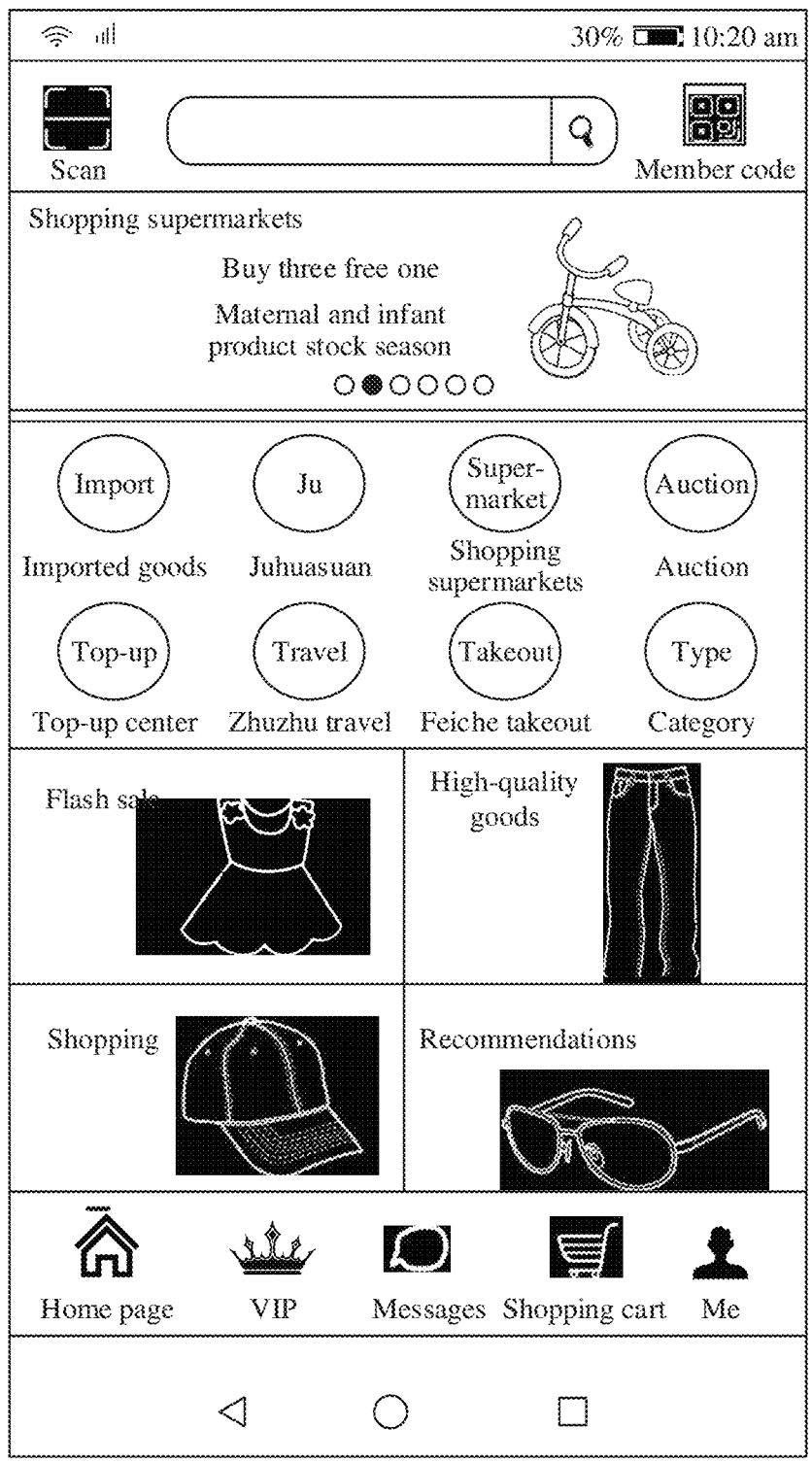
Figures 2, 5A:
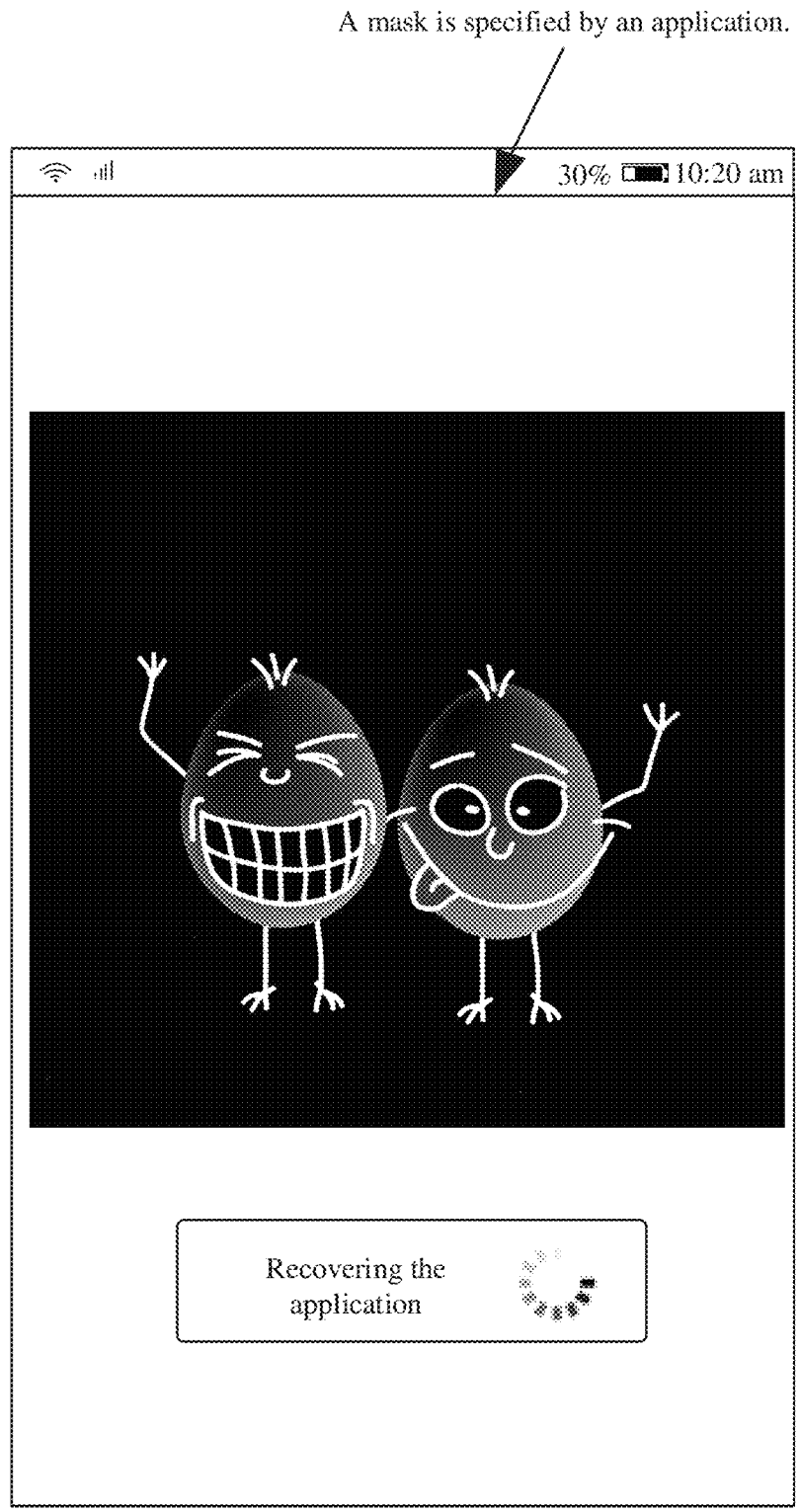

FIG. 5A-01 and FIG. 5A-02 show an exception recovery method according to an embodiment of this application. FIG. 5A-01 shows a home page of a shopping application displayed on the foreground. The application crashes. In the recovery method in FIG. 3, in step 303, it is queried whether a specific picture or information about a specified page is obtained from the application as the mask. If a picture provided by the application is obtained, the picture is displayed as the mask. For example, as shown in FIG. 5A-02, the application provides an interesting picture as the mask, and a recovery apparatus displays the picture in a manner of hiding a navigation bar. For example, a callback function activity.getAppErrorSnapshot is added to an activity class in the operating system. Therefore, after learning that the exception occurs, the application invokes the function activity.getAppErrorSnapshot before storing page information, and provides a running result for the service related to exception recovery. The running result is null, or is a specified picture, or is information about a specified page. If the running result is null, it indicates that the mask is not specified; or if the running result is a specified picture or information about a specified page, it indicates that the mask is specified. If information about a specified page is obtained, a snapshot of the page is obtained as the mask.

Figures 1, 5B:
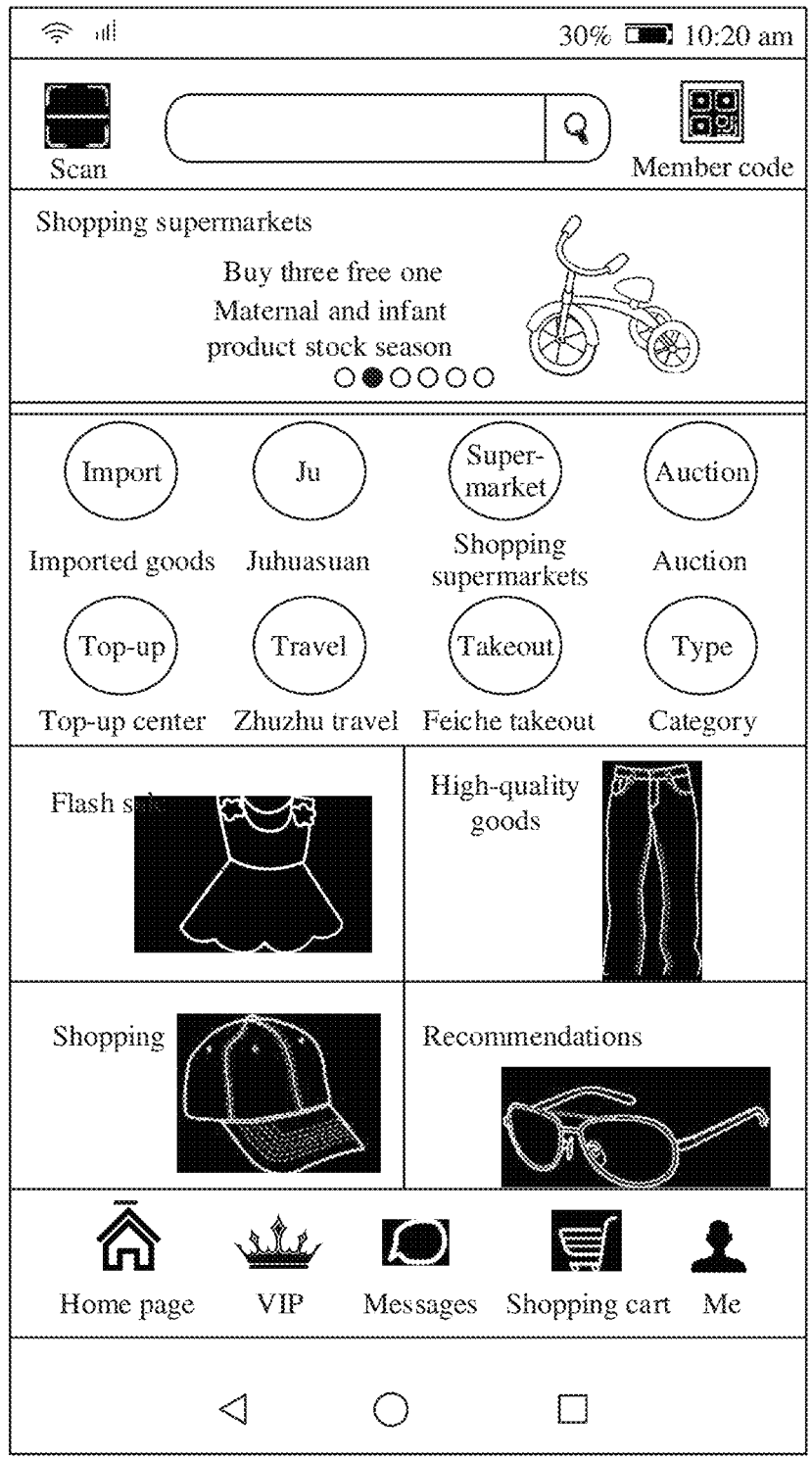
Figures 2, 5B:
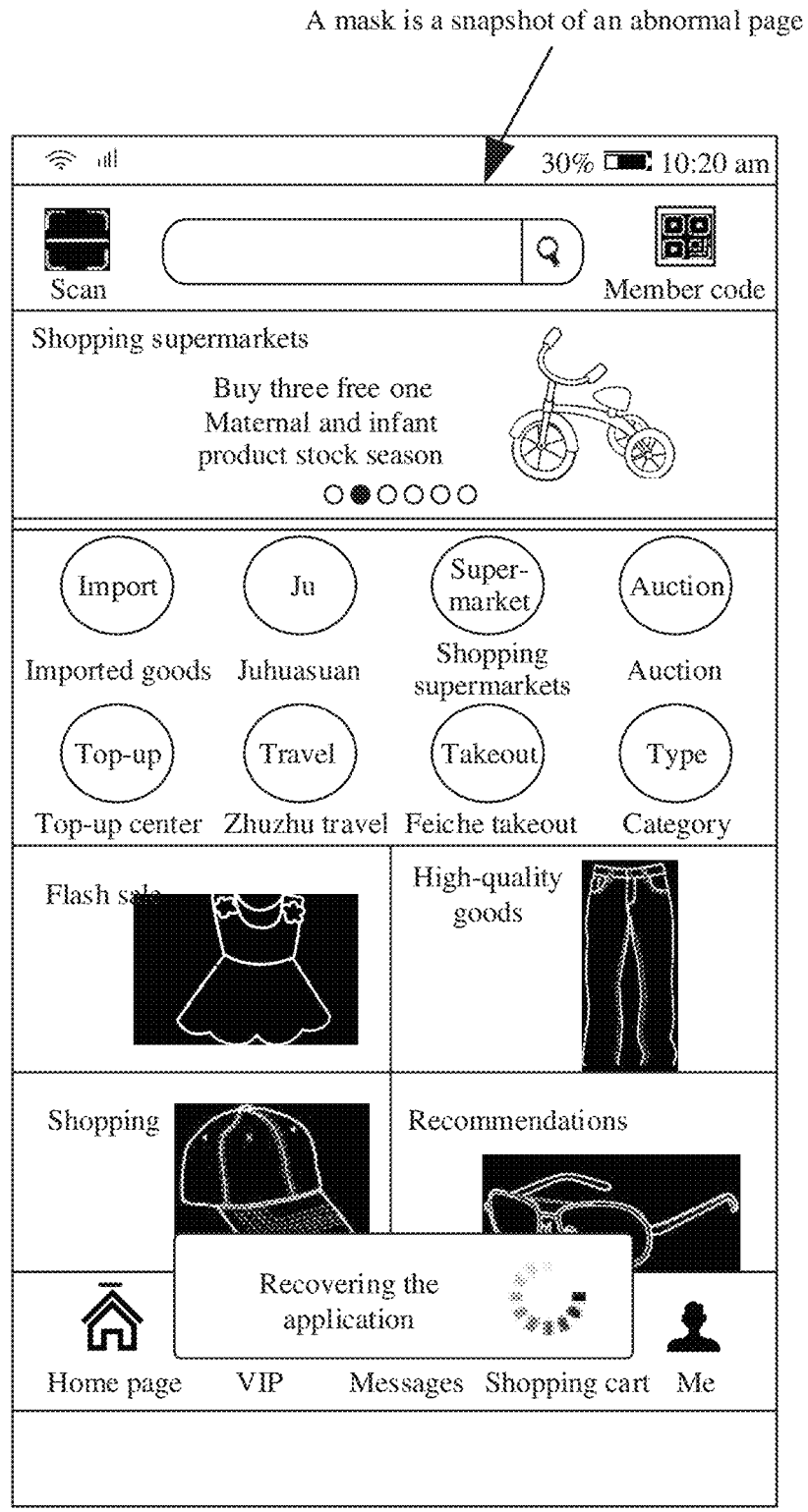

FIG. 5B-01 and FIG. 5B-02 show an exception recovery method according to an embodiment of this application. FIG. 5B-01 shows a home page of a shopping application displayed on the foreground. The application crashes. In the recovery method provided in FIG. 3, in step 303, it is queried whether the application provides a specific picture as the mask; and if the application does not provide a picture, the application obtains a snapshot of an exception page from Windowstate as the mask, as shown in FIG. 5B-02. In some implementations, the system extracts one frame of TOP from BufferQueue of a current application layer layer and puts the frame into a backup graphics buffer (Graphics buffer), and then the window manager creates one system activity and one snapshot window and binds a previously stored screenshot graphics buffer without performing any copying operation. This reduces system memory overheads.

Figure 6:
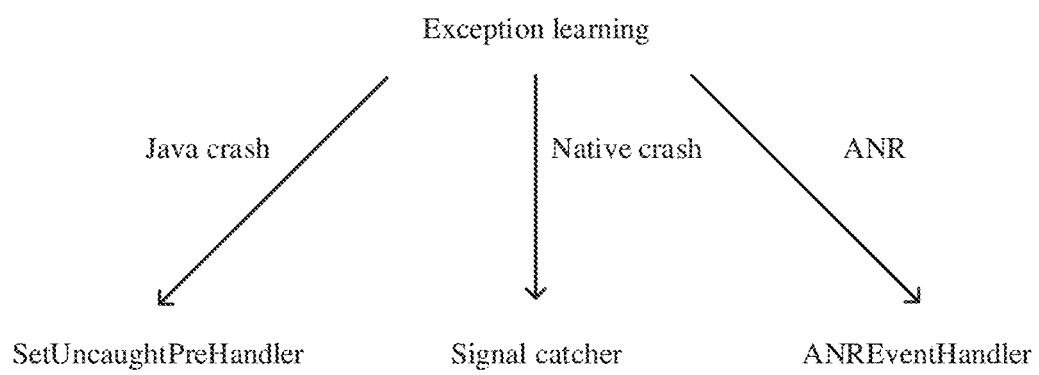
FIG. 6 shows an exception learning method according to an embodiment of this application.

FIG. 6 shows an exception learning method according to an embodiment of this application. Exceptions are classified into a Java crash, a native crash, and ANR.

For the Java crash, the Google native system provides an interface UncaughtExceptionHandler, and the interface includes a pure virtual function: public abstract void uncaughtException (Thread thread, Throwableex). When an uncaught exception that causes the Java crash occurs, the system notifies UncaughtExceptionHandler of an ended thread and the corresponding exception, and then invokes the function uncaughtException. For example, in an Android® system, it means that a pop-up box used to notify the application crash pops up, and an application process is to be ended. According to the recovery method and the recovery apparatus in this application, the native pop-up box is expected to be intercepted, thereby avoiding interference to the user. Therefore, according to the recovery method and the recovery apparatus in this application, a user-defined handler is implemented, the handler inherits the UncaughtExceptionHandler interface, and a user-defined uncaughtException method is implemented.

static class SetUncaughtPrehandler implements UncaughtExceptionHandler{
  @Override
  public void uncaughtException(Thread thread, final Throwable throwable) {
    // Deal this exception
  }
{
SetUncaughtPrehandler may be registered with runtime, so that SetUncaughtPrehandler runs in the application process. Therefore, SetUncaughtPrehandler instead of system-default UncaughtExceptionHandler is notified when an uncaught exception is found, so that the exception is learned of in time, and the native prompt pop-up box is intercepted.

For the native crash, the native system directly exits the process without setting a notification mechanism. According to the recovery method and the recovery apparatus in this application, a user-defined signal catcher is implemented. The signal processing function is registered by using sigaction( ), to implement the user-defined signal catcher. For example, the user-defined signal catcher is named my_sigaction. my_sigaction is registered with runtime, so that my_sigaction runs in the application process. my_sigaction may detect standard exceptions such as SIGILL, SIGTRAP, SIGABRT, SIGBUS, SIGFPE, SIGSEGV and SIGSTKFLT, and may also detect user-defined exceptions.

For the ANR, for example, two services activity manager and window manager are used in the Android® system to monitor an application, and an ANR dialog box cannot pop up when an input event (a button or a touch) cannot be responded to within 5 s and a broadcast receiver cannot end running within 10 s. According to the recovery method and the recovery apparatus in this application, the ANR is expected to be learned of earlier than the two system services, so as to intercept the ANR dialog box provided by the system. Therefore, according to the recovery method and the recovery apparatus in this application, an event handler ANREventHandler is registered with runtime, so that the event handler ANREventHandler runs in a fault detection thread. The thread can detect the application process (running of a message queue in a user interface thread), and process a system fault notification sent from the system side, to prompt the application whether the ANR occurs. ANREventHandler detects message processing duration of a main message queue in a process to determine whether the ANR occurs.

Figure 7:
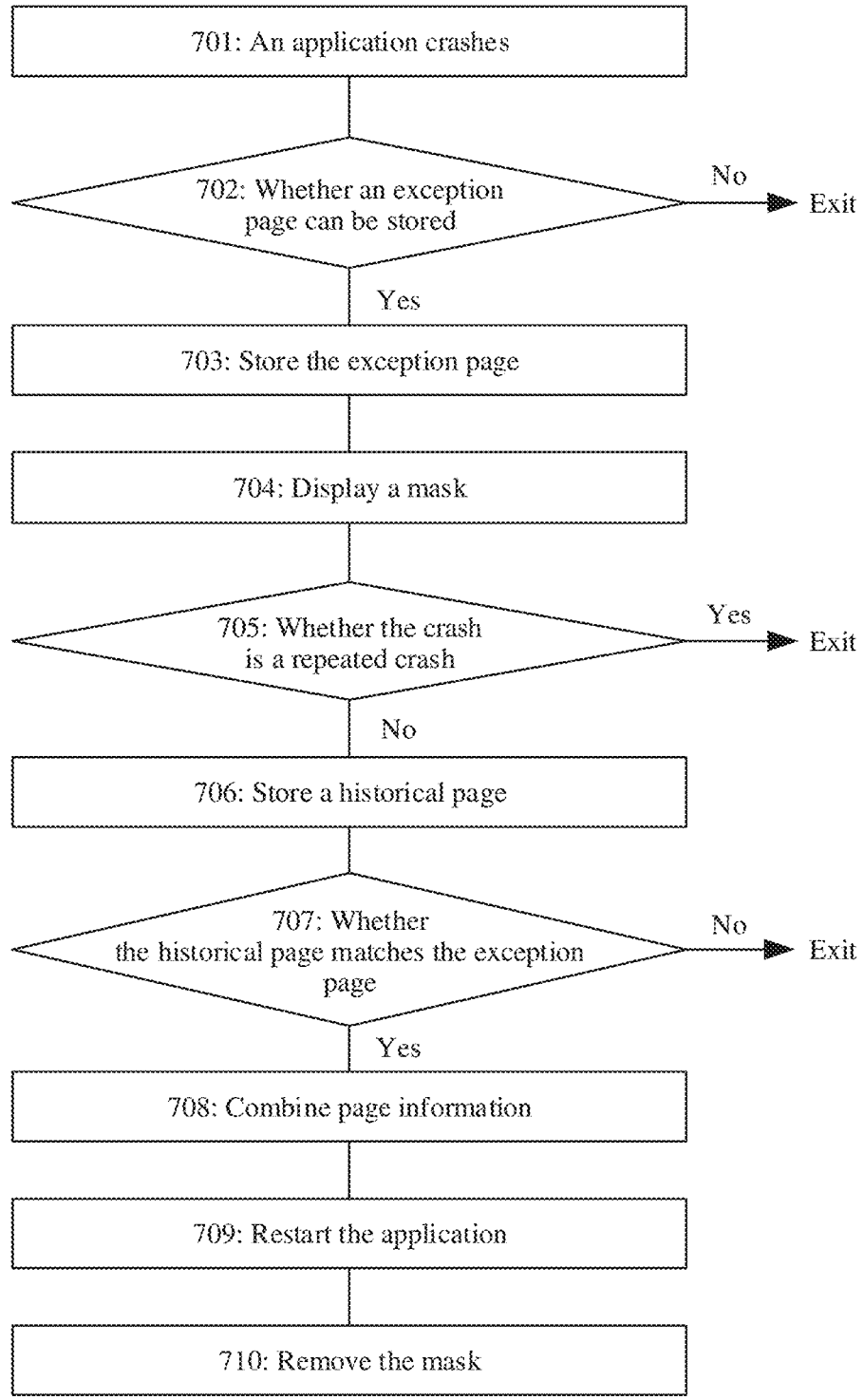
FIG. 7 shows an application exception recovery method according to an embodiment of this application.

FIG. 7 shows an application exception recovery method according to an embodiment of this application. In step 701, an application crash is detected. For example, SetUncaughtPrehandler running in an application process detects an uncaughtexecption notification sent by a system, or a signal catcher running in an application process detects an exception that causes tombstone.

In step 702, it is checked whether application information of an exception page can be stored. A page security label such as WindowManager.LayoutParams.FLAG_SECURE is described in step 303 in FIG. 3. The label is intended to prevent a snapshot of the page from being obtained. In this embodiment, the label is further used as a criterion for determining whether page information of the exception page can be stored. Specifically, if the exception page has a security label, it is considered that the page information of the exception page cannot be stored; or if the exception page has no security label, it is considered that the page information of the exception page can be stored. A page having a security label is usually a security-related page, for example, a payment page. In this embodiment, it is considered that operation confusion such as repeated payment may be caused if the security-related page is recovered. Therefore, the security-related page is not recovered. If it is determined that the page information of the exception page cannot be stored, a procedure of the method is ended. After the exception recovery procedure is ended, the native system processes the application crash. Generally, the processing procedure is as follows: The native system performs a cleanup operation in ActivityManagerService, where the cleanup operation includes cleaning up page information, stack information, and the like of an application and ending the process of the application. Whether to restart the application after the process of the application is ended is managed by the native system.

In step 703, the page information of the exception page is stored, where storing the page information of the exception page includes storing intent information of the exception page and optionally storing bundle information of the exception page. For details, refer to the descriptions of step 302 in FIG. 3. Details are not described herein again.

In step 704, a mask is displayed on at least a window of the application, where the mask may be a picture provided by the application, or may be a snapshot of the exception page. For details, refer to the descriptions of step 303 in FIG. 3. Details are not described herein again.

In step 705, it is checked whether the current crash is a repeated crash, and the procedure of the method is ended if the current crash is a repeated crash, or the method is continued if the current crash is not a repeated crash. The repeated crash means, for example, that a time interval between a current crash and a previous crash is within specific duration such as 1 min based on system_server records in the operating system of the electronic device. In some other possible implementations, when the repeated crash is detected, a pop-up box is used to indicate that at least one application repeatedly crashes, a recovery operation such as upgrade, uninstallation and reinstallation, or buffer clear needs to be performed for first duration, and then the procedure of the method is ended. When the repeated crash occurs, the at least one application is restarted to the exception page, but the user may still encounter another crash after a few operations. Therefore, in this implementation, a step of detecting the repeated crash is provided; and when the repeated crash occurs, the procedure of the method is directly ended, or a detection result of the repeated crash is notified to the user and the procedure of the method is ended after an available recovery method is prompted.

In step 706, page information of a historical page is stored. The historical page means all pages that are displayed between a moment at which the at least one application is started and a moment at which a previous page of the exception page is displayed. In this way, it is possible that restart to the exception page is implemented, and at least a part of a path on which the at least one application is restarted to the exception page when the exception occurs can be further recovered when the user presses a back button on the recovered exception page. Specifically, although all pages from the exception page to a start page are loaded into the page information array, whether a part or all of the path can be recovered when the back button is pressed depends on application settings. For some applications, rollback from a current page to a start page may be implemented by using the back button. However, for some other applications, when the back button is pressed on a specific page, the application directly exits and a home screen of the electronic device is switched to. For example, in WeChat, by pressing a back button on a Moments entry page, a home page of WeChat, that is, a start page, cannot be displayed, but WeChat exits and a home screen of an electronic device on which WeChat is installed is switched to. The page information of the historical page is read from ActivityManagerService. ActivityManagerService is a service provided by the operating system and automatically records page information generated during application running.

In step 707, it is checked whether the historical page matches the exception page, in other words, whether the historical page and the exception page belong to a same application, and the procedure of the method is ended if the historical page and the exception page do not belong to a same application, or the method is continued if the historical page and the exception page belong to a same application. For example, if a camera page crashes when a camera application is invoked by tapping a camera icon during use of WeChat, the historical page and the exception page do not belong to a same application. When WeChat is restarted, the system cannot automatically invoke the camera from WeChat, and the camera can only be invoked during restart of WeChat. In some other implementations, step 707 is omitted, in other words, even if the exception page and the historical page belong to different applications, it is considered that an application to which the exception page belongs can be automatically invoked when an application to which the historical page belongs is restarted.

In step 708, the page information of the historical page and the page information of the exception page are combined. The page information of the historical page and the page information of the exception page are stored separately, for example, are stored in the following data structure:
public static final class CrashedAppInfo {
. . .
//foreground activity of the application crash/page intent
Intent lastShowingActivityIntent;
//intent of the stored historical page
ArrayList<Intent> intents;
. . .
}
Currently, in step 708, the page information of the historical page and the page information of the exception page are constructed into an array in a form of a stack, which is named, for example, intents. The page information of the historical page is put into the stack first, and the page information of the exception page is pushed on the top of the stack. Therefore, when the array is read, the page information of the exception page is read first, so that the exception page can be created first.

In step 709, the application is restarted based on the array intents constructed in step 708, where the application is restarted by using a method start_activities provided by the operating system. For example, the application is restarted by using a statement context.startActivities(intents.toArray (new Intent[intents.size()])), where the intents are converted into an array type array with a limited length by using a method toArray, and then the array is transferred to start_activities as an input parameter.

In step 710, the mask is removed, so that the re-created exception page can be displayed on the window of the application. When the exception page is created and can be displayed, in other words, after onCreate( ) and onStart ( )/onResume( ) are executed for the exception page, a window manager is notified to remove the mask, so that the exception page can be displayed on the window of the application on the foreground. If the bundle is stored in step 706, impact exerted by the user on the exception page when the exception occurs is still retained on the re-created exception page, for example, text that is not completely edited, and the user may continue to perform editing on the re-created exception page. The exception page is re-created based on the combination of the historical page and the exception page. Therefore, when the user presses the back button on the re-created exception page, at least some of operations performed by the user when the application is restarted to the exception page can be reversely reproduced, as if the exception does not occur.

In some other implementations, a step of intercepting an application exception pop-up box may be further inserted between step 707 and step 708. This implementation is applicable to an operating system that automatically displays a pop-up box to prompt an application exception. If it is learned that the current crash is not a repeated crash, and the historical page and the exception page belong to the same page, it is considered that an application restart condition is met, so that the pop-up box is redundant and intercept.

FIG. 7 describes an embodiment of a recovery method by using an application crash as an example. In some other implementations, the recovery method in FIG. 7 and the recovery method corresponding to the explanation in FIG. 7 are also applicable to ANR after step 705 is removed. A sequence of performing steps 704, 705, and 706 may be adjusted randomly. For example, step 705 is performed first to query whether the repeated crash occurs, step 704 is performed to display the mask, and then step 706 is performed to store the page information of the historical page. Alternatively, step 706 is performed first to store the page information of the historical page, step 705 is performed to query whether the repeated crash occurs, and then step 704 is performed to display the mask. Alternatively, step 704 is performed first to display the mask, step 705 is performed to query whether the repeated crash occurs, and then step 706 is performed to store the page information of the historical page.

An embodiment of this application further provides an electronic device, including a memory, a processor, and a computer program that is stored in the memory and that can run on the processor. When the processor executes the computer program, the electronic device is enabled to implement the application exception recovery method according to any embodiment of this application. The electronic device may have the basic structure in FIG. 1 and the software structure in FIG. 2. The processor of the electronic device may be the processor 110 in FIG. 1, and the memory may be a memory included in the processor 110, the internal memory 121, an external memory, or any combination thereof.

An embodiment of this application further provides a computer storage medium, including computer instructions. When the computer instructions are run on an electronic device, the electronic device is enabled to perform the application exception recovery method according to any embodiment of this application.

An embodiment of this application further provides a computer program product. When the computer program product is run on a computer, the computer is enabled to perform the application exception recovery method according to any embodiment of this application.

Figure 8A:
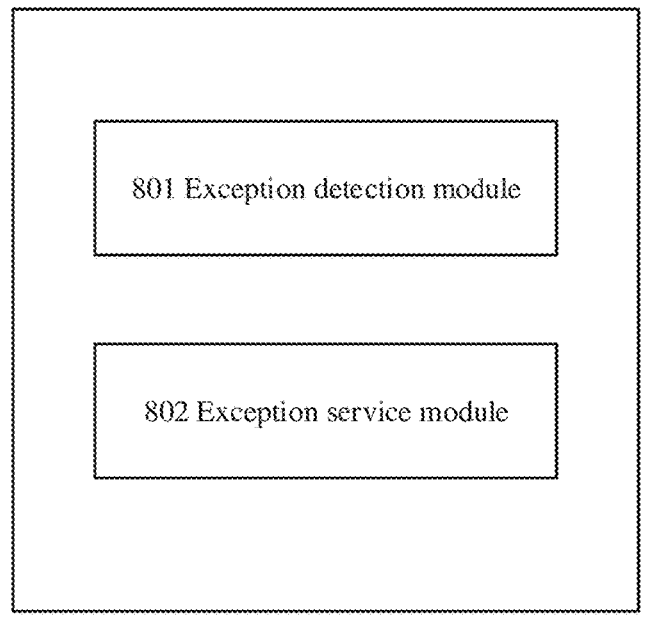
FIG. 8A shows an application exception recovery apparatus according to an embodiment of this application.

FIG. 8A shows an application exception recovery apparatus according to an embodiment of this application. The recovery apparatus 800 includes an exception detection module 801 and an exception service module 802. The recovery apparatus 800 is arranged in the electronic device shown in FIG. 1 and FIG. 2, and is configured to perform exception recovery on an application running on the electronic device. The exception detection module 801 runs in a process of at least one application, and when the exception detection module 801 detects that an exception occurs in the at least one application, the at least one application learns that the exception occurs. When the at least one application learns of the application exception from the exception detection module 801, the at least one application stores page information of an exception page, and transmits the stored page information of the exception page to the exception service module 802, where the exception page is a page displayed by the at least one application when the exception occurs. The exception service module 802 displays a mask when receiving the page information of the exception page from the at least one application, where the mask is a picture displayed on at least a window of the at least one application during restart of the application. The exception service module 802 restarts the application, where restarting the application includes creating the exception page. The exception service module 802 removes the mask after the exception page is created, and displays the created exception page.

For a Java crash, the exception detection module 80*i* may be configured as an event handler SetUncaughtPrehandler that is registered with runtime and that runs in an application process, and SetUncaughtPrehandler inherits an interface UncaughtExceptionHandler of a native system, so that SetUncaughtPrehandler can be notified when an uncaught exception that causes the Java crash occurs, thereby implementing a user-defined uncaughtException method. Because SetUncaughtPrehandler runs in the application process, so that the application learns of the application exception when SetUncaughtPrehandler detects the application exception. It can also be learned that, when the application exception occurs, the operating system first learns of the application exception, and the application may learn of the application exception only through notification by the operating system by using UncaughtExceptionHandler. The user-defined uncaughtException method includes: The application stores the information about the exception page, and the exception service module 802 displays the mask, restarts the application, and removes the mask after completing the restart.

For a native crash, the exception detection module 801 may be configured as a signal catcher that is registered with runtime and that runs in an application process, and is used as an event handler. For example, a signal processing function is registered by invoking sigaction( ), to configure the signal catcher. Example use of sigaction( ) is as follows:

include <signal.h> int sigaction(int signum,const struct sigaction*act,struct sigaction*oldact)).

Herein, signum represents signal code and may point to any specific valid signal; act specifies processing on the specific signal; and oldact stores original processing on the specific signal, which can be set to NULL (null).

For example, if the signal catcher is defined as my_sigaction, the system invokes my_sigaction when the native crash occurs because the specified signal is abnormal.

For ANR, the exception detection module 801 may be configured as an event handler ANREventHandler that is registered with runtime and that runs in an application process, and ANREventHandler may detect a message processing duration of a main message queue in the process to indirectly determine whether the ANR occurs. For example, if ANREventHandler sets a response time threshold to 4 s, when the application does not respond to a user operation such as touching or tapping within 4 s, it is determined that the ANR occurs.

When the recovery apparatus is implemented, the exception detection module 801 may be configured as any combination of the foregoing event handlers. In this embodiment, the exception detection module 801 is configured as a combination of SetUncaughtPrehandler and my_sigaction to detect the java crash and the native crash of the application.

Figure 8B:
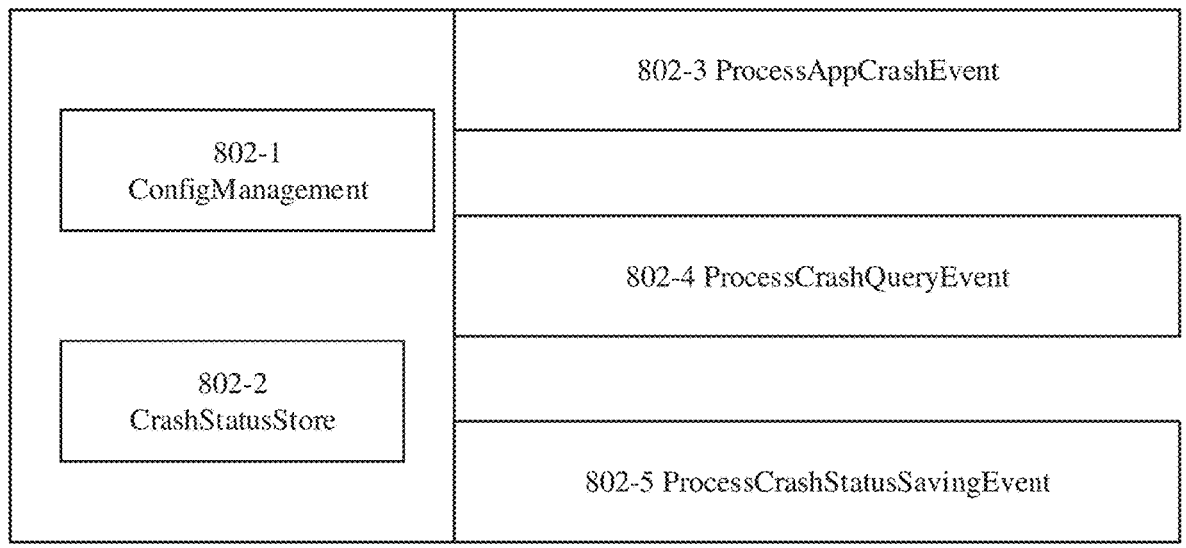
FIG. 8B shows an example structure of an exception service module 802.

An example structure of the exception service module 802 is shown in FIG. 8B. The exception service module 802 includes a configuration management part ConfigManagement 802-1, a crash status storage part CrashStatusStore 802-2, an application crash interface ProcessAppCrashEvent 802-3, a crash query interface ProcessCrashQueryEvent 802-4, and a crash status storage interface ProcessCrashStatusStoringEvent 802-5.

ProcessAppCrashEvent 802-3 is configured to receive crash-related information stored by the application, where the crash-related information includes the page information of the exception page.

ProcessCrashQueryEvent 802-4 is configured to query whether the current crash is a repeated crash, obtain the mask, and display the mask. For example, ProcessCrashQueryEvent 802-4 queries a time of a previous crash recorded by system_server, to determine whether the current crash is a repeated crash. For example, ProcessCrashQueryEvent 802-4 obtains a snapshot of the exception page from windowstate of a window manager (windows manager) at an operating system framework layer as the mask. For example, ProcessCrashQueryEvent 802-4 indicates the windows manager to remove the mask after indicating the windows manager to display the mask on the window of the application and obtaining a restart completion message from the application.

ProcessCrashstatusStoringEvent 802-5 is configured to obtain page information of a historical page, for example, obtain the page information of the historical page from an activity manager at the operating system framework layer.

CrashStatusStore 802-2 is configured to store data required for restarting the application, where the data includes the page information of the exception page obtained by using ProcessAppCrashEvent 802-3 and the page information of the historical page obtained by using ProcessCrashstatusStoringEvent 802-5.

ConfigManagement 802-1 is configured to manage the at least one application applicable to the recovery method, set a time threshold for determining the repeated crash, and the like. For example, the management may include adding and/or deleting the at least one application. For example, the electronic device stores a list of applications that can be recovered when an exception occurs, and may read the list and use the list as a list of applications applicable to the recovery apparatus. For example, when the electronic device is delivered from a factory, an original list of applications that can be recovered when an exception occurs is stored in the operating system. For example, a path is system/etc/hiview/erecovery_config.xml. For example, the electronic device may download, from a server that has a corresponding protocol with the operating system, a dynamic list of applications that can be recovered when an exception occurs, and update the dynamic list. For example, the electronic device stores the dynamic list in a path data/system/hiview/erecovery_config.xml. For example, after downloading the dynamic list or updating the dynamic list, the electronic device broadcasts the dynamic list for reading. For example, the dynamic list is preferentially read, or the original list is read when the dynamic list does not exist or cannot be read.

Figure 8C:
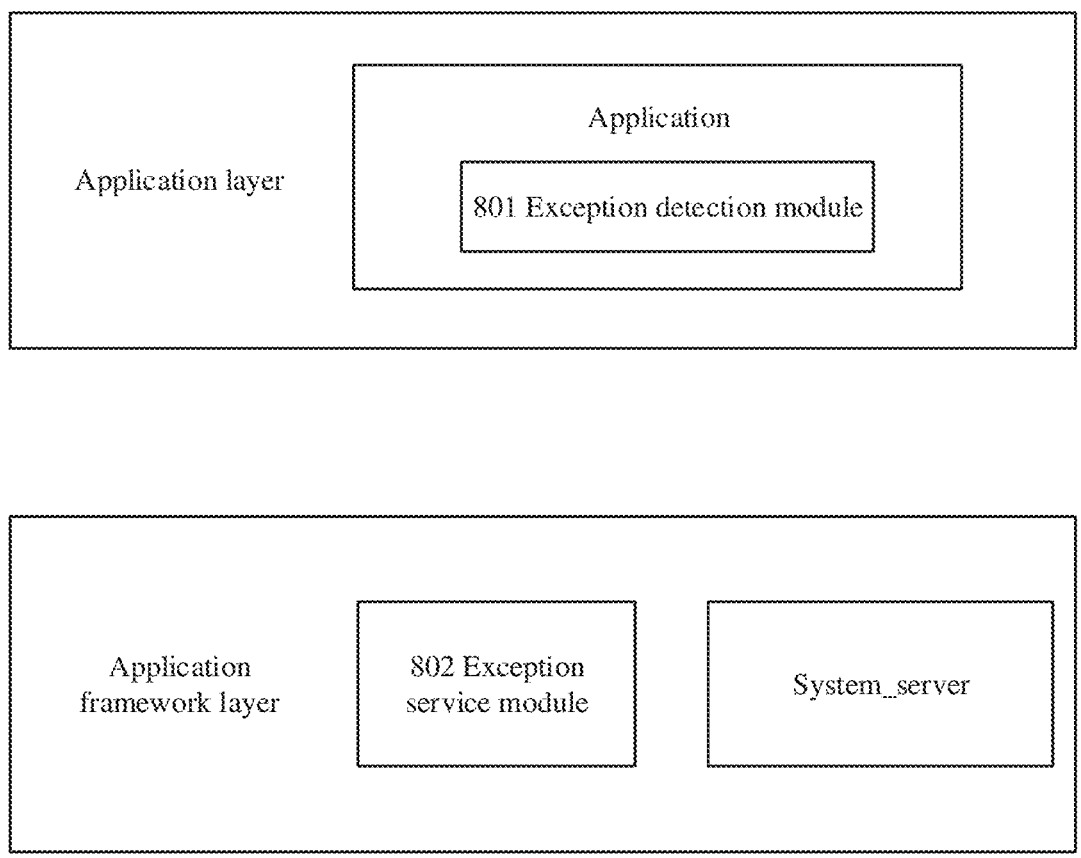
FIG. 8C shows an example arrangement of the recovery apparatus in FIG. 8A.

FIG. 8C shows an example arrangement of the recovery apparatus in FIG. 8A. The exception detection module 801 runs in the application process. Therefore, it is considered that the exception detection module 801 is arranged in the application, although code of the exception detection module 801 may be placed at a framework layer, a system library layer, or an application layer. The exception service module 802 is arranged at the application framework layer in this embodiment. In some other embodiments, a part of code of the exception service module 802 may also be arranged at the system library or the application layer, and is invoked by another part arranged at the framework layer. In some other embodiments, the exception service module 802 may alternatively be arranged at the application layer.

FIG. 9A, FIG. 9B-1, and FIG. 9B-2 respectively show a structure of a recovery apparatus and an example working procedure of the recovery apparatus according to an embodiment of this application. Same components in the recovery apparatuses in FIG. 9A and FIG. 8A use same reference numerals. It can be learned through comparison that the recovery apparatus in FIG. 9A additionally includes a pop-up interception module 803. In this embodiment, the pop-up interception module 803 is configured as an application exception processing class in system_server, for example, a function in a class named AppErrors. A function of the application exception processing class is to intercept an application exception prompt box of a native system when the AppErrors communicates with the exception service module and learns that the application can be started. Not all versions of operating systems have a pop-up box for an application exception. Even if there is a pop-up box, the recovery method and the recovery apparatus provided in the embodiments of this application can still run without interception. Therefore, the pop-up interception module 803 is not mandatory. When an application crash occurs, a basis of determining that the application can be restarted is, for example, that the historical page and the exception page belong to a same application and the current crash is not a repeated crash. When application ANR occurs, a basis of determining that the application can be restarted is, for example, that the historical page and the exception page belong to a same application.

Figure 10A:
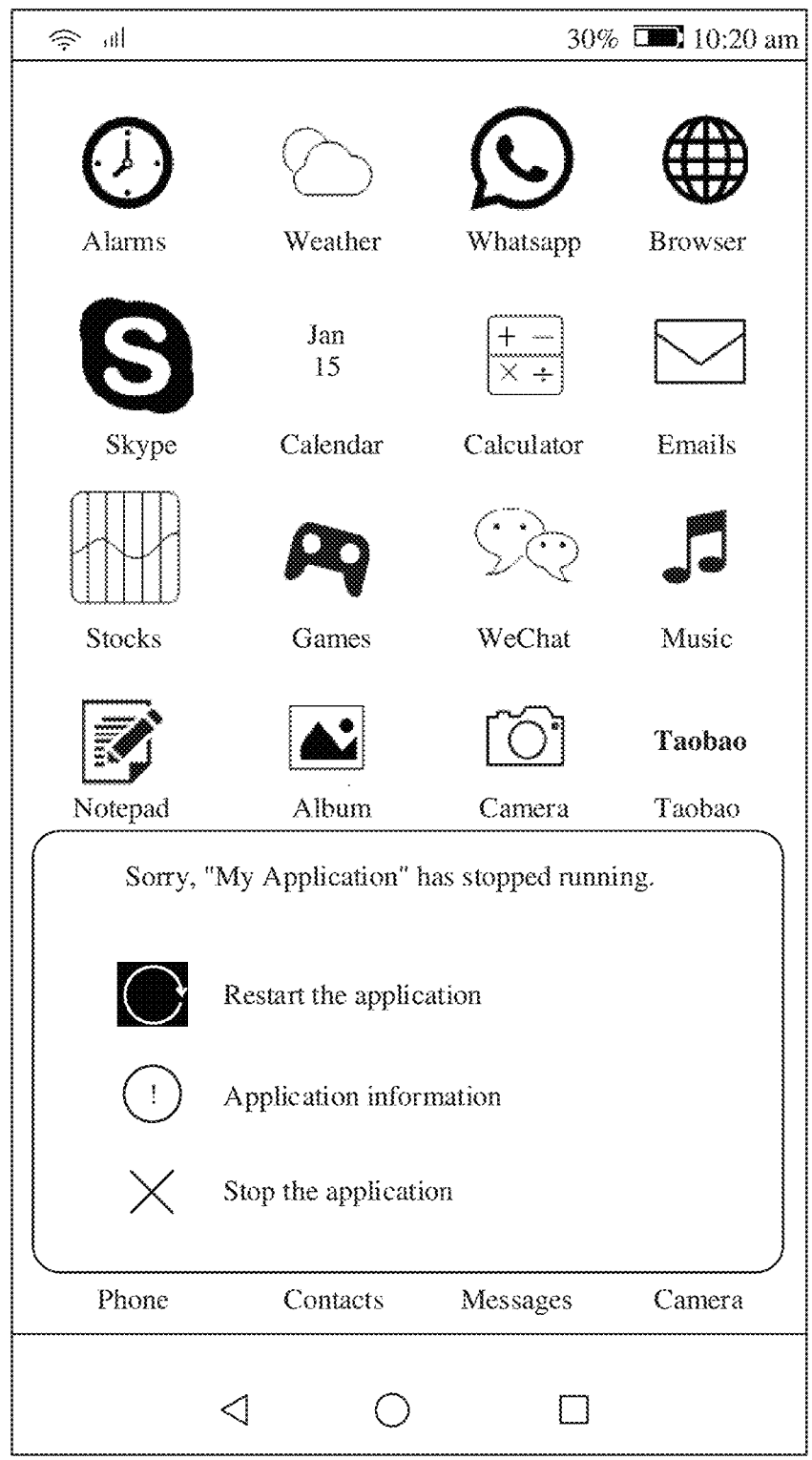
FIG. 10A shows a crash pop-up box of an example application in an Android® operating system.
Figure 10B:
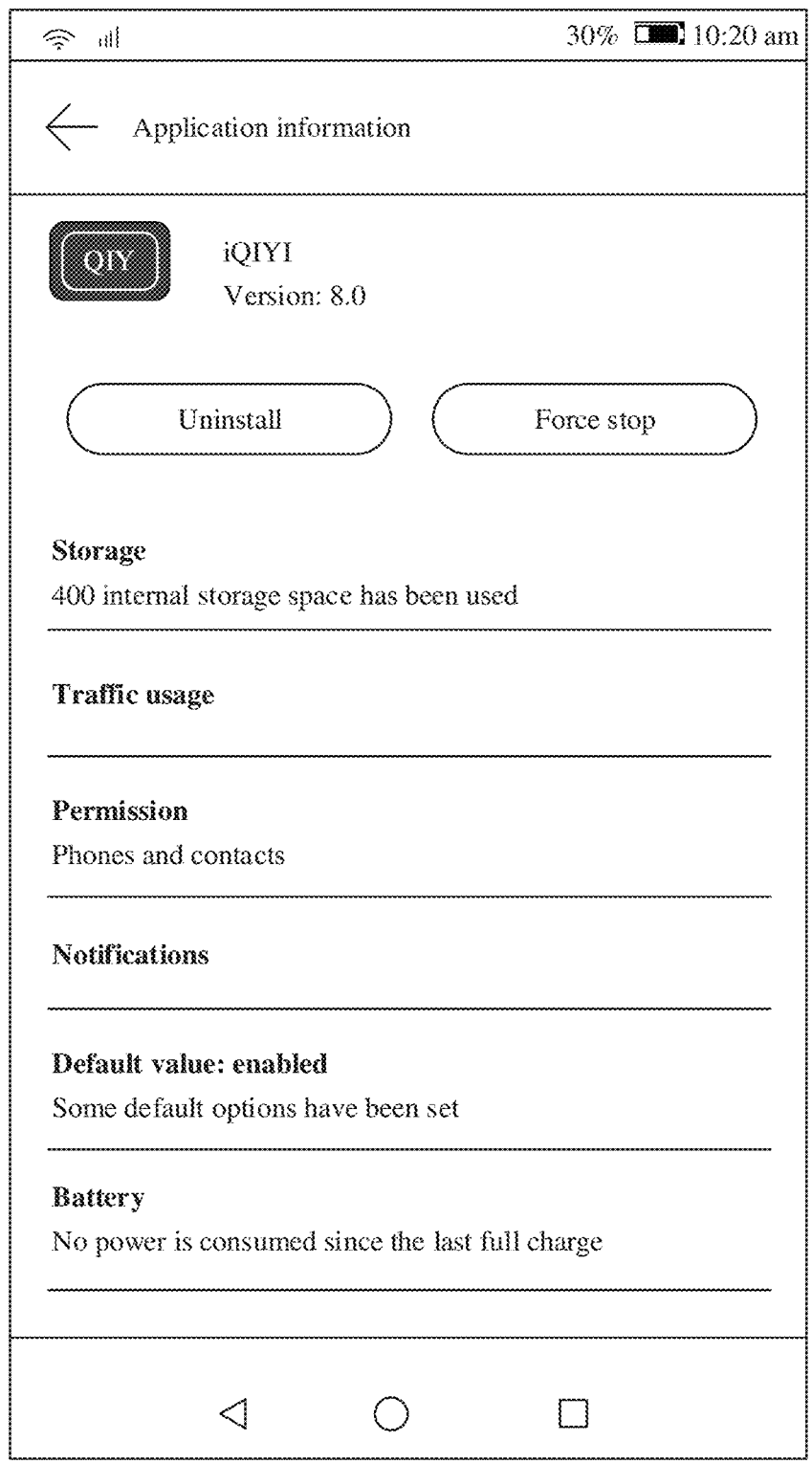
FIG. 10B shows a level-2 menu of the pop-up box in FIG. 10A.

As shown in FIG. 10A, if Android® earlier than the Android® operating system 6.0 crashes, a native application crash pop-up box is popped up. There are three menu options: "Restart the application", "Application information", and "Stop the application". As shown in FIG. 10B, after the menu option "Application information" is taped, a second-level menu is displayed, including "Uninstall", "Force stop", "Store" (setting), "Permission", and the like. After the menu option "Restart the application" is run, a to-be-restarted page is not determined, and it is about 90% that a home page of an application is restarted. In Android® later than Android® 6.0, a menu option "Restart the application" is removed from a native crash pop-up box.

Figure 11:
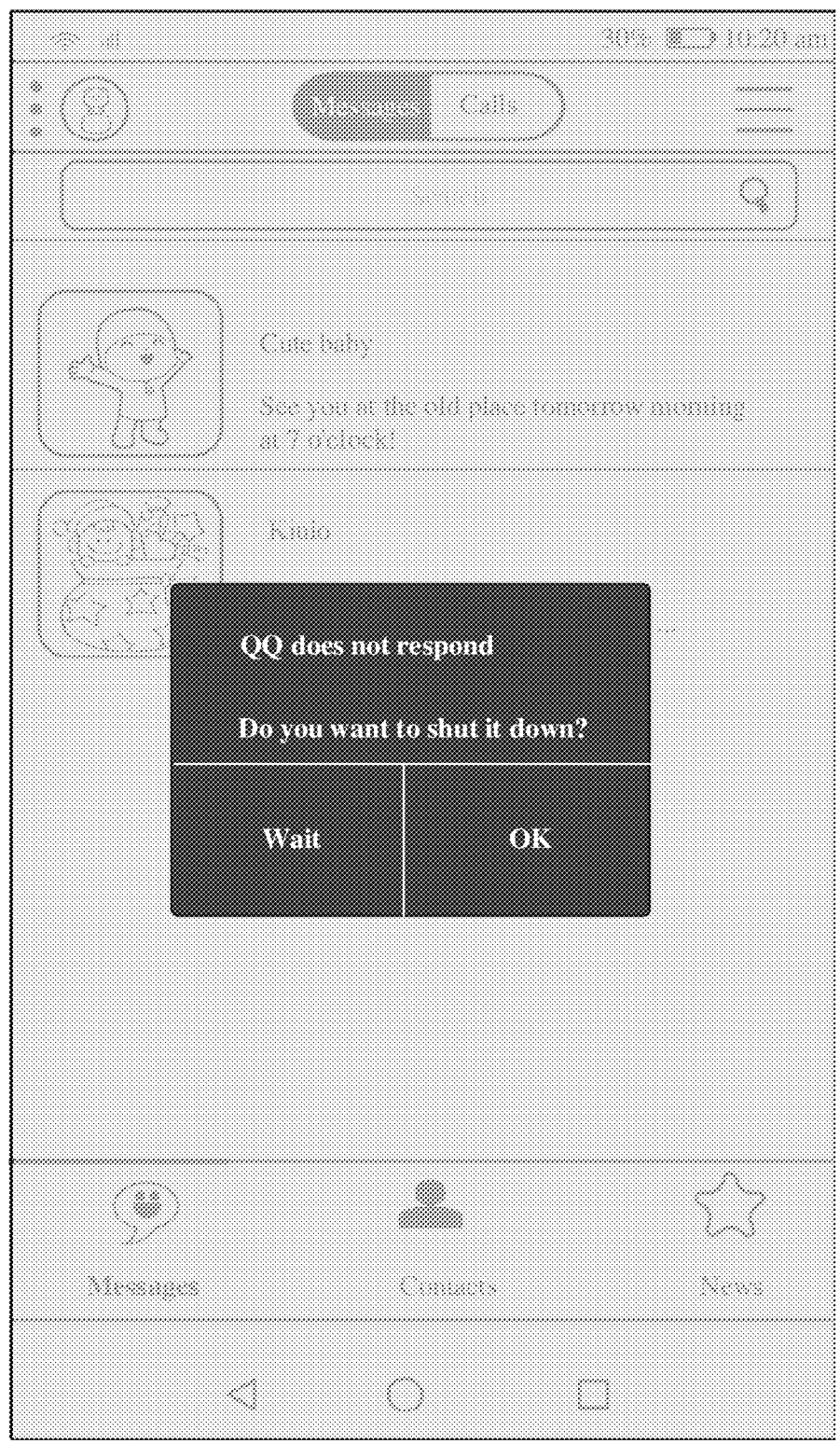
FIG. 11 shows an example of an ANR prompt pop-up box.

For example, a new message in WeChat is not displayed after being tapped, or a camera is not started after a camera application icon is tapped. This is referred to as ANR. The user may feel that an application interface is suspended and the user cannot operate an application. In the Android® system, a prompt box is popped up for ANR of a specific application. The prompt box includes a prompt box "Close at least one application" and a prompt box "Wait", as shown in FIG. 11.

The pop-up interception module 803 may intercept the pop-up box when determining that the application can be restarted, so as to avoid unnecessary interference to the user.

Figure 9A:
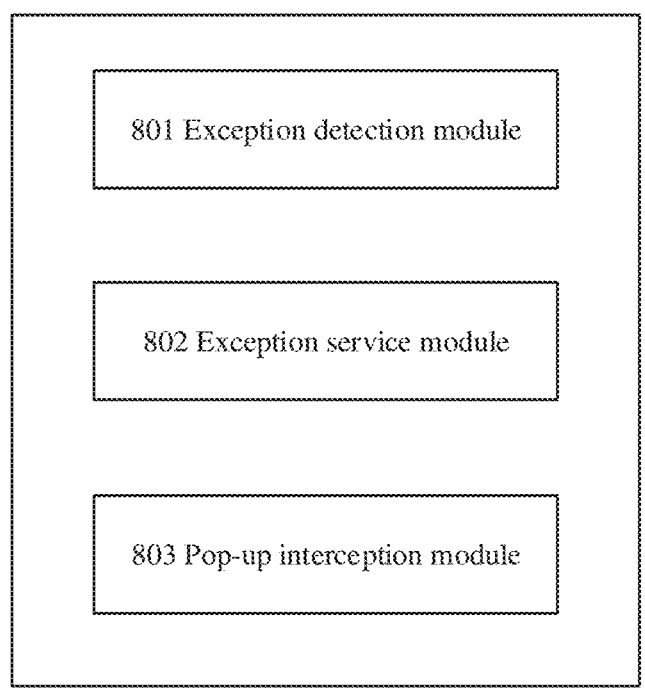
Figures 2, 9B:
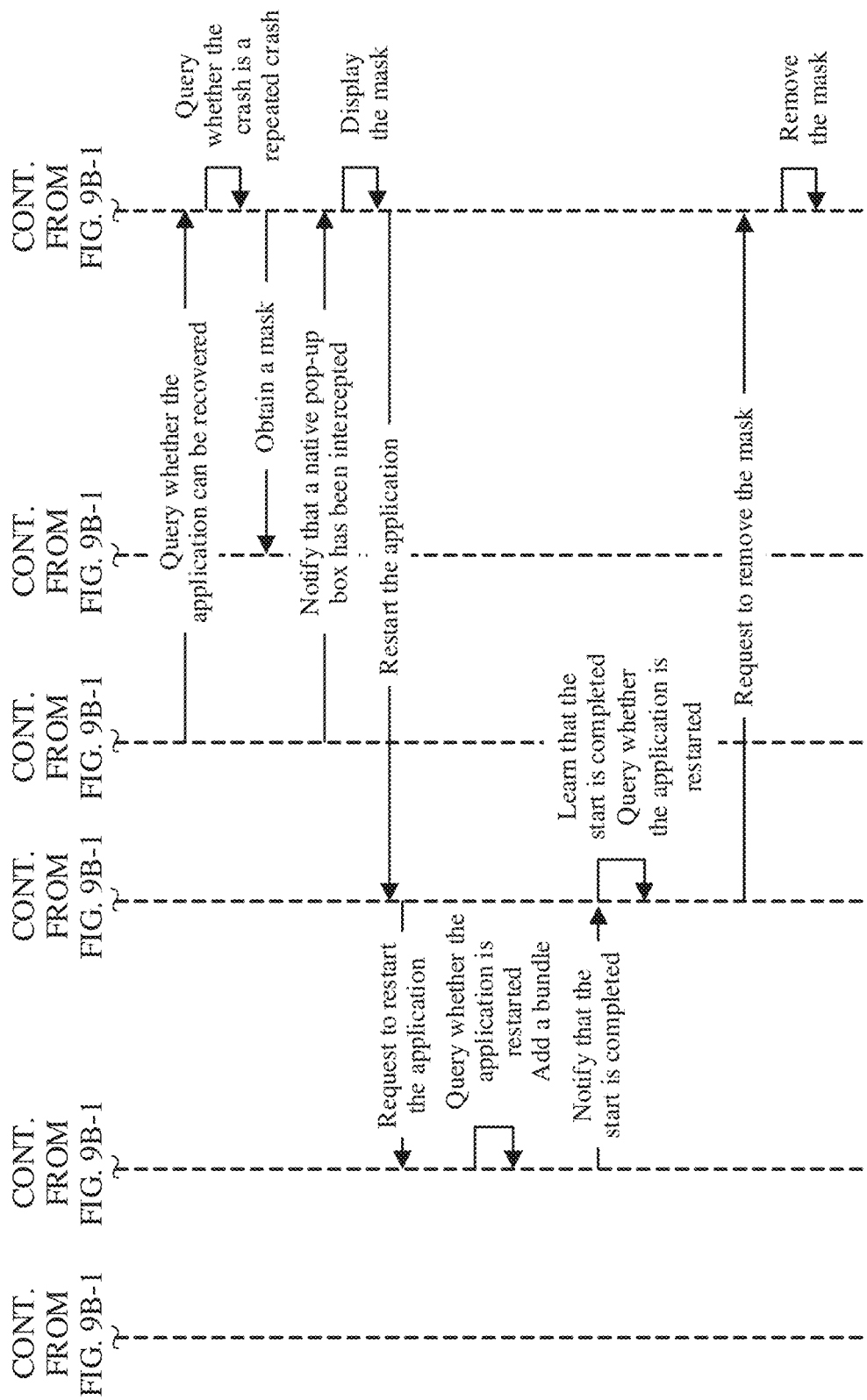

FIG. 9B-1 and FIG. 9B-2 show an example of a working procedure of the recovery apparatus in FIG. 9A. First, the abbreviations and class names in FIG. 9B-1 and FIG. 9B-2 are explained. AppEyeUiProbe is a class of an application for detecting suspension and crash states of the application, and AppEyeUiProbe holds page information of a current page displayed on the foreground. An activity thread (AT) indicates an application process. An activity manager service (AMS) is also referred to an activity manager and is a system-level activity lifecycle management service. AppErrors is a class in system_server and is used for system-level application error management. A window manager service (WMS) is also referred to as a window manager and is used for a system-level window management service.

The exception detection module 801 is added to the application process to detect an exception that causes an application crash. When an exception (a java crash or a native crash) is detected, the application process indicates AppEyeUiProbe that holds the page information to store the page information of the exception page, and the application process indicates the activity manager service to store the historical page.

Subsequently, AppEyeUiProbe and the activity manger service respectively transmit the stored page information of the exception page and page information of the historical page to the exception service module 802 by using a cross-process communication mechanism, for example, AIDL.

The exception service module 802 respectively receives the page information of the exception page and the page information of the historical page through ProcessAppCrashEvent 802-3 and ProcessCrashstatusStoringEvent 802-5, and stores the page information of the exception page and the page information of the historical page in CrashStatusStore 802-2.

In this embodiment, when an application crashes, the native system pops up a pop-up box before exiting the application.

Before the pop-up box is popped up, AppErrors queries the exception service module 802 for application recovery. When the exception page and the historical page belong to a same application and the current crash is not a repeated crash, the exception service module 802 can recover the application.

The exception service module 802 queries, through ProcessCrashQueryEvent 802-4, whether the current crash is a repeated crash, and if the current crash is not a repeated crash, obtains the snapshot of the exception page from Windowstate in the window manager service as the mask.

AppErrors includes a crashApplicationInner function provided by the native system for crash processing. Sample code is as follows:

crashApplicationInner
. . .
if (mService.mHwAMSEx.couldRestartCrashedApplication(r, data.repeating, HWERE_CRASH_EVENT_IN_APP_CRASH))}
 return;
} crashApplicationInner. In an "if" condition, a couldRestartCrashedApplication( ) function is used to query whether the application can be recovered. In this embodiment, the couldRestartCrashedApplication( ) function is used to query whether the exception page and the historical page belong to a same application and whether the current crash is a repeated crash. If the exception page and the historical page belong to a same application and the current crash is not a repeated crash, the execution is returned. In other words, sample code of the couldRestartCrashedApplication( ) function is as follows:

```
public boolean couldRestartCrashedApplication(ProcessRecord crashApp, boolean isRepeating, int eventId) {
    if (!isCrashRecoveryFunctionEnabled( )) {
        return false;
    }
    if (crashApp==null) {
        if (Log.HWINFO) {
            Slog.w(TAG, "restartCrashedApplication crashApp: "+crashApp);
        }
        return false;
    }
    Bundle bundle=getBasicInfoFromCrashedProcessRecord(crashApp);
    bundle.putBoolean("isRepeating", isRepeating);
    bundle.putInt("eventId", eventId);
    boolean couldRestore=HwERecoveryManager.checkRecoveryState(HWERE_COULD_RESTORE_CRASHED_APP, bundle);
    if ((!isRepeating && couldRestore)||
        ((SystemProperties.getInt("appcrash.debug.on", 0)==1) && couldRestore)) {
        ProcessInfo info=new ProcessInfo(crashApp.pid, crashApp.uid);
        killProcessRecordFromIAwareInternal(info, false, false, "Crash Recovery", false, false);
        bundle.putBoolean("restart", true);
        return HwERecoveryManager.checkRecoveryState(HWERE_COULD_RESTORE_CRASHED_APP, bundle);
    }
    return couldRestore;
}
```

After intercepting the crash pop-up box, AppErrors notifies the exception service module 802. The exception service module 802 uses the window manager service to display the mask and sends the intent array to the activity manager service to restart the application. The activity manager service forwards the intent array to the application and requests the application to restart based on the intent array. The application checks, based on content of the intent array, whether the current restart is a restart requested by the recovery apparatus. A determining criterion is, for example, as follows: If the intent array includes a bundle, it is considered that the current restart is the restart requested by the recovery apparatus. A determining criterion may be, for example, another identifier. If the intent array includes the bundle, the bundle is obtained from the intent and bundle information is added to the page for display. Therefore, after startActivities( ) is invoked, for example, the following code may be used to obtain the bundle from the intent and install the bundle to r.state:

Bundle prevStoredState=r.intent.getBundleExtra("hwere-covery_bundle");
if (prevStoredState !=null){
if (Log.HWINFO){
Log.i("onAppCrashing", "ActivityThread restore prevStoredState:"+prevStoredState);
}
r.state=prevStoredState;
}
Then, r.state is used as an input parameter during page creation.
@Override
protected void onCreate(Bundle r.state) {
super.onCreate(r.state);
}

After the restart is completed, the application notifies the activity manager service, and the activity manager service learns, based on content of the notification, whether the current restart is the restart requested by the recovery apparatus. If the current restart is the restart requested by the recovery apparatus, cross-process communication is performed to request the exception service module to remove the mask, and after the exception service module removes the mask through the window manager service, the re-created exception page is displayed on the foreground, and the recovery is completed.

FIG. 12A to FIG. 17G show application exception recovery methods according to some embodiments of this application and application scenarios of application exception recovery apparatuses according to the embodiments of this application. In these embodiments, an application injects fault code into an application process by using a ptrace function, and a null pointer exception is caused when the process executes the code. It should be understood that, in daily use of the electronic device, a crash may be caused by any other exception, and the exception may be detected by the application exception provided in this embodiment of this application and then the application is recovered.

Figure 12A:
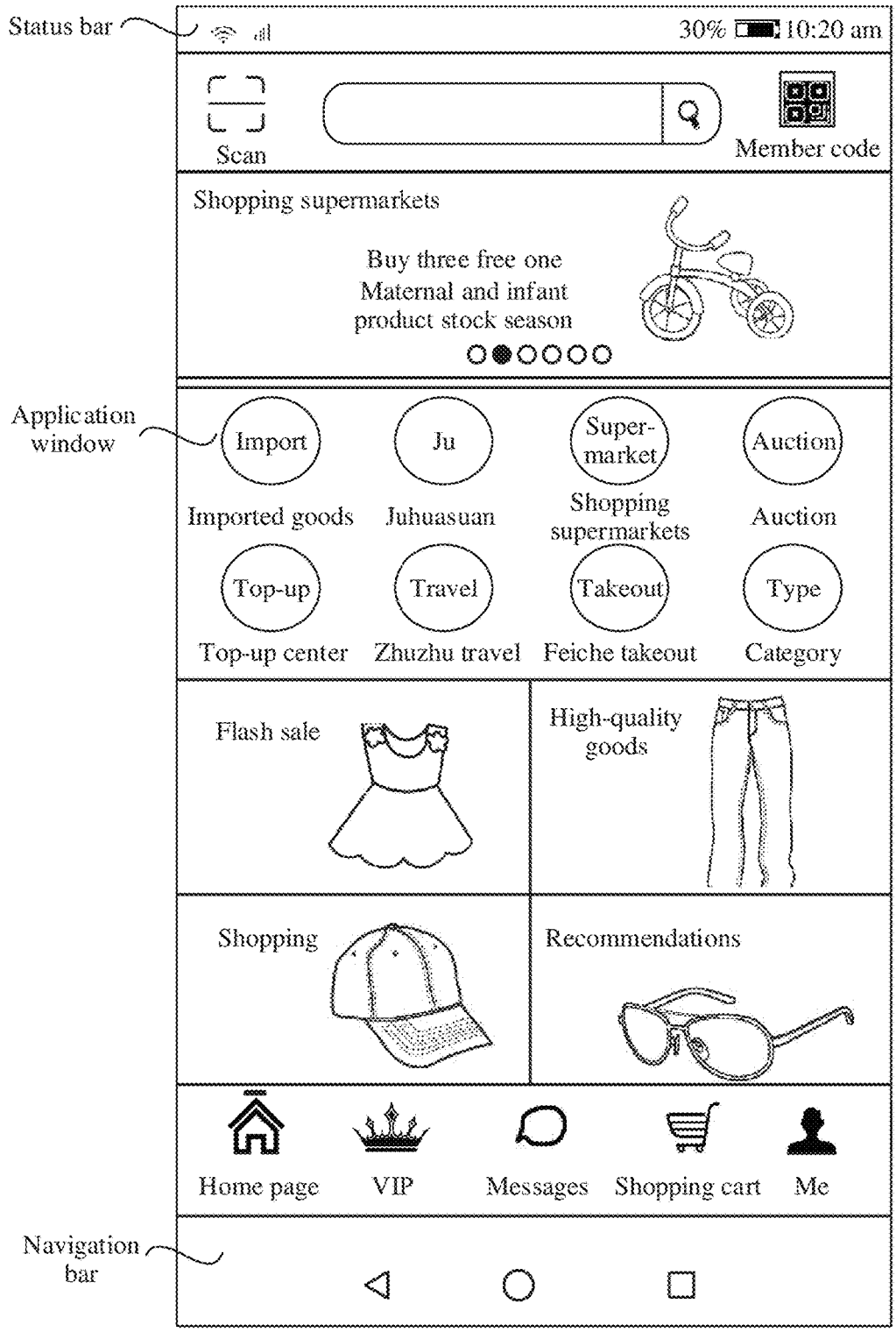
FIG. 12A to FIG. 12D show an application exception recovery method according to an embodiment of this application and an application scenario of an application exception recovery apparatus according to the embodiment of this application.
Figure 12B:
Figure 12C:
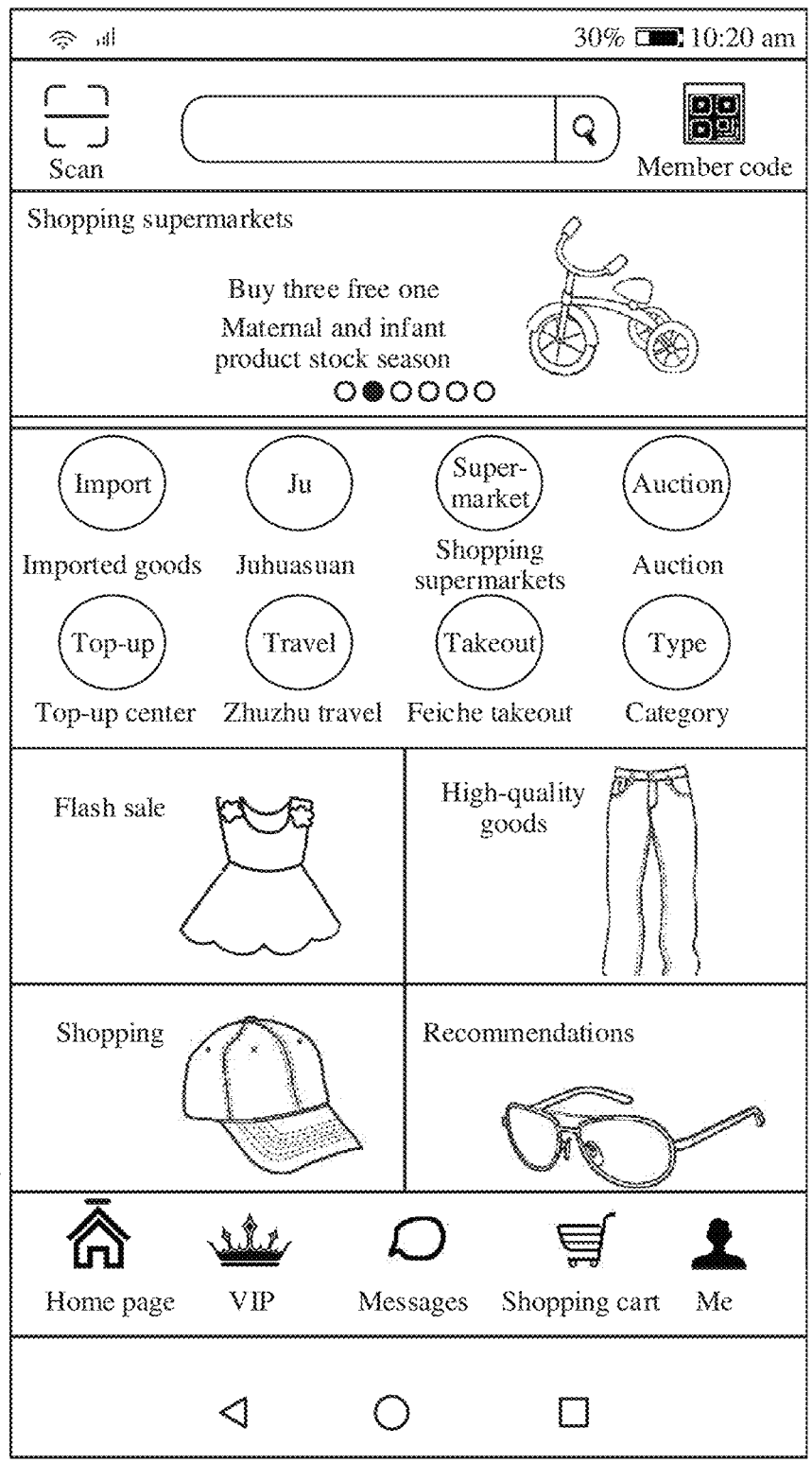
Figure 12D:
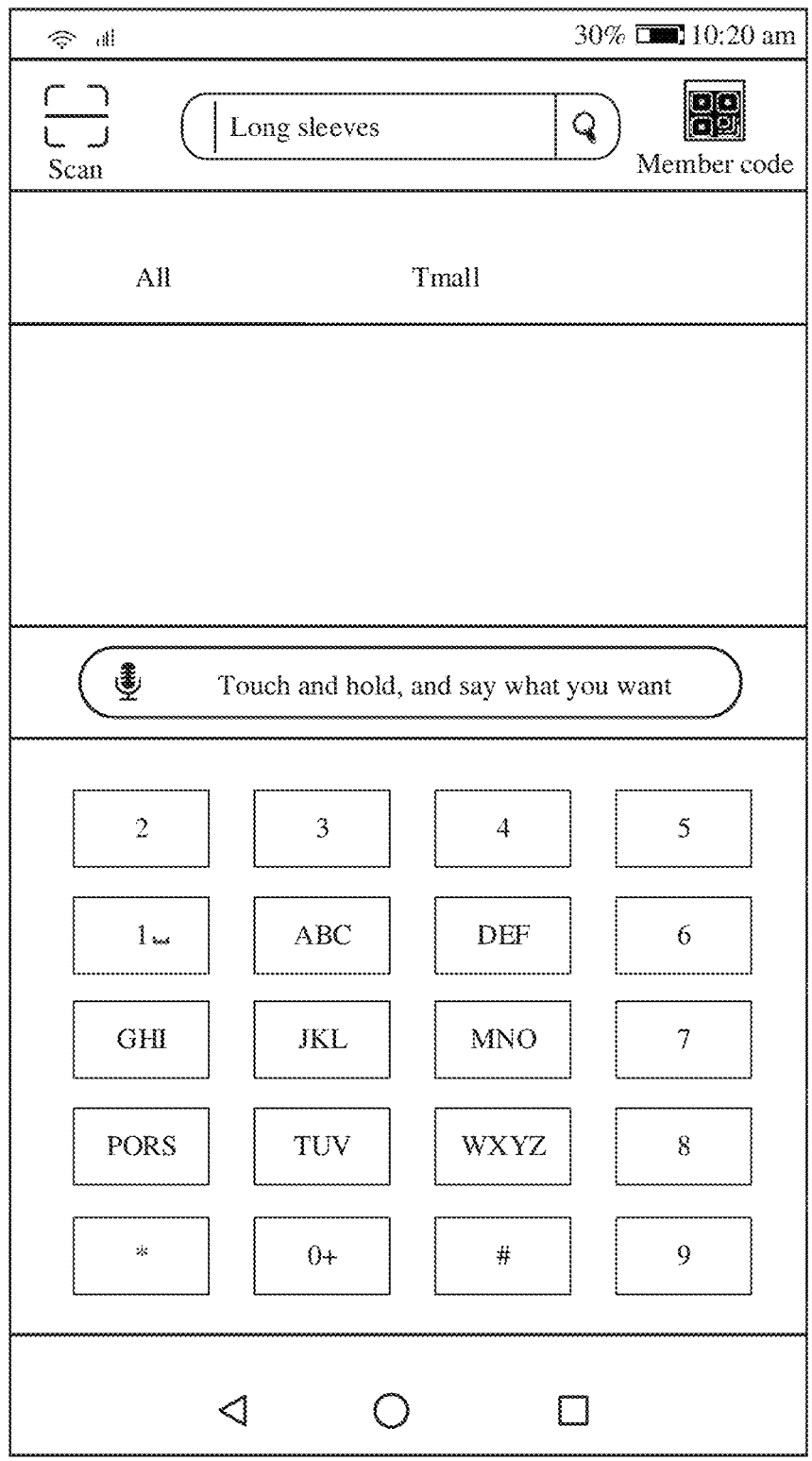

FIG. 12A to FIG. 12D show an application exception recovery method according to an embodiment of this application and an application scenario of an application exception recovery apparatus according to the embodiment of this application. FIG. 12A shows a page displayed on the foreground in a normal running process of an application, and the page happens to be a home page of Taobao. The entire screen is divided into three parts: The upper part is a status bar that displays a time, a battery level, a signal strength, and the like; the middle part is an application window; and the lower part is a navigation bar including a back button, a home button, and a window browsing button. An application exception such as an application crash occurs on the page. The application recovery is started, as shown in FIG. 12B. A snapshot of an exception page is displayed on the application window as a mask. A prompt box is further displayed on the snapshot in a pop-up manner, to indicate that the application is being recovered. The recovery process includes storing page information of the exception page and page information of a historical page. If the exception page and the historical page belong to a same application and the current crash is not a repeated crash, the page information of the exception page and the page information of the historical page form an array to restart the application. This prompt box is not necessary. Generally, within 10 s, the application recovery is completed, the mask is removed, and the exception page is displayed on the application window again, as shown in FIG. 12C. A normal operation can be performed on FIG. 12C. For example, editing may be performed, as shown in FIG. 12D.

In this embodiment, in a process in which the mask is displayed, if the mask is operated, for example, tapped or slid, the application does not respond, and the tap operation is not recorded. In some other embodiments, the system records operation coordinates of the mask. After the application is recovered, the system may indicate the application to enable a control corresponding to the operation coordinates to respond to the operation.

Figure 13A:
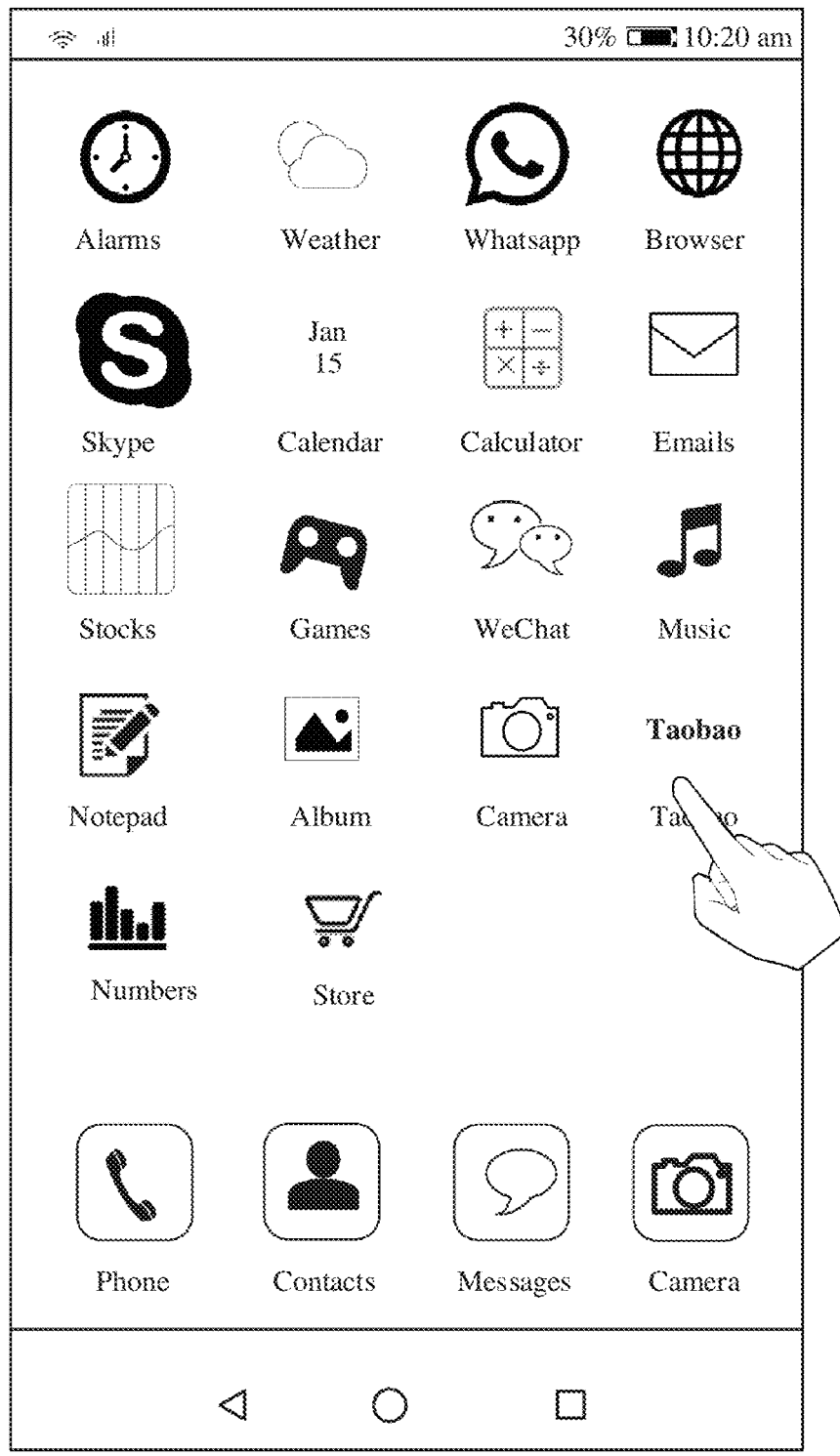
FIG. 13A to FIG. 13E show an application exception recovery method according to an embodiment of this application and an application scenario of an application exception recovery apparatus according to the embodiment of this application.
Figure 13B:
Figure 13C:
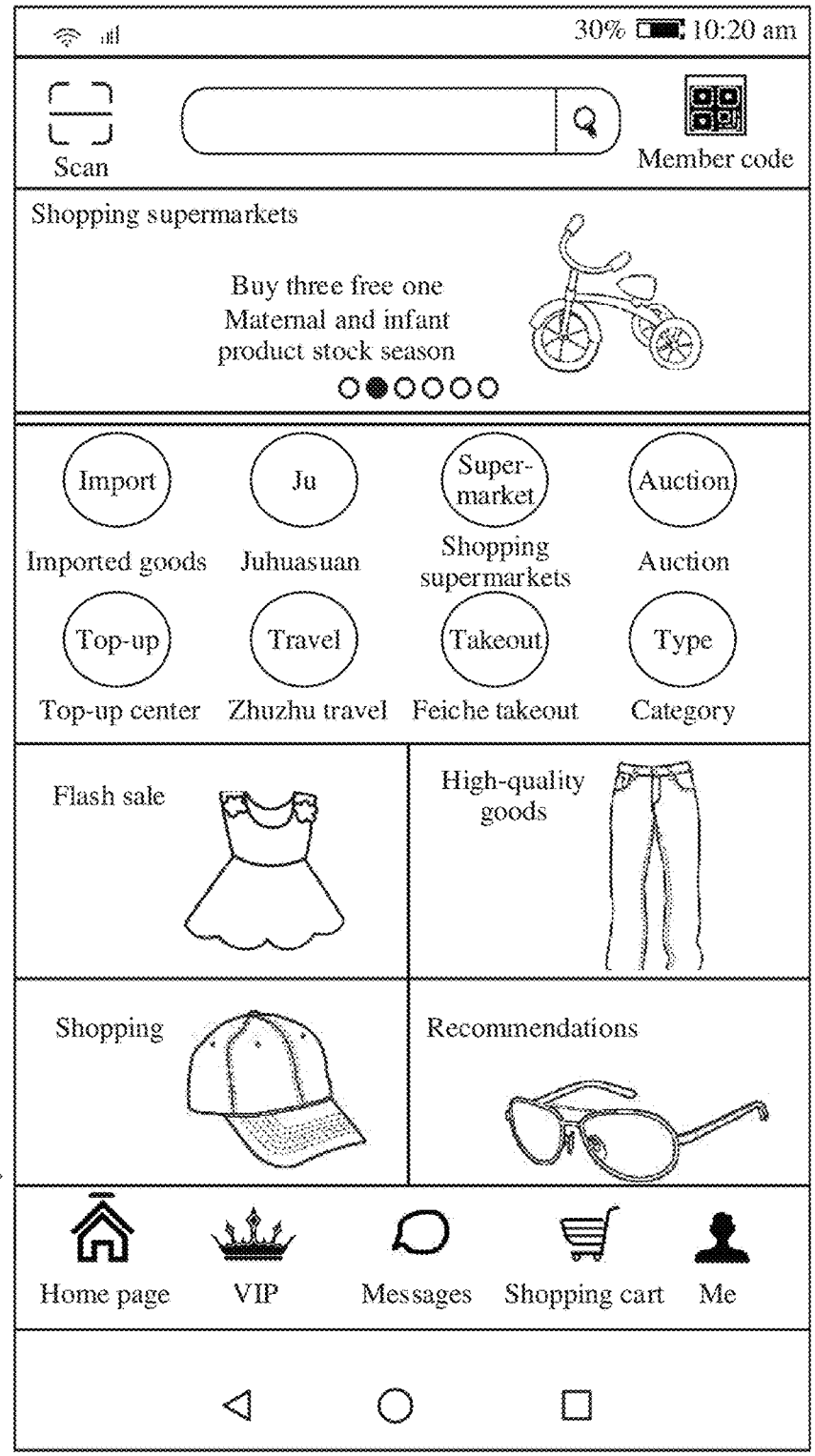
Figure 13D:
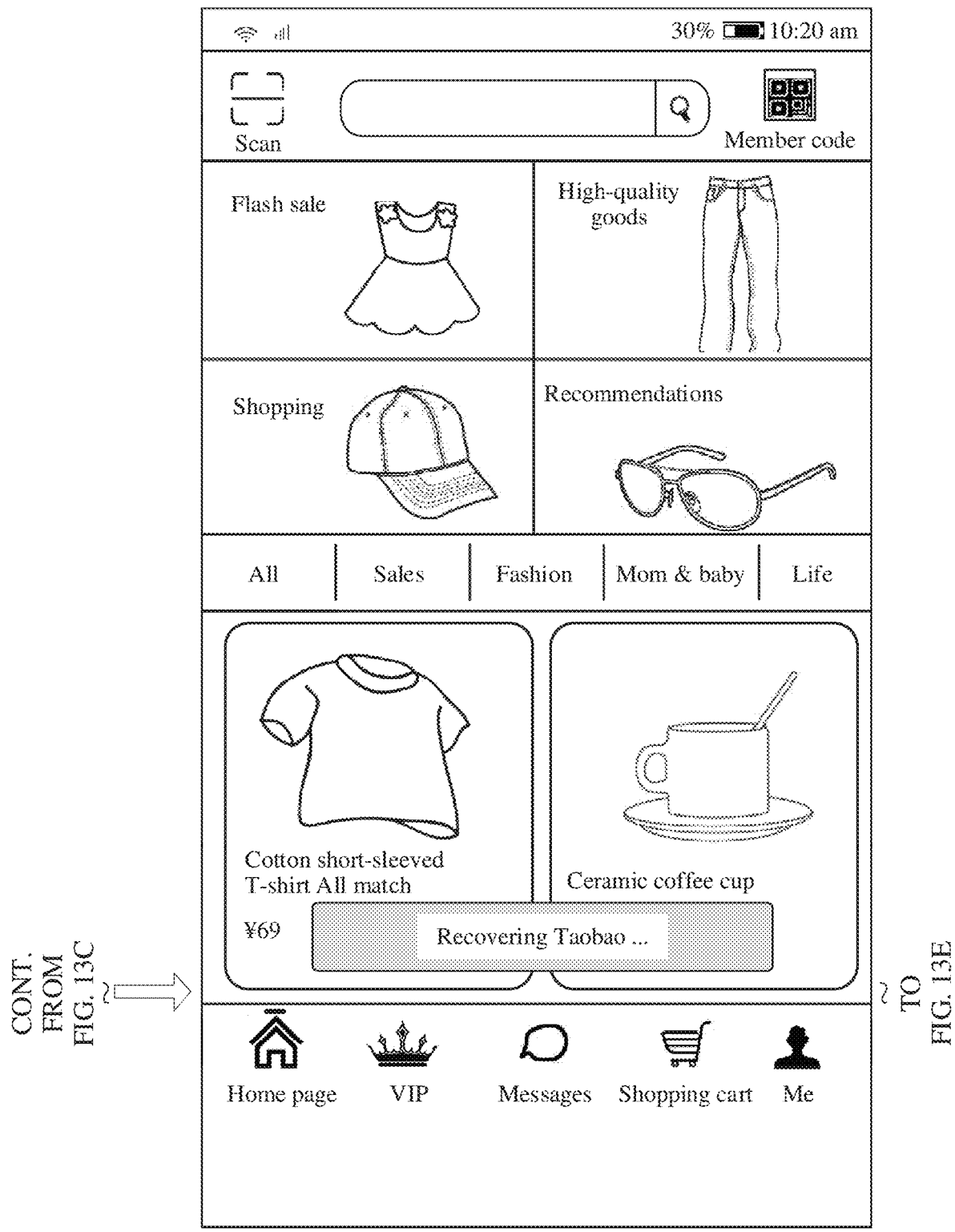
Figure 13E:
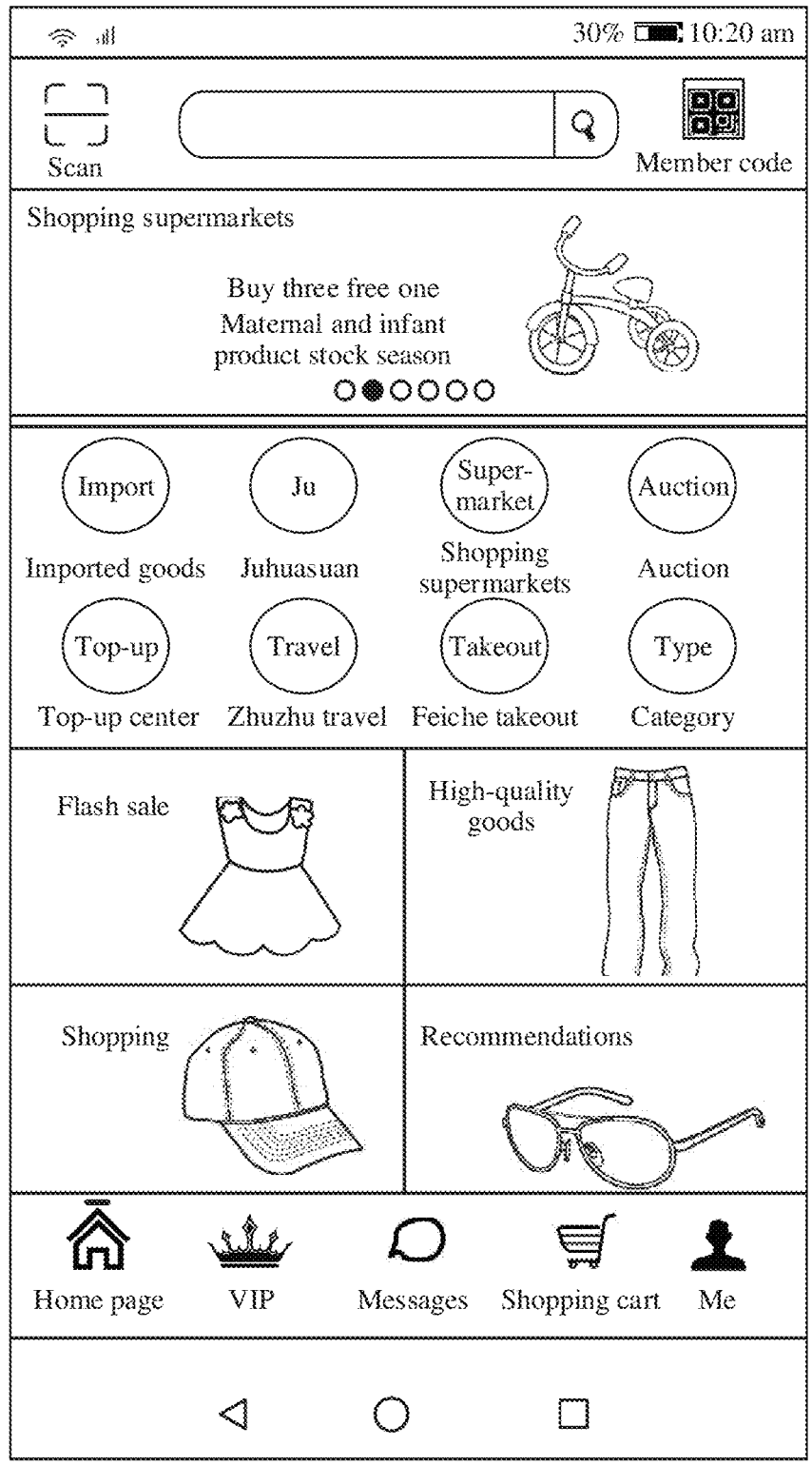

FIG. 13A to FIG. 13D show an application exception recovery method according to an embodiment of this application and an application scenario of an application exception recovery apparatus according to the embodiment of this application. In FIG. 13A, Taobao is tapped, and therefore the application is started and a home page is displayed, as shown in FIG. 13B. The page is scrolled down to an interface shown in FIG. 13C, and an application crash occurs at that position. After the exception is detected, application recovery is started according to the application recovery method, including displaying a snapshot of an exception page as a mask, as shown in FIG. 13D. For purpose of clarity, a prompt indicating that the application is being recovered is further popped up by using a pop-up box. It can be noted that the snapshot covers both the application window and the navigation bar in FIG. 13D. A response flag (flag) may be added to a command statement that displays the snapshot, to select to hide the navigation bar or hide the navigation bar and the status bar. For example, View.SYSTEM_UI_FLAG_LAYOUT_HIDE_NAVIGATION is used to select to hide the navigation bar and View.SYSTEM_UI_FLAG_LAYOUT_FULLSCREEN is used to select to hide the navigation bar and the status bar. If no flag is added, the snapshot is displayed only on the application window. The same display rule is certainly applicable if the mask is changed from the snapshot to a picture specified by the application, such as an interesting picture or a snapshot of another page. Generally, the recovery takes less than 10 s. FIG. 13E shows an interface displayed after the restart is completed and the mask is removed. It can be seen that the exception page is recovered, but back to the top, not the lower part of the page when the exception occurs, because the application does not store a position of a progress bar when storing the page information of the exception page by running onSaveInstanceState( ). Whether a position of a progress bar is stored depends on an application. The progress bar mentioned herein may be an explicit and visible progress bar, or may be an invisible record of a page position.

Figure 14A:
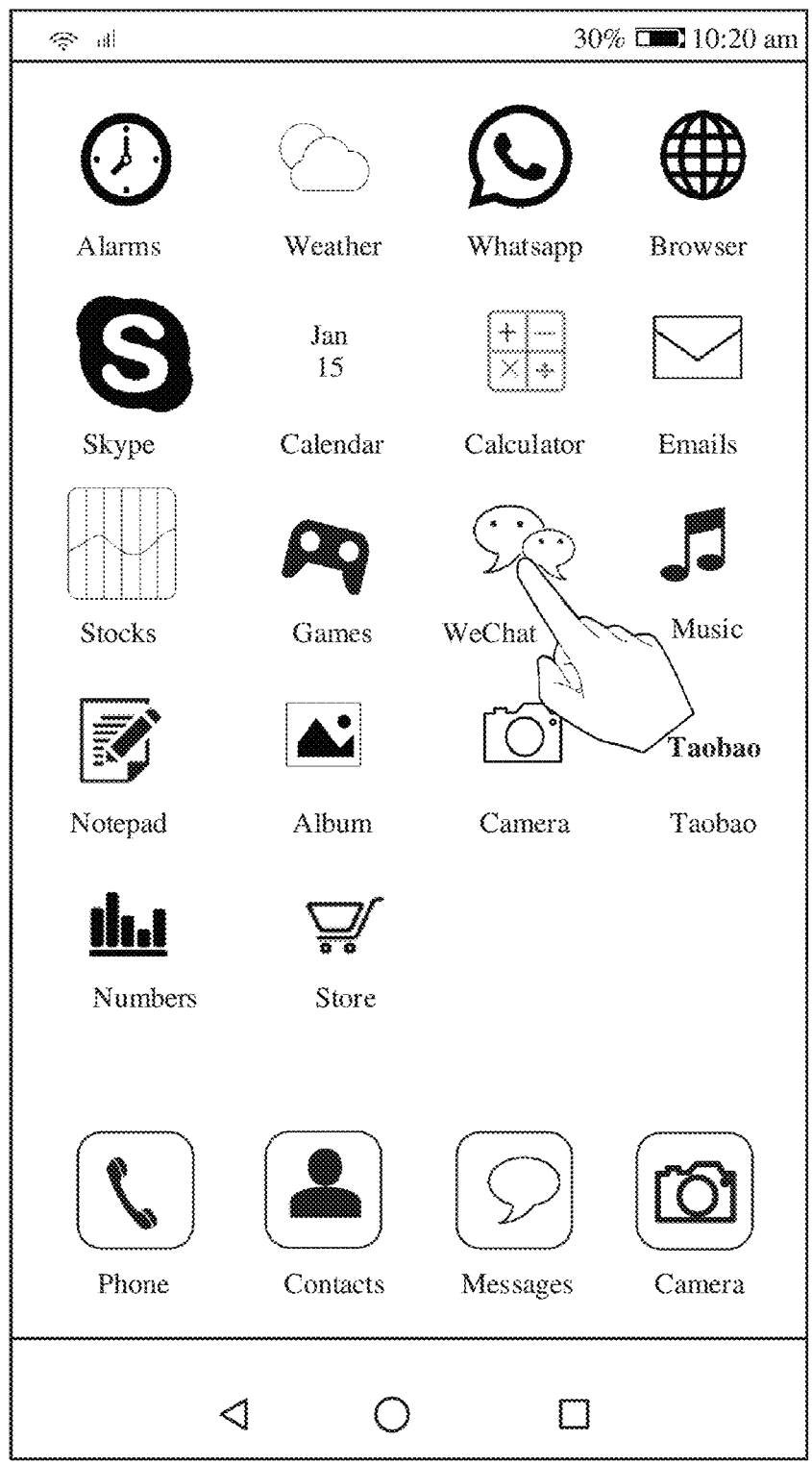
FIG. 14A to FIG. 14I show an application exception recovery method according to an embodiment of this application and an application scenario of an application exception recovery apparatus according to the embodiment of this application.
Figure 14B:
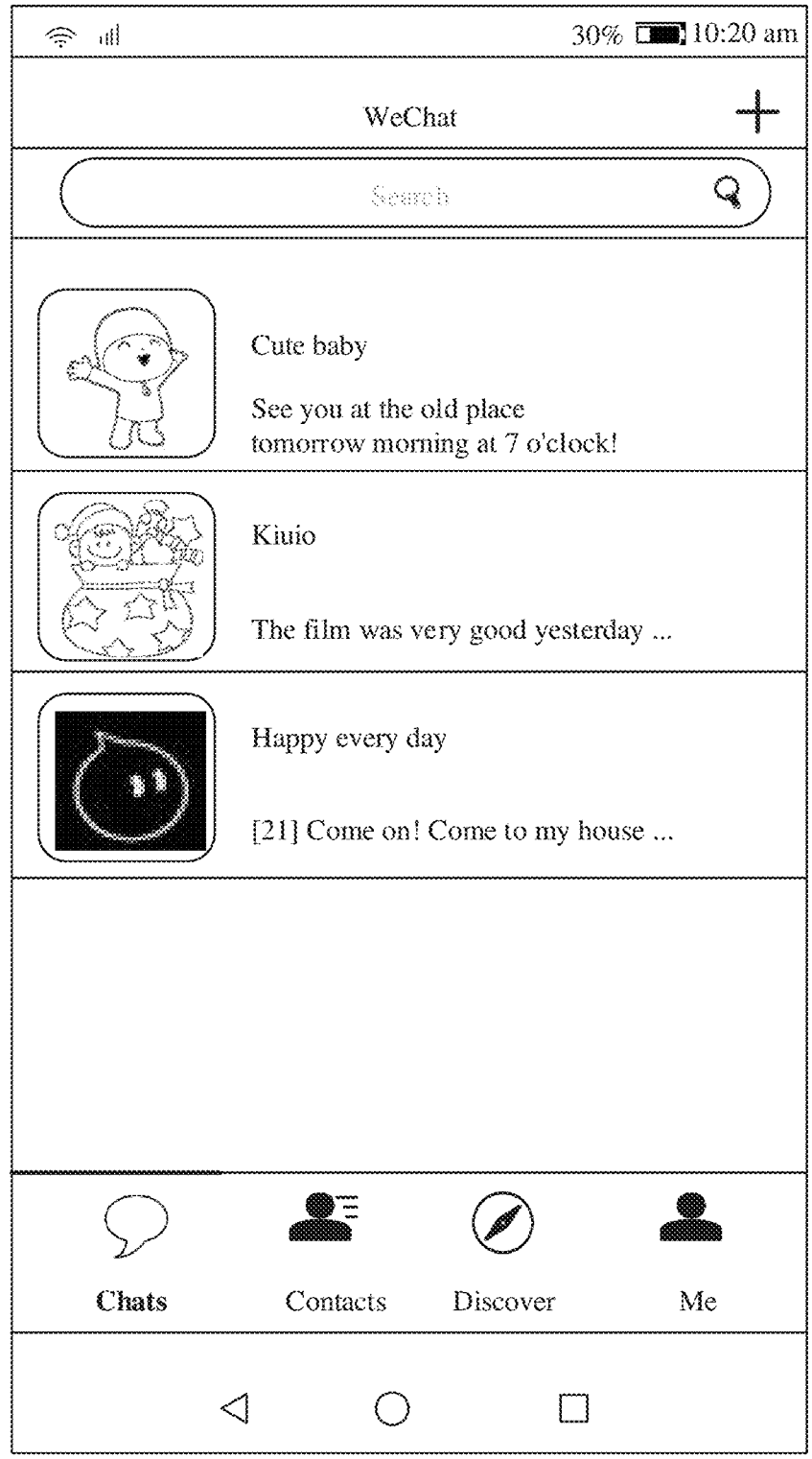
Figure 14C:
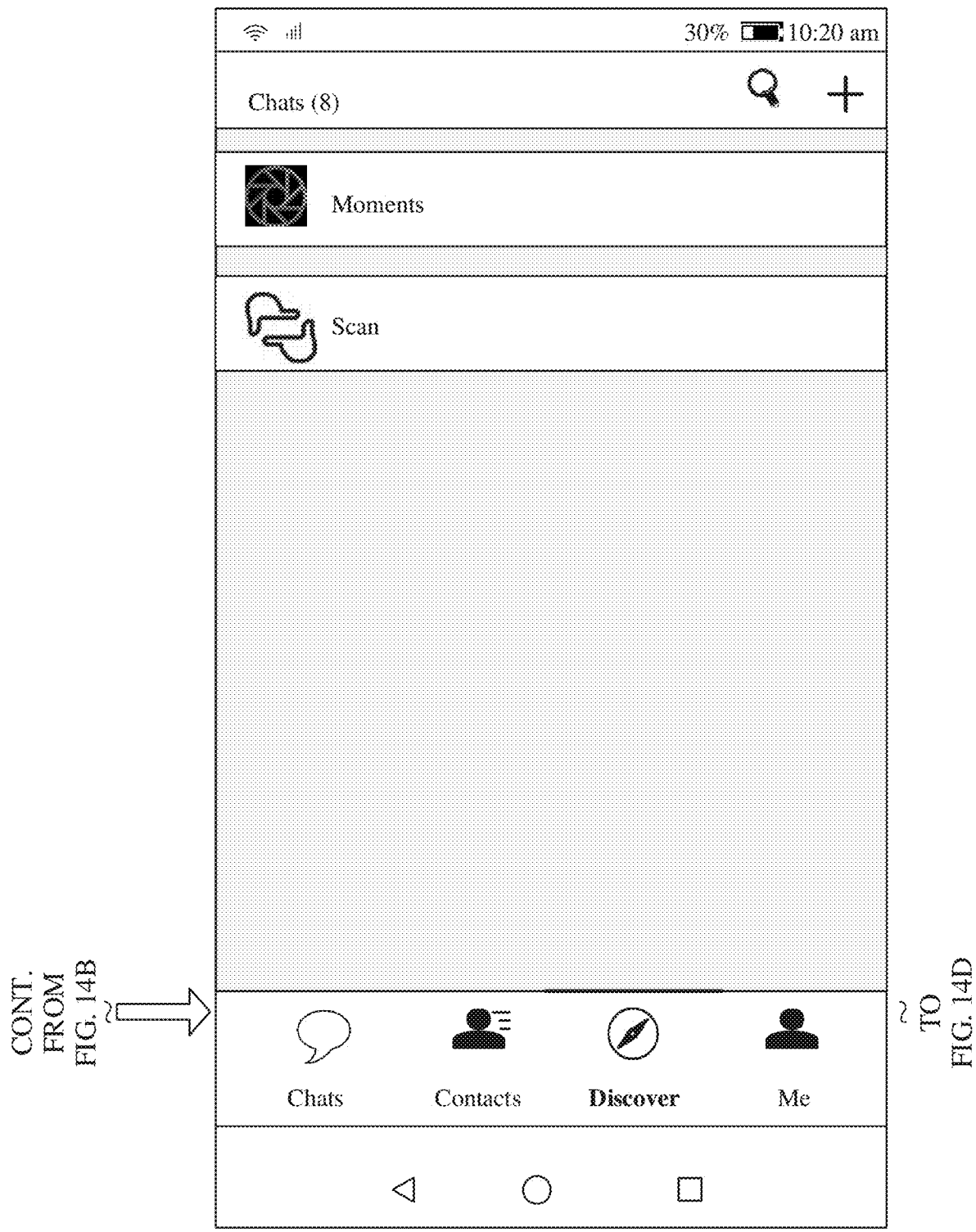
Figure 14D:
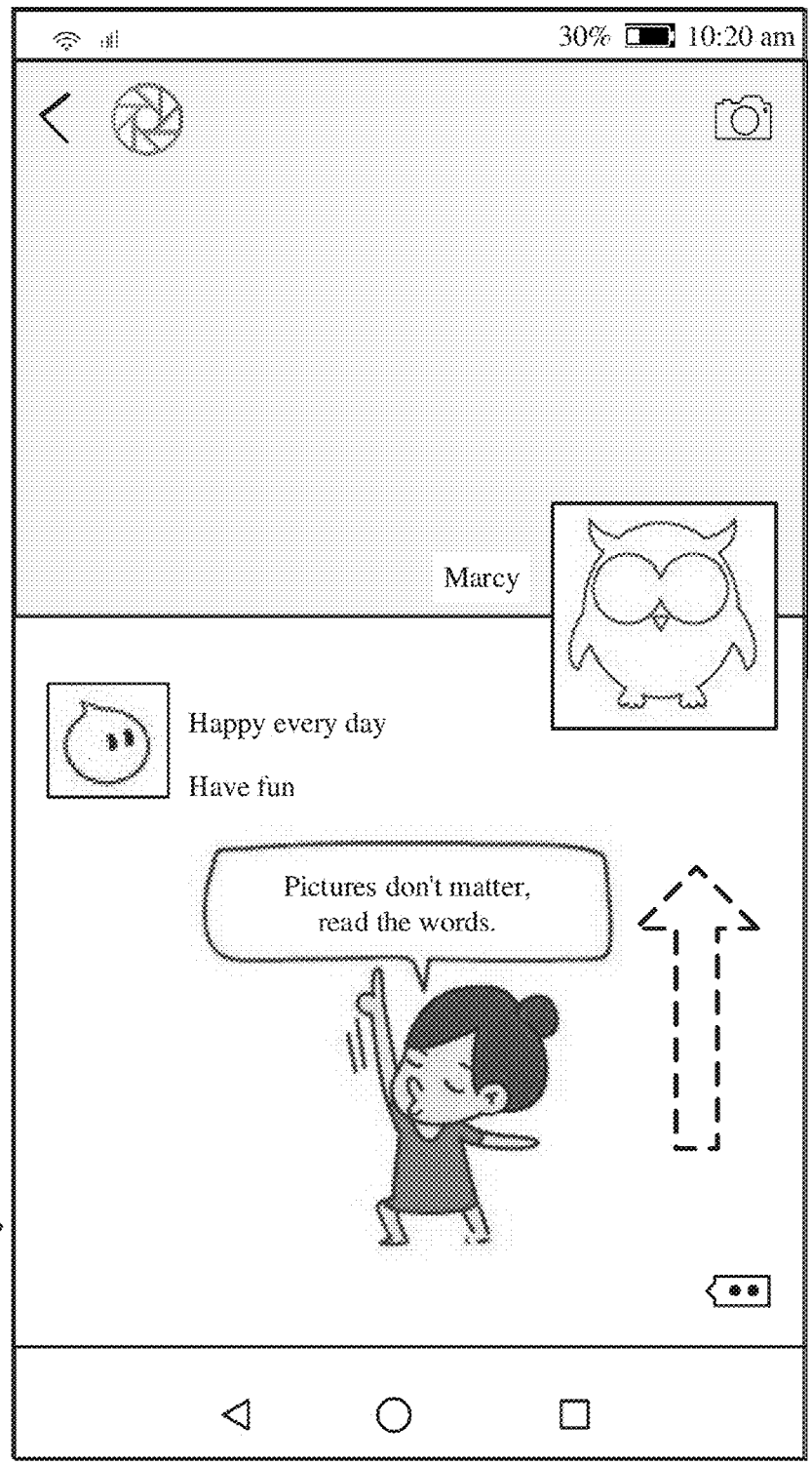
Figure 14E:
Figure 14F:
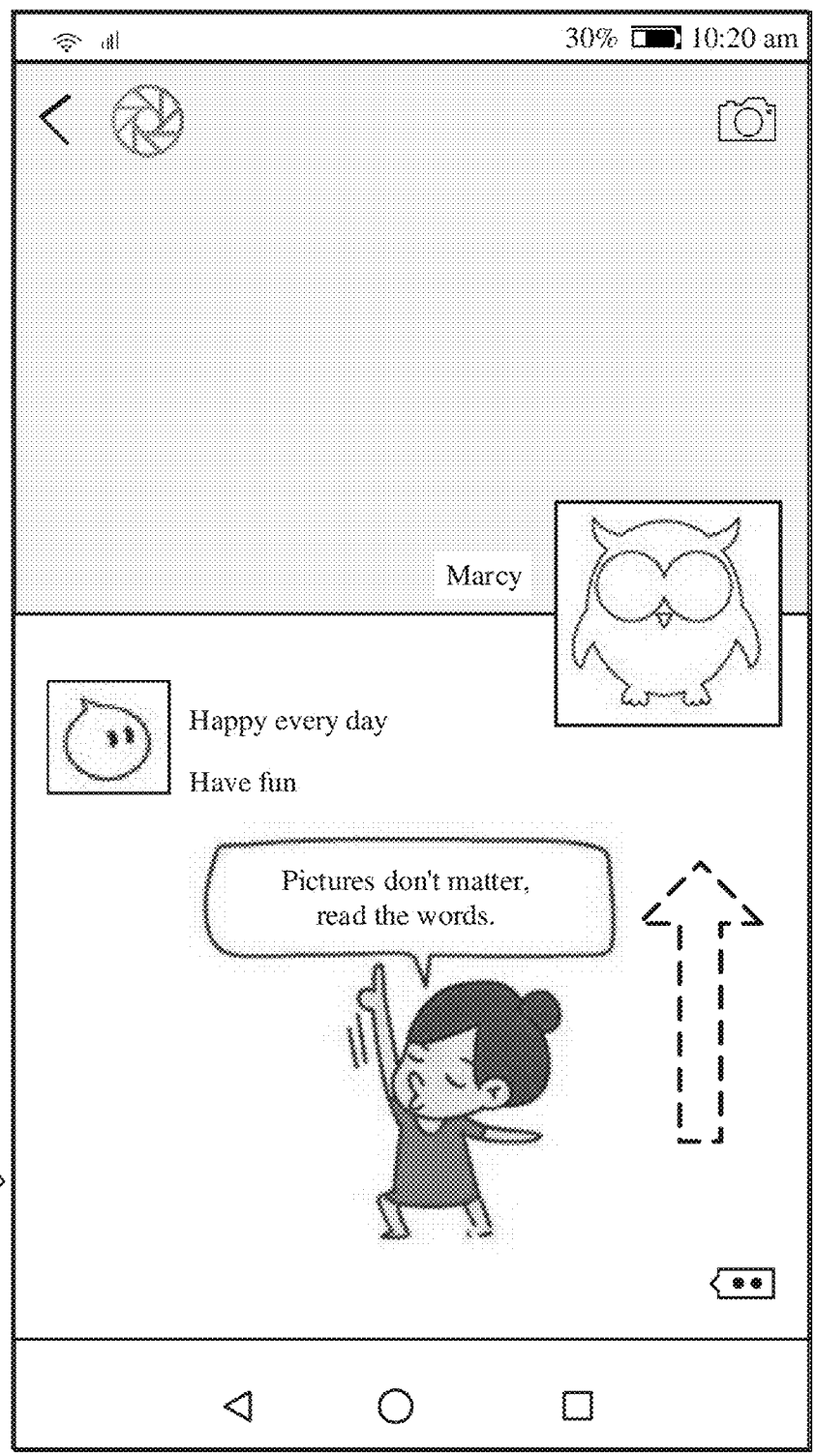
Figure 14G:
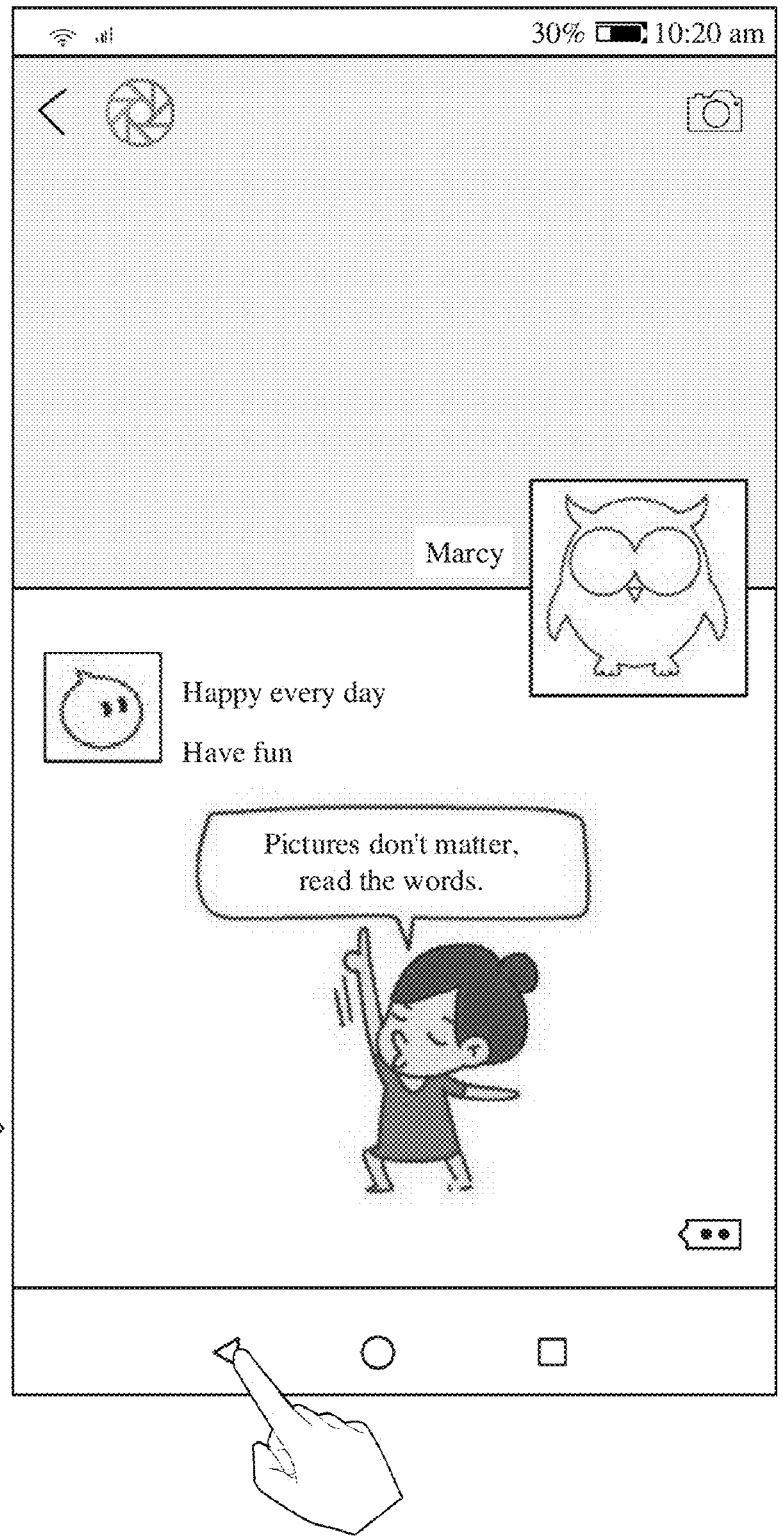
Figure 14H:
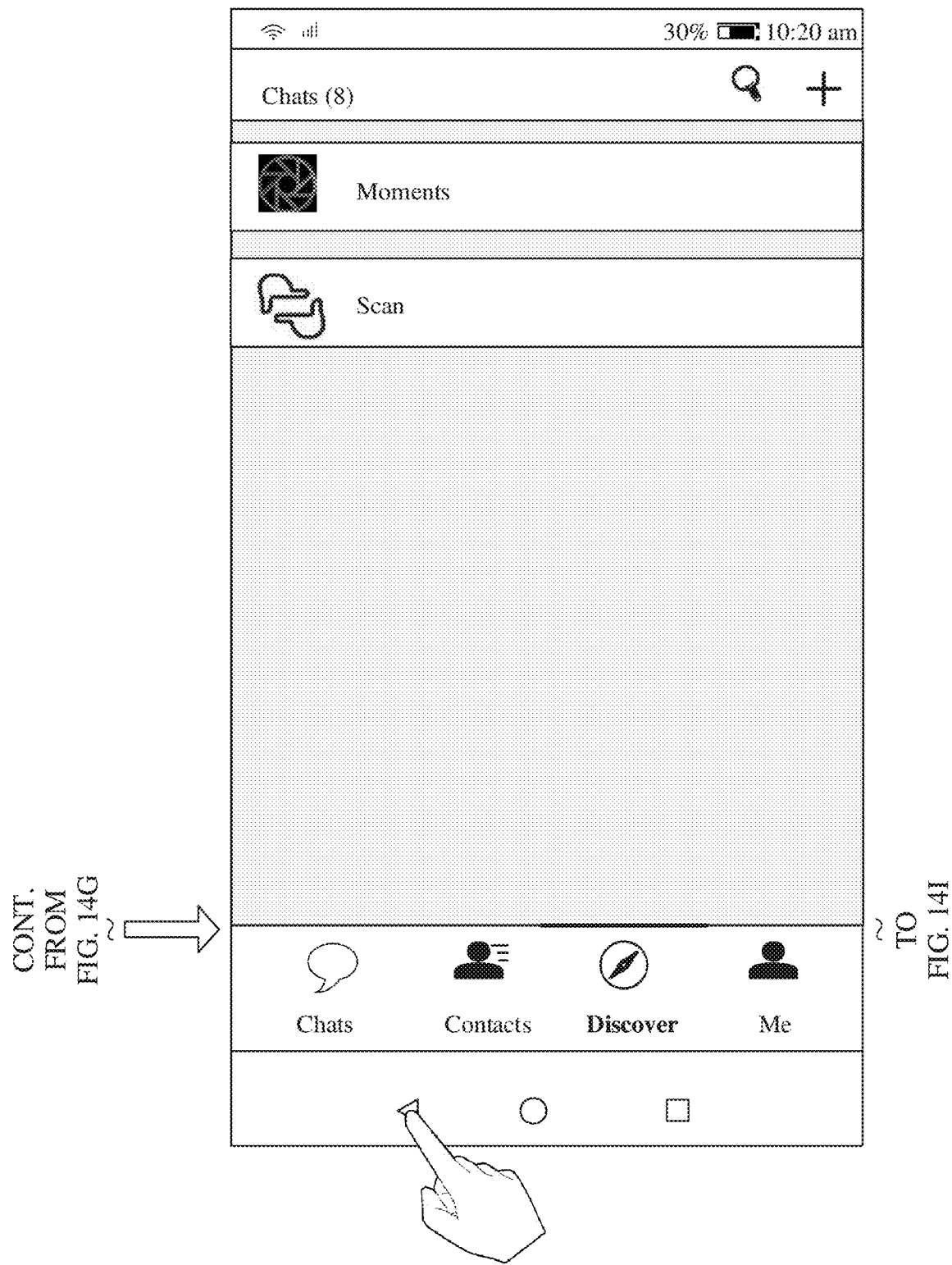
Figure 14I:
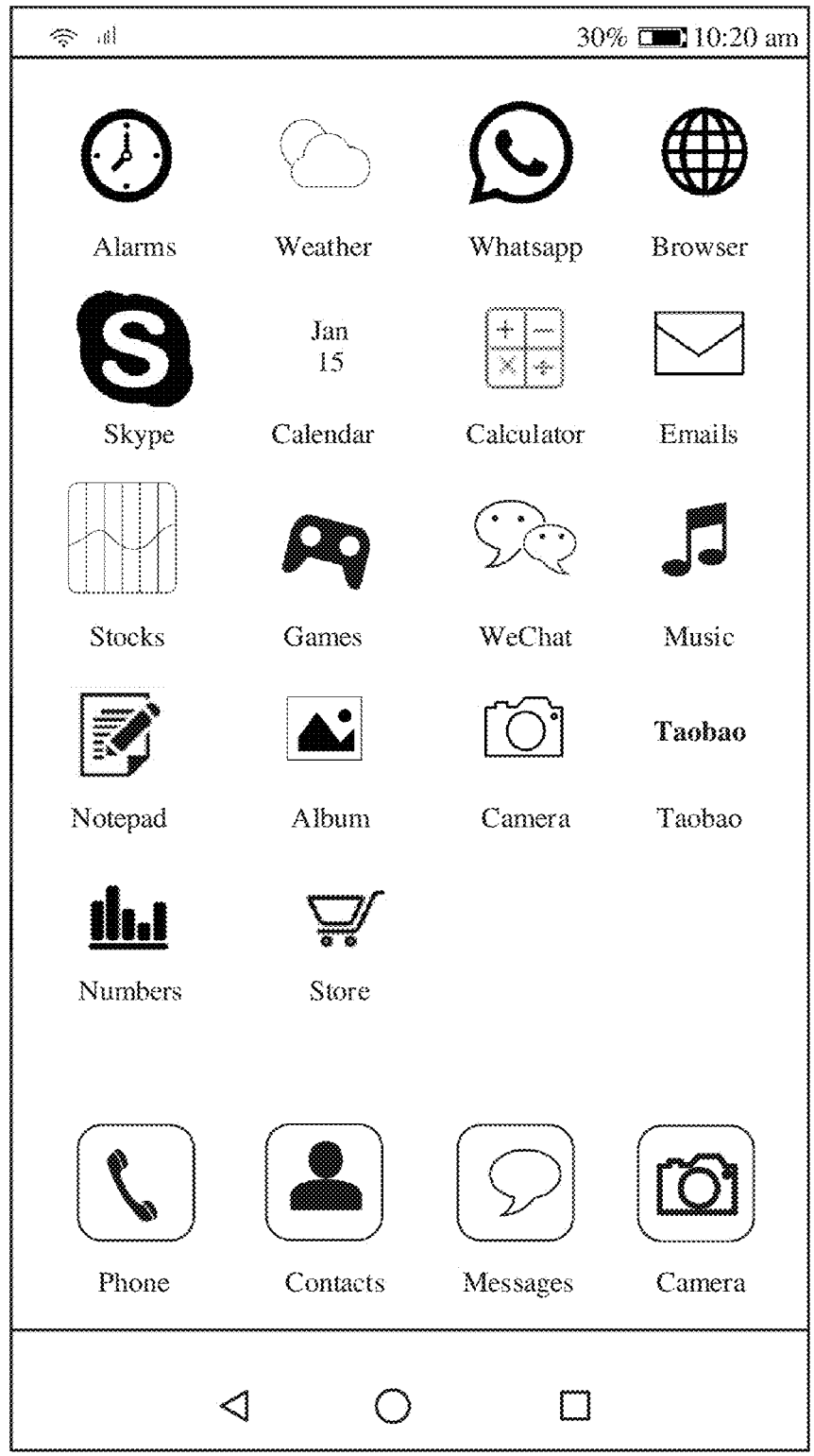

FIG. 14A to FIG. 14I show an application exception recovery method according to an embodiment of this application and an application scenario of an application exception recovery apparatus according to the embodiment of this application. In FIG. 14A, WeChat is tapped and therefore is started to a home page, as shown in FIG. 14B. An icon "Discover" at the bottom of the page is tapped to access Moments, as shown in FIG. 14C. The control "Moments" on an entry is tapped to go to an upper part of a Moments page shown in FIG. 14D. A user scrolls the page by using a gesture of sliding up to view content at a lower part of the Moments page, and then slides to a middle part of the Moments page shown in FIG. 14E. In the middle part of the Moments page, the ptrace function is used to trigger a null pointer exception in the application process. As a result, the Moments page crashes at a position shown in FIG. 14E. According to the recovery method/recovery apparatus, a snapshot of an exception page is displayed as a mask after an exception is detected. It may be noted that, in this embodiment, the mask is displayed in a full-screen manner, and both a status bar and a navigation bar are hidden. According to the recovery method, page information of the exception page and page information of a historical page are stored; and when the current crash is not a repeated crash, the page information of the exception page and the page information of the historical page are combined and the application is restarted based on the combination. After the restart is completed, the mask is removed, and the re-created exception page is displayed on the foreground, as shown in FIG. 14F. It may be noted that, because the application does not store a position of an explicit or implicit scroll bar when storing the information about the exception page, the re-created exception page is displayed at the top of the page. The historical page means all pages displayed between a moment at which the application is started and a moment at which a previous page of the exception page is displayed. Therefore, at least a part of the historical page can be reproduced when a back button is pressed after the application is recovered. For a purpose of verification, the back button is pressed on the recovered exception page, as shown in FIG. 14G. The application returns to the Moments entry, as shown in FIG. 14H. The back button is continued to be pressed, WeChat exits, and the home screen of the electronic device is displayed, as shown in FIG. 14I. This is because of settings of the application. If the back button is pressed in the Moments entry, the application directly exits, and the home page on which a message list is displayed is not returned to. In this embodiment, because of the settings of the application, only a part of the historical page can be reproduced by pressing the back button after the recovery.

Figure 15A:
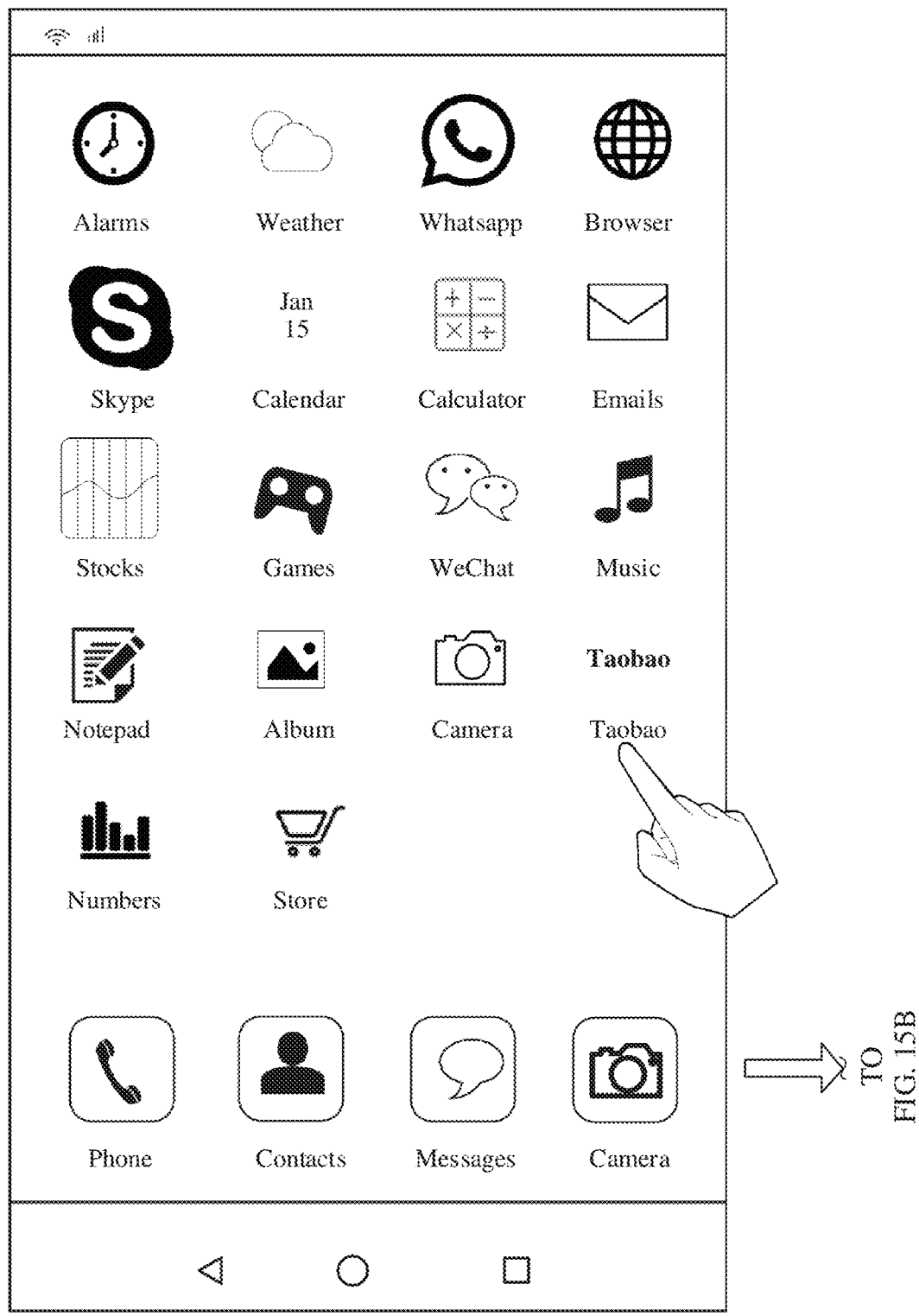
FIG. 15A to FIG. 15D show an application exception recovery method according to an embodiment of this application and an application scenario of an application exception recovery apparatus according to the embodiment of this application.
Figure 15B:
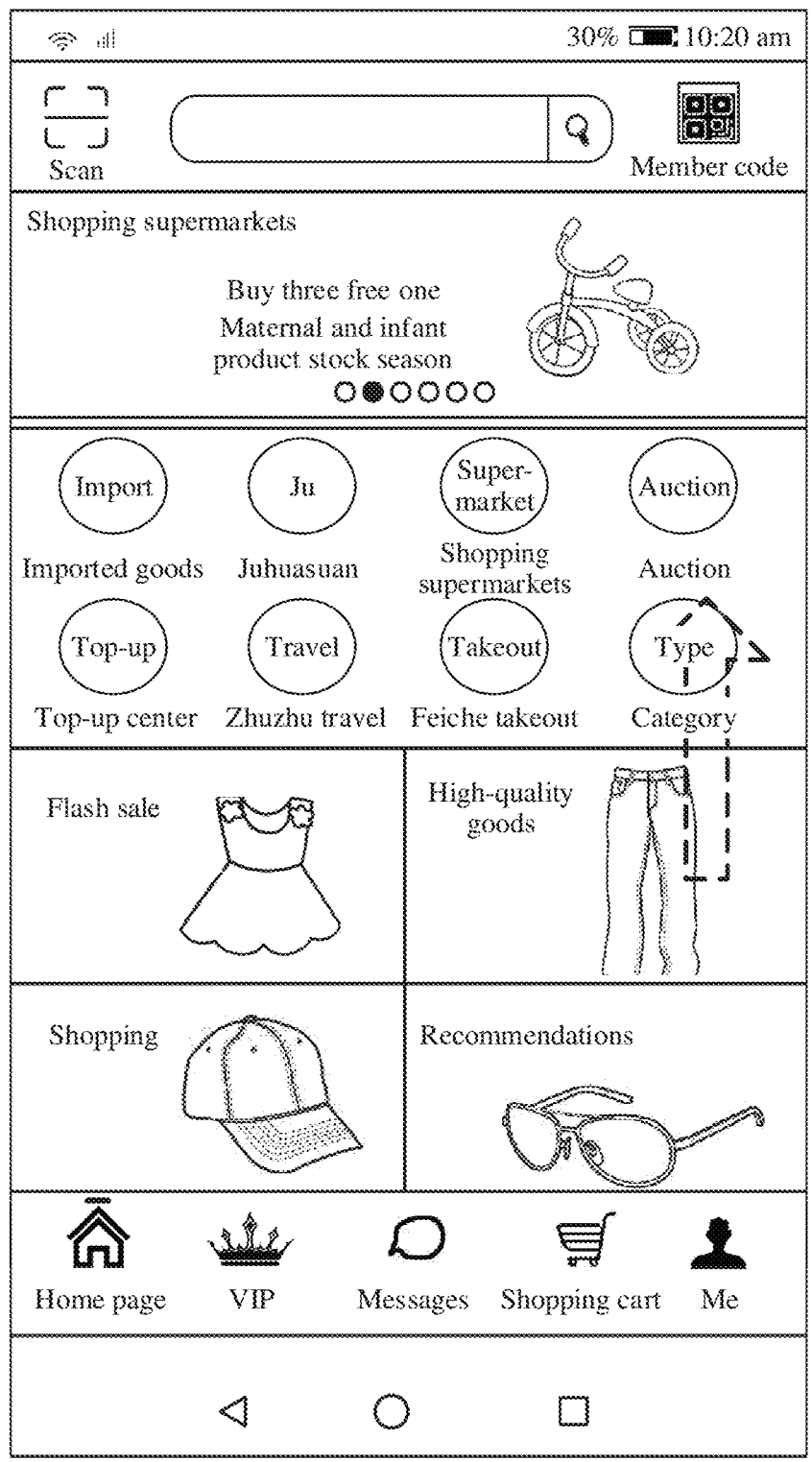
Figure 15C:
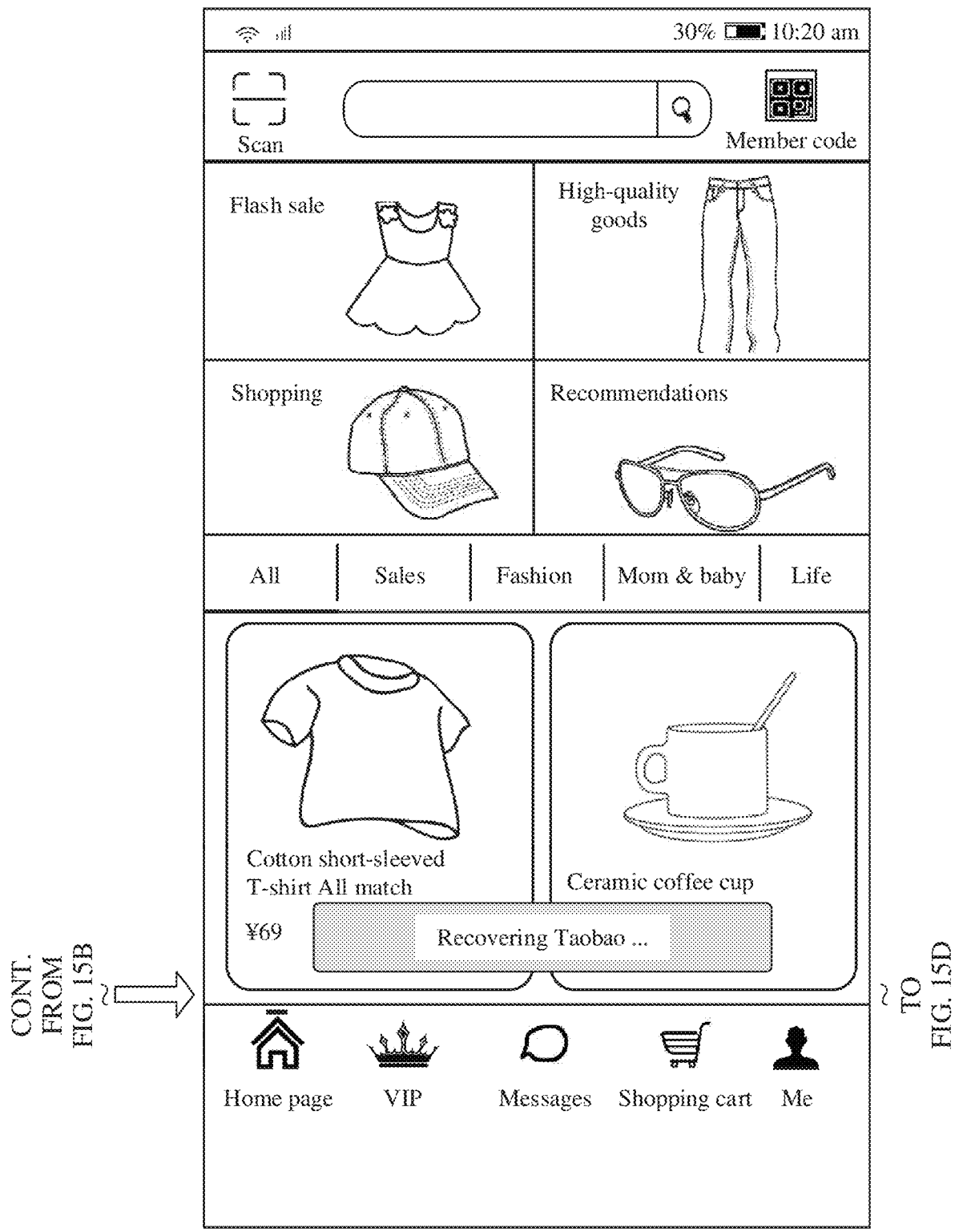
Figure 15D:
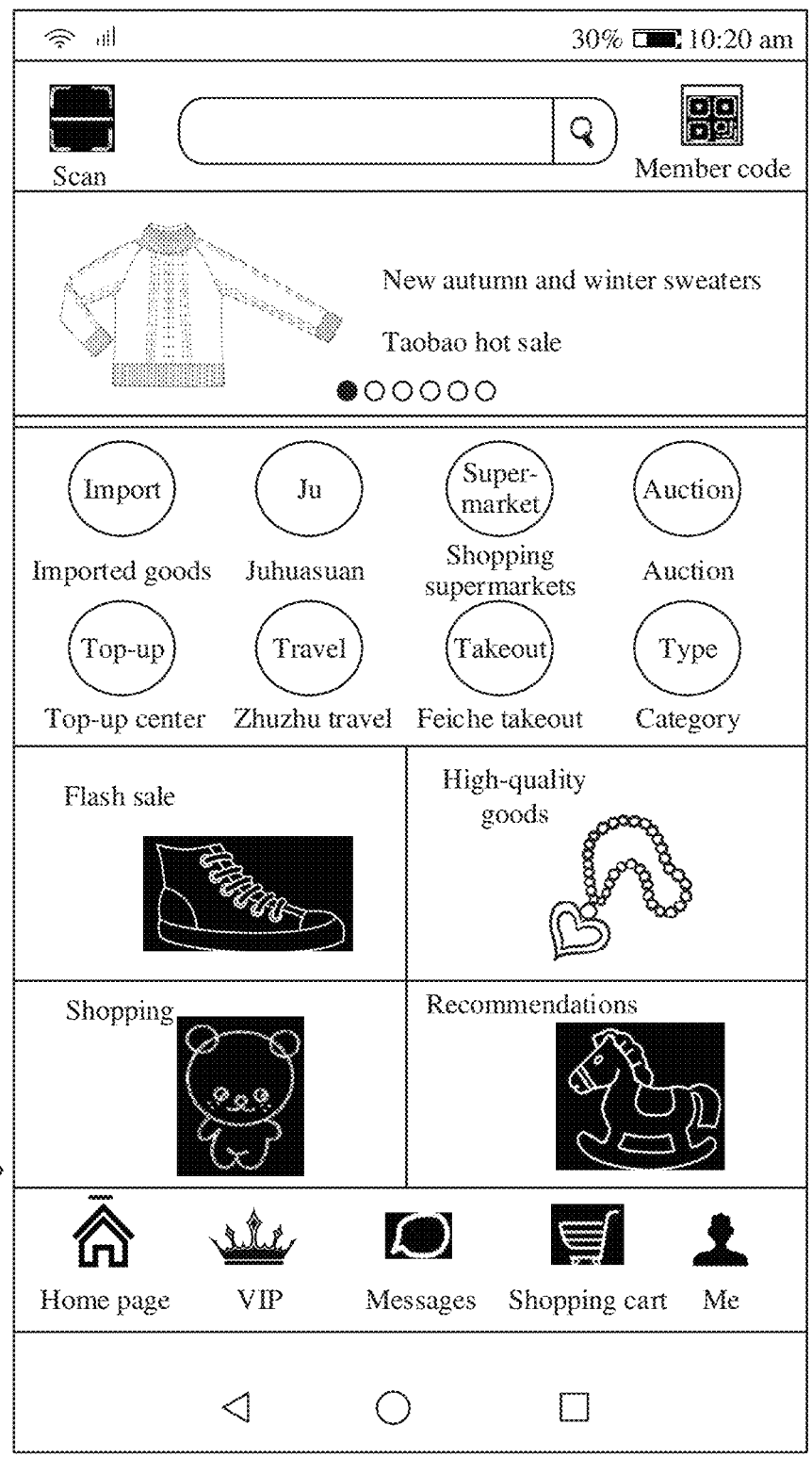

FIG. 15A to FIG. 15D show an application exception recovery method according to an embodiment of this application and an application scenario of an application exception recovery apparatus according to the embodiment of this application. FIG. 15A shows a home screen of an electronic device. Taobao is tapped and therefore is started to a home page, as shown in FIG. 15B. The page slides up to display a lower part. When the application crashes, some snapshots displayed on the foreground are stored as masks, as shown in FIG. 15C. According to the recovery method, the procedure shown in FIG. 9A, FIG. 9B-1, and FIG. 9B-2 is performed to restart the application. After the restart is completed, the mask is removed, and the re-created exception page is displayed on the foreground, as shown in FIG. 15D. The entire recovery process is completed within is. It may also be found that an upper part of the exception page is displayed for the re-created exception page, and an advertisement dynamically pushed by Taobao on the re-created exception page is different from an advertisement on the exception page displayed before the crash occurs.

Figure 16A:
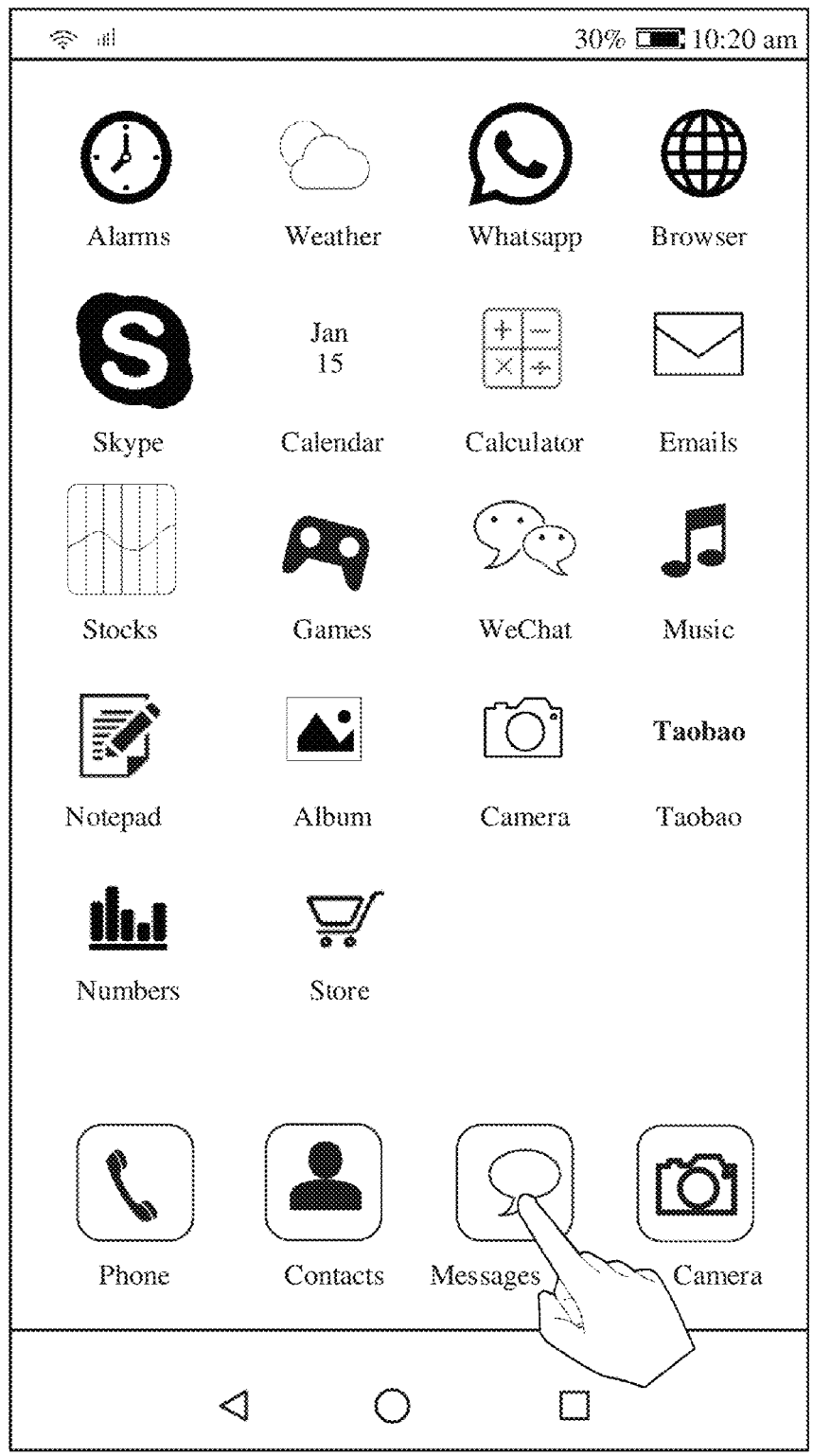
FIG. 16A to FIG. 16G show an application exception recovery method according to an embodiment of this application and an application scenario of an application exception recovery apparatus according to the embodiment of this application.
Figure 16B:
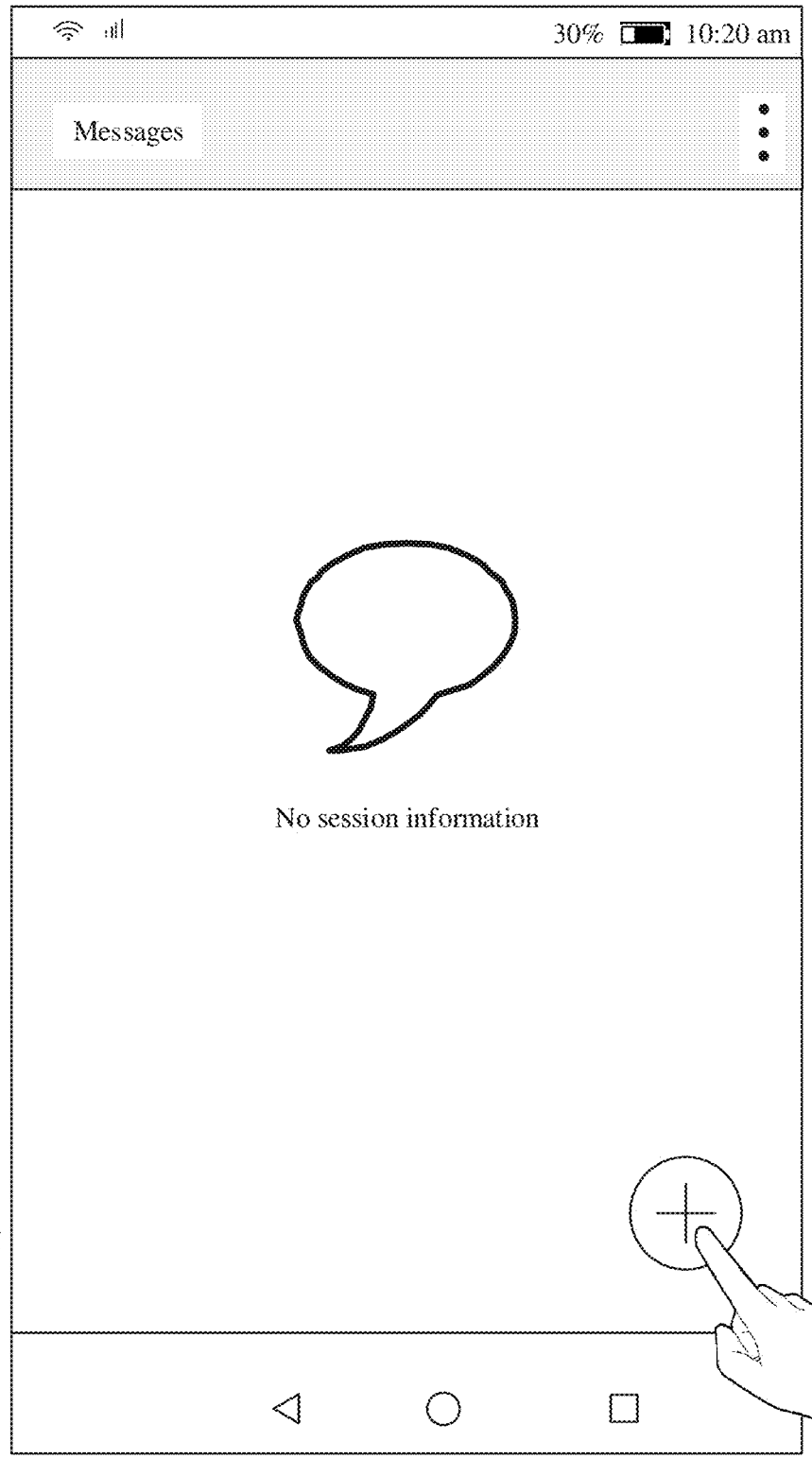
Figure 16C:
Figure 16D:
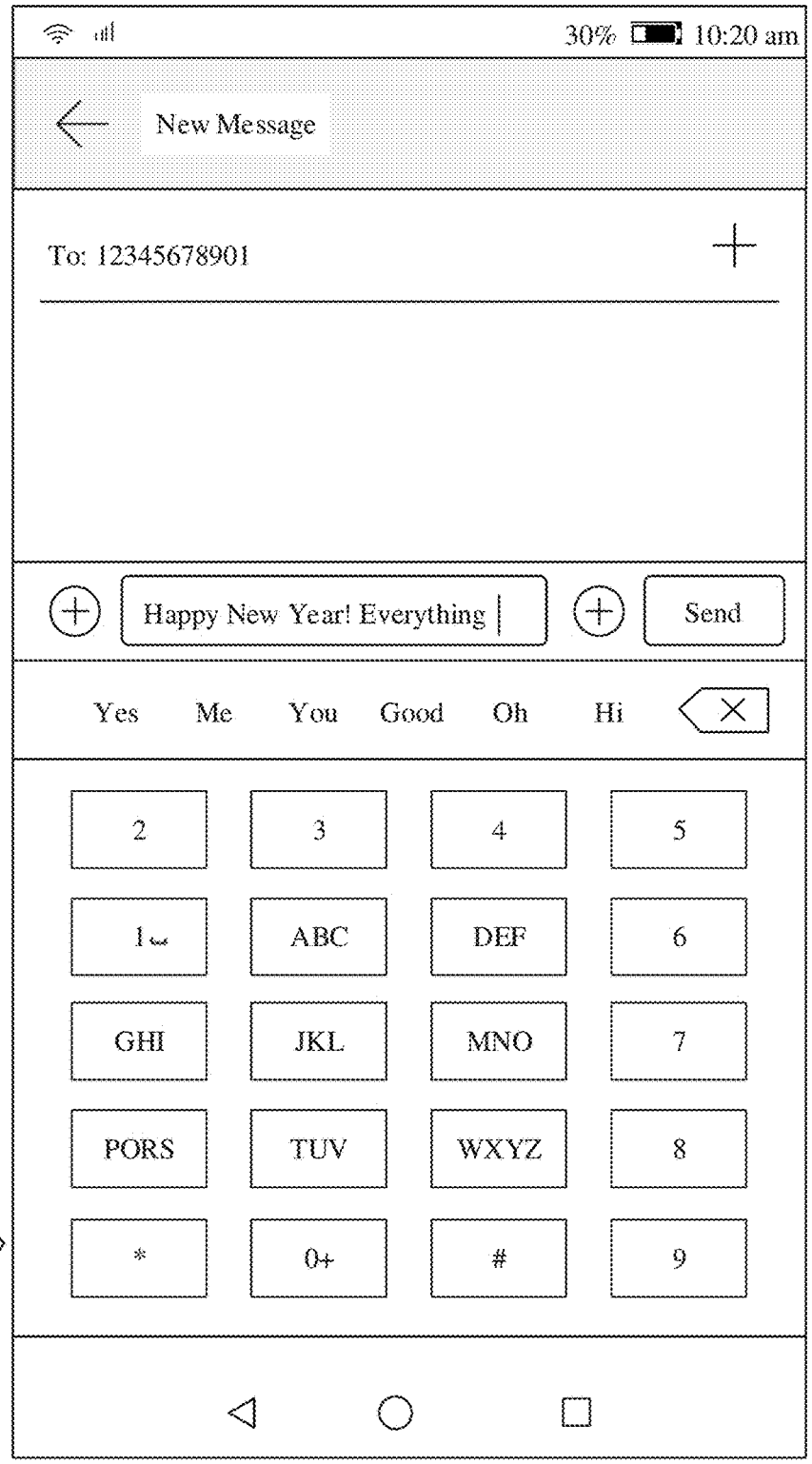

FIG. 16A to FIG. 16G show an application exception recovery method according to an embodiment of this application and an application scenario of an application exception recovery apparatus according to the embodiment of this application. FIG. 16A shows a home screen of an electronic device. A short message application is tapped and therefore is started to a home page of the application shown in FIG. 16B. A button for adding a new message is taped, so that a new message editing page shown in FIG. 16C is entered. On the new message editing page, a phone number of a recipient is entered in a recipient bar, and some text is entered in a message bar, as shown in FIG. 16D. During text editing in the message bar, the application crashes. According to the recovery method, after detecting an exception that causes the crash, the application starts to be recovered, and the procedure shown in FIG. 9A, FIG. 9B-1, and FIG. 9B-2 is executed. A bundle of an exception page is stored when information about the exception page is stored. The bundle records impact exerted by a user on the page, that is, a phone number of a recipient and text entered in the message bar in this embodiment. When the bundle is stored, whether a cursor position can be stored, that is, whether a focus of an edit control can be recorded, depends on whether the application records the information in bundle information.

Figure 16E:
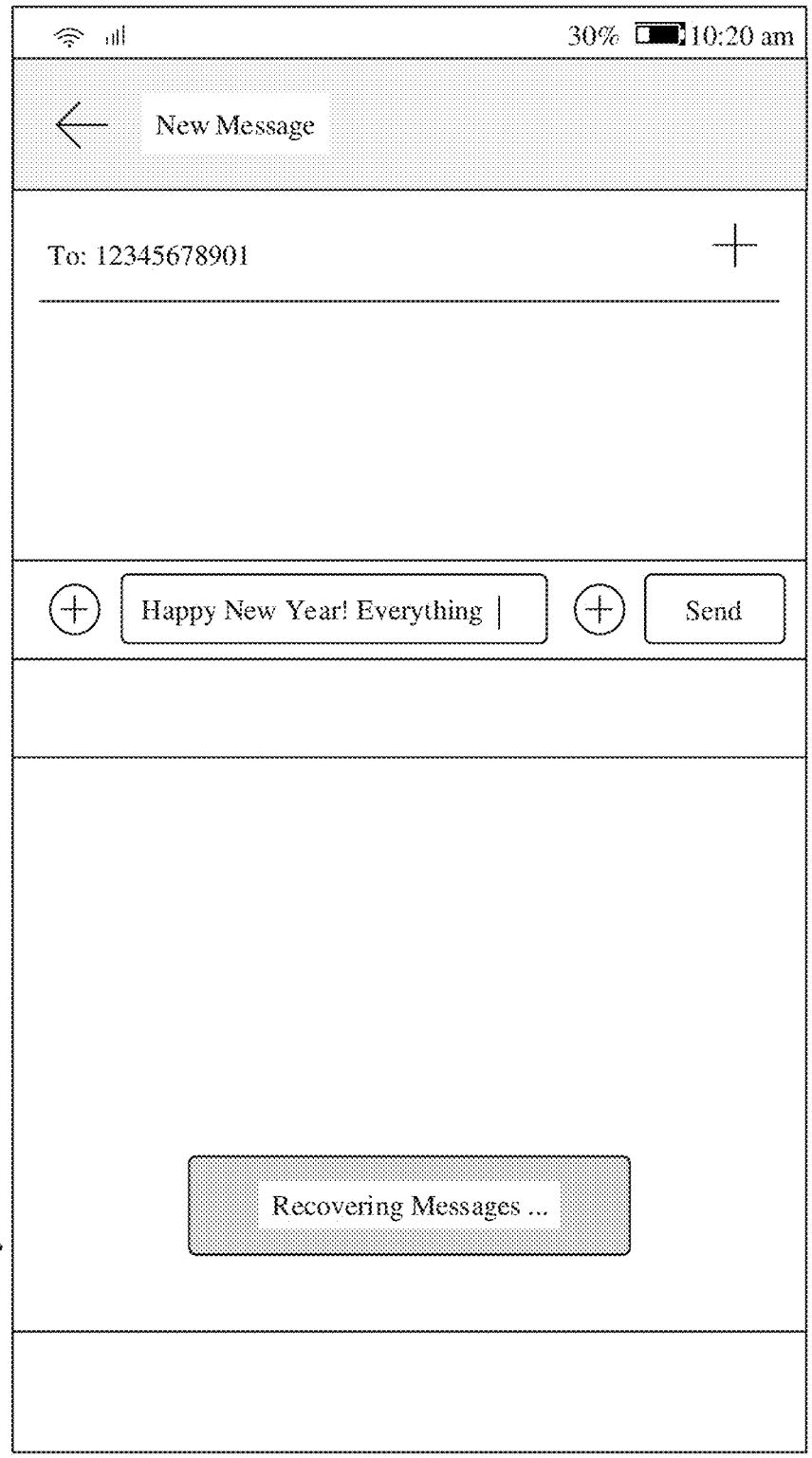

In the recovery process, a snapshot of the exception page is displayed as a mask by hiding a navigation bar, as shown in FIG. 16E. It can be seen that there is no keyboard in the snapshot because the keyboard does not belong to the short message application and the snapshot of the exception page is obtained by obtaining a page snapshot of the short message application from a system service. In some other implementations, the snapshot of the exception page may be obtained in a screenshot manner, and the keyboard is further displayed on the mask.

Figure 16F:

FIG. 16F shows the re-created exception page. It can be seen that a phone number of a recipient and text edited when the crash occurs are recovered, which indicates that previous work of the user is not lost. As a result, the crash imposes little negative impact on the user. It can be seen that the re-created exception page of the short message application is displayed, and therefore a keyboard that belongs to another application is not displayed. In some other implementations, the keyboard application may be automatically invoked when the re-created exception page of the short message application is displayed, so that the page shown in FIG. 16D can be displayed.

Figure 16G:
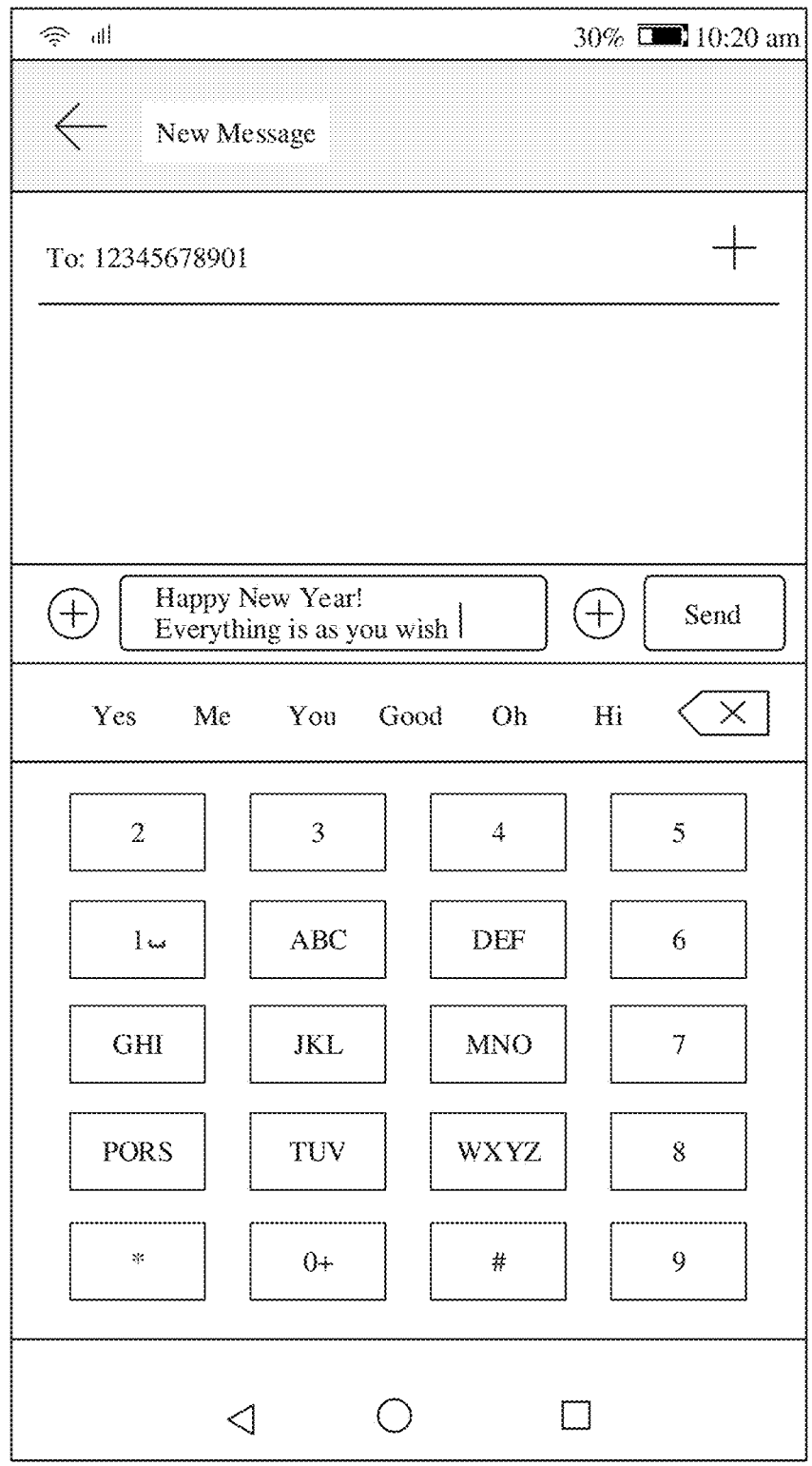

Editing may be continued on the re-created exception page, as shown in FIG. 16G. A keyboard application is invoked during editing.

Figure 17A:
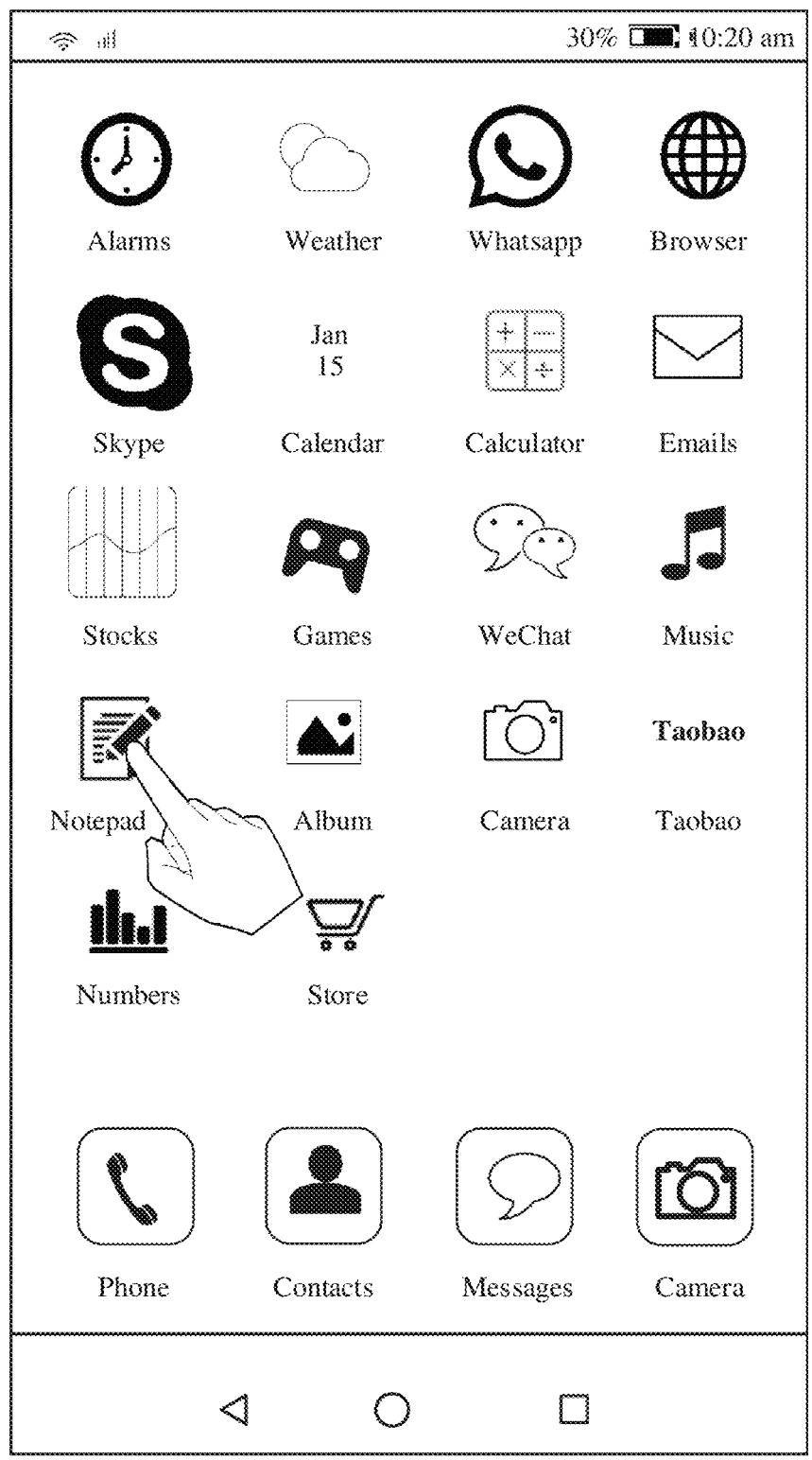
FIG. 17A to FIG. 17G show an application exception recovery method according to an embodiment of this application and an application scenario of an application exception recovery apparatus according to the embodiment of this application.
Figure 17B:
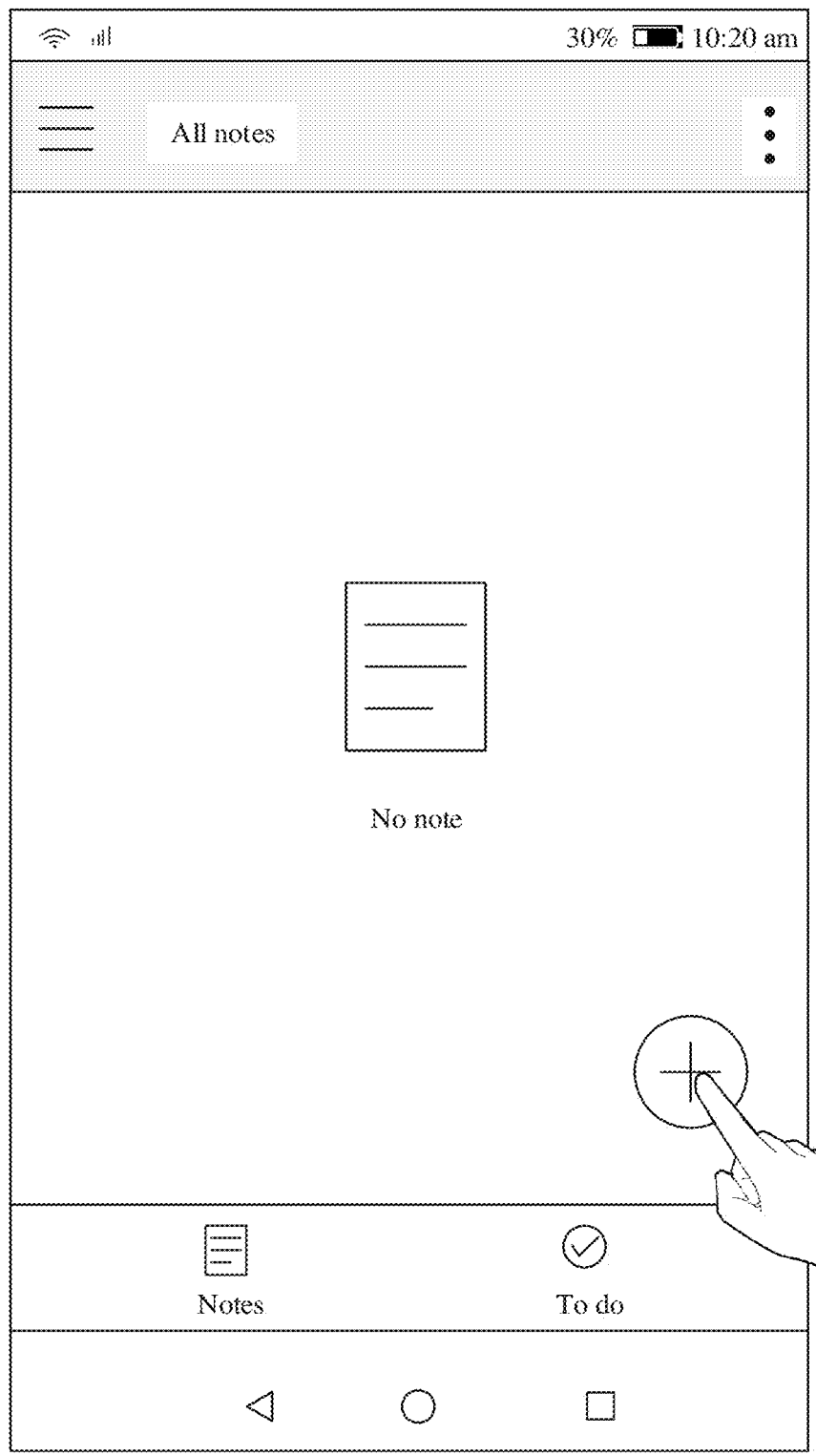
Figure 17C:
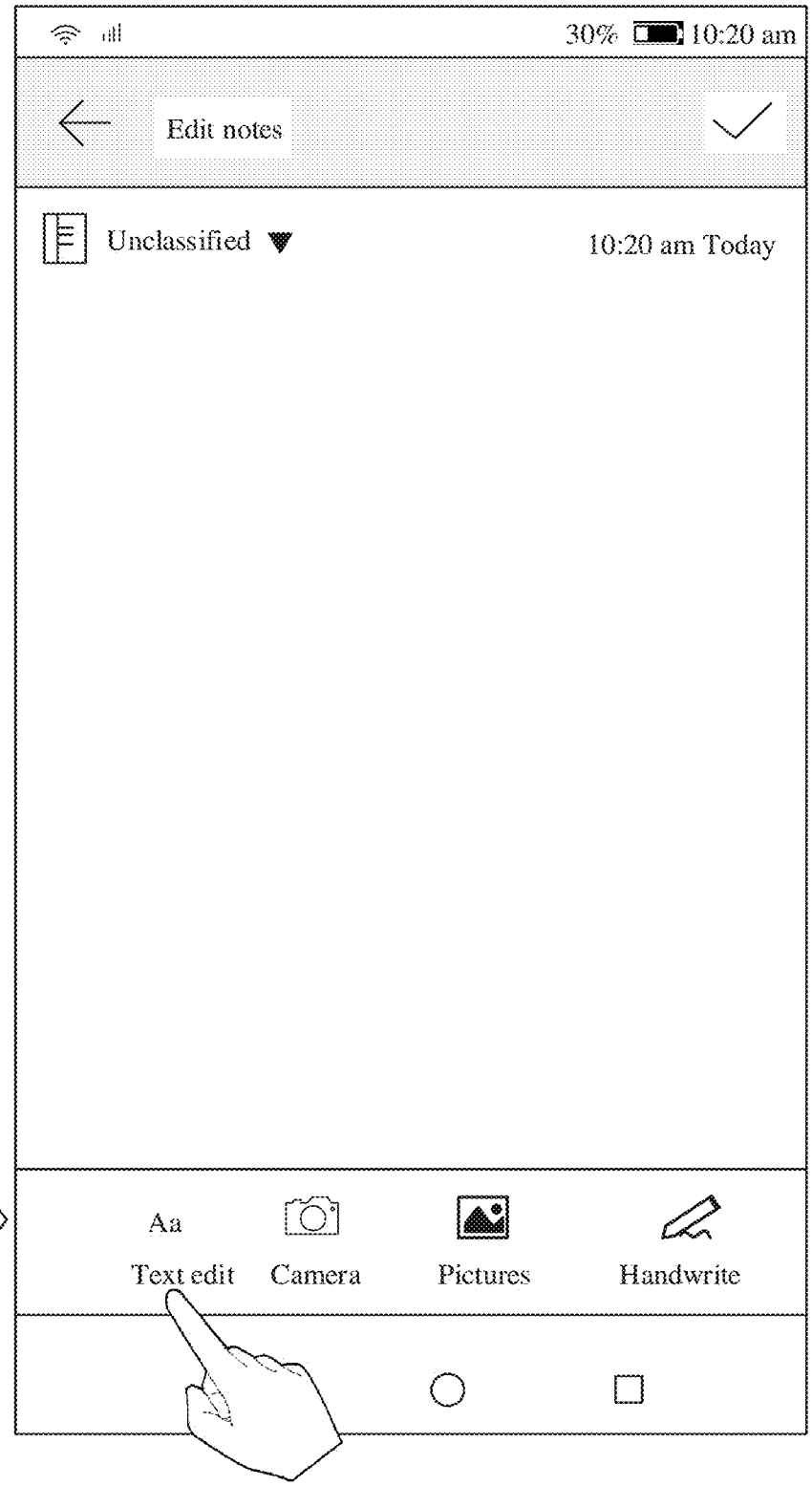
Figure 17D:
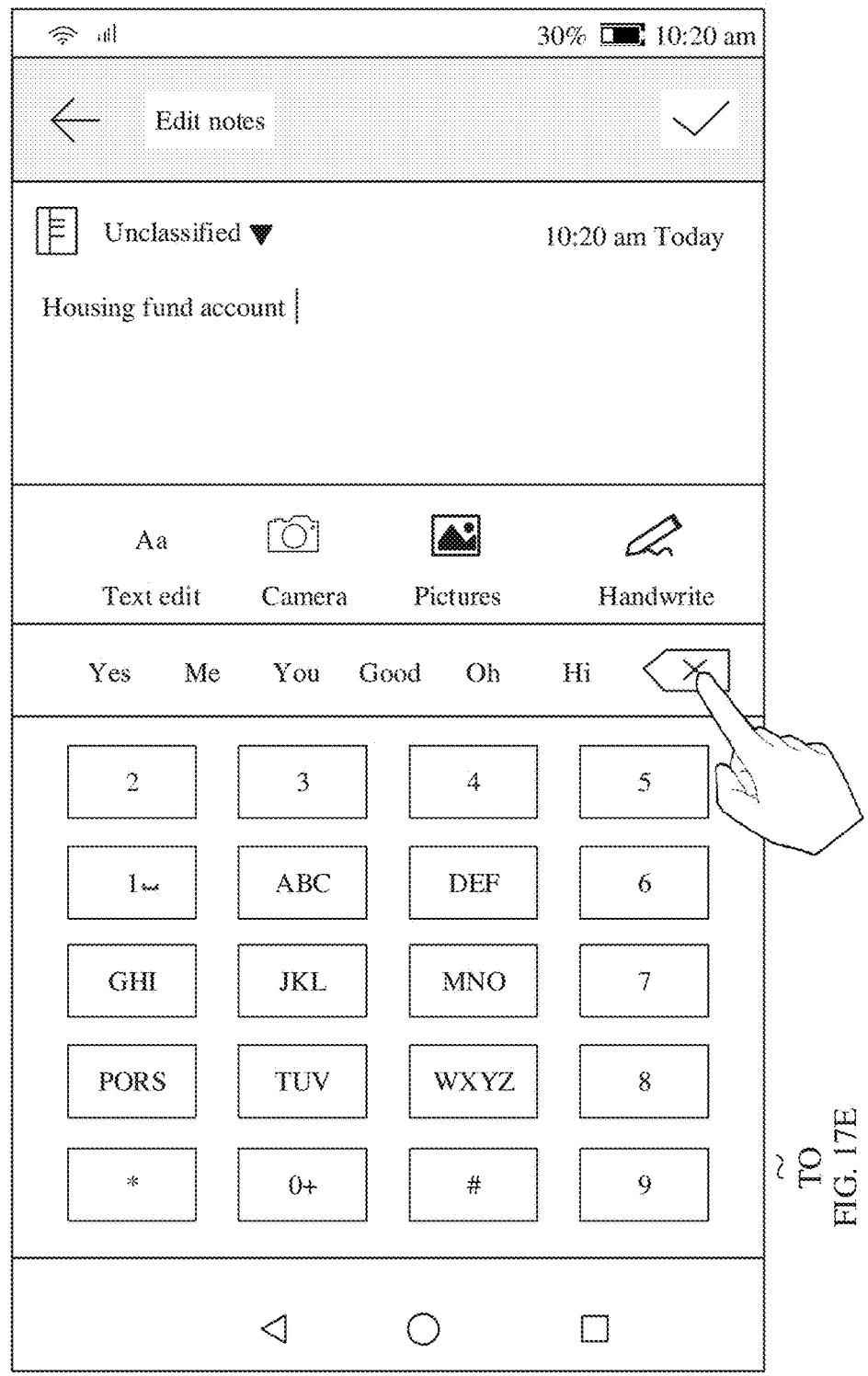
Figure 17E:
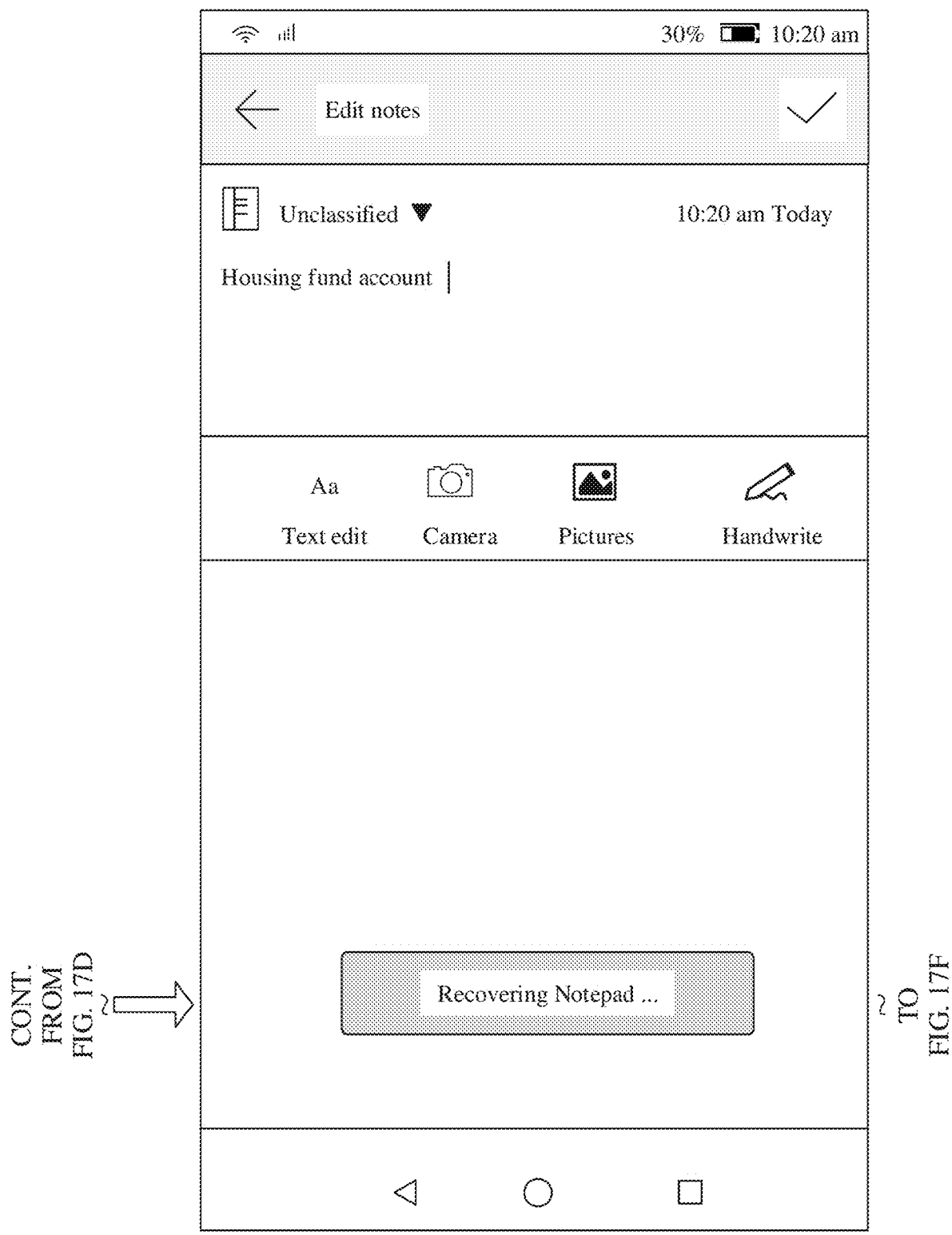

FIG. 17A to FIG. 17G show an application exception recovery method according to an embodiment of this application and an application scenario of an application exception recovery apparatus according to the embodiment of this application. FIG. 17A shows a home screen of an electronic device. A notepad application is tapped and therefore is started to a home page shown in FIG. 17B. A button of adding a new note is triggered, so that an edit page shown in FIG. 17C is displayed. An edit operation is performed on the edit page, and the edit operation includes entering some text in a note control, as shown in FIG. 17D. During the editing, the application crashes and starts to recover. A bundle is stored when page information is stored. The bundle records the text entered by a user in the note control, and the position and layout of the text. A snapshot of an exception page is displayed on an application window as a mask, and a pop-up box is added to indicate that the application is being recovered, as shown in FIG. 17E. It can be seen that there is no keyboard in the snapshot because the keyboard does not belong to the notepad application and the snapshot of the exception page is obtained by obtaining a page snapshot of the notepad application from a system service. In some other implementations, the snapshot of the exception page may be obtained in a screenshot manner, and the keyboard is further displayed on the mask. In some implementations, the system extracts a TOP frame from BufferQueue of a current application layer and puts the TOP frame into a backup graphics buffer (Graphics buffer), and then a window manager creates a system activity and a snapshot window and binds a previously stored screenshot graphics buffer without performing any copying operation. This reduces system memory overheads.

Figure 17F:
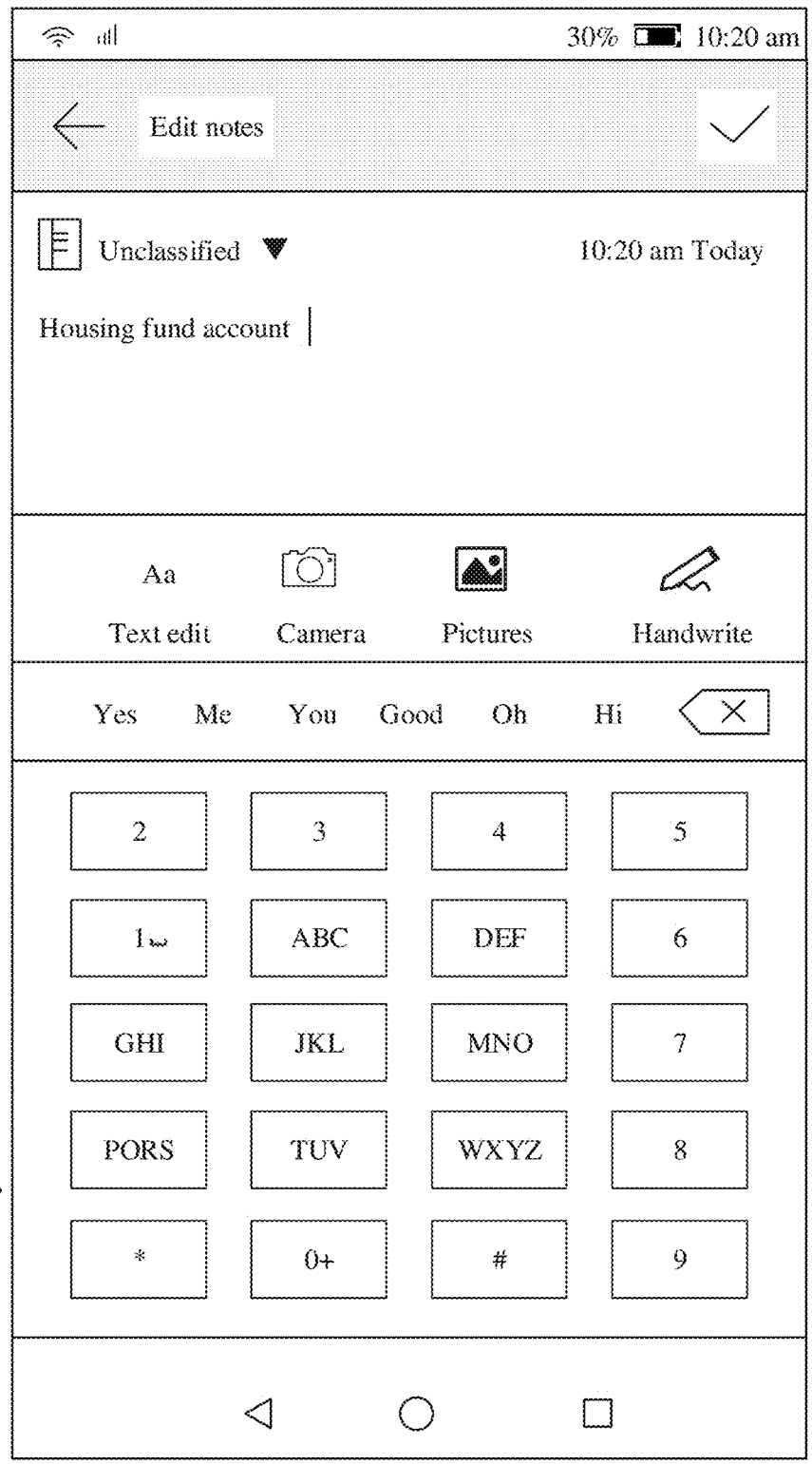

After the recovery is completed, the re-created exception page is displayed on the application window. Bundle information is reproduced, to be specific, the text that has been edited when the crash occurs is reproduced, as shown in FIG. 17F. It can be seen that the keyboard is also displayed when the re-created exception page of the notepad application is displayed because the notepad application automatically invokes the keyboard application. In some other implementations, when the exception page of the notepad application is displayed on the foreground, the keyboard application is not automatically invoked, and the keyboard in FIG. 17F is not displayed.

Figure 17G:
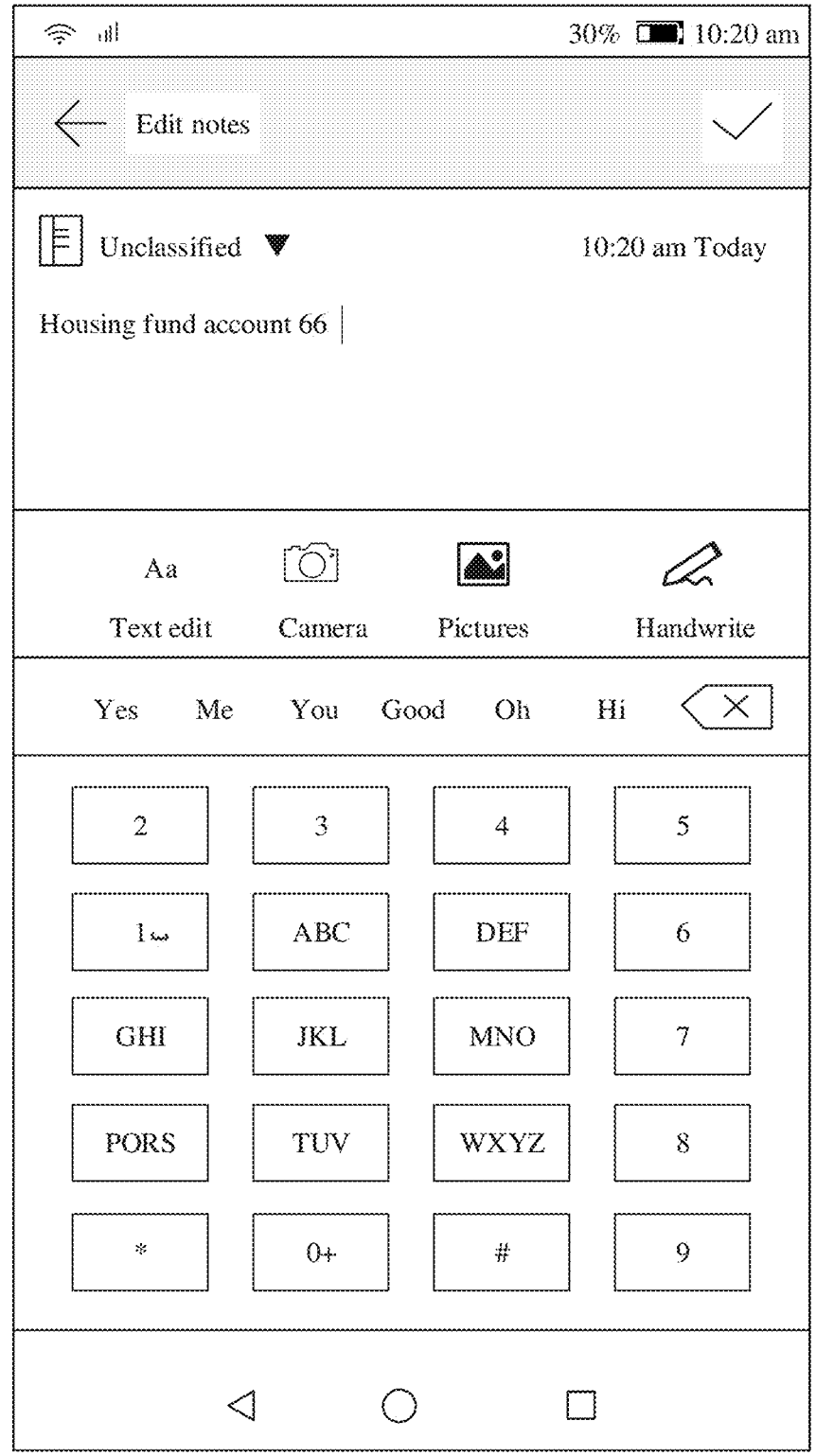

Editing may be continued on the re-created exception page, as shown in FIG. 17G. For the user, there is only a pause of few seconds between the crash and the continued editing. Therefore, there is no loss of information and no need to repeat any operation.

Figure 18A:
Figure 1:
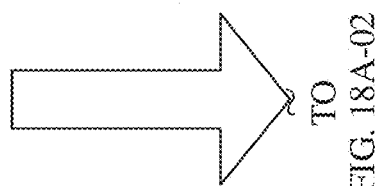
Figures 2, 18A:
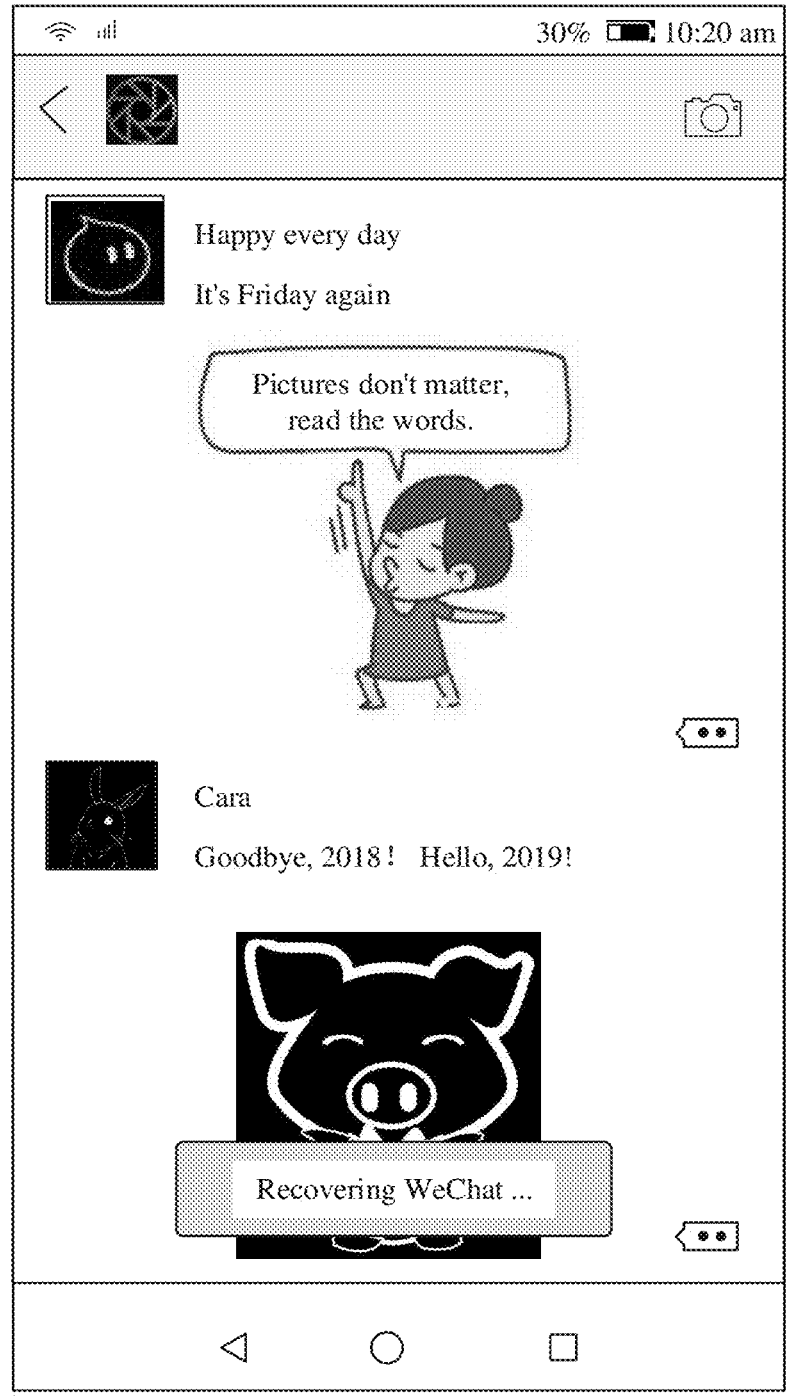

FIG. 18A-01 and FIG. 18A-02 show an application exception recovery method according to an embodiment of this application and an application scenario of an application exception recovery apparatus according to the embodiment of this application. FIG. 18A-oi shows that an application is being recovered. In this embodiment, a navigation bar is hidden when a mask is displayed by using a View.SYSTEM_UI_FLAG_LAYOUT_HIDE_NAVIGATION command. As a manner in which impact imposed by an application exception on a user is relatively small, in this embodiment, a snapshot of a navigation bar is covered at a lower part of the snapshot. The snapshot is not a real navigation bar and cannot be operated. Therefore, after a home button is tapped in FIG. 18A-oi, it is found that the electronic device does not respond to the home button, as shown in FIG. 18A-02.

Figures 1, 18B:
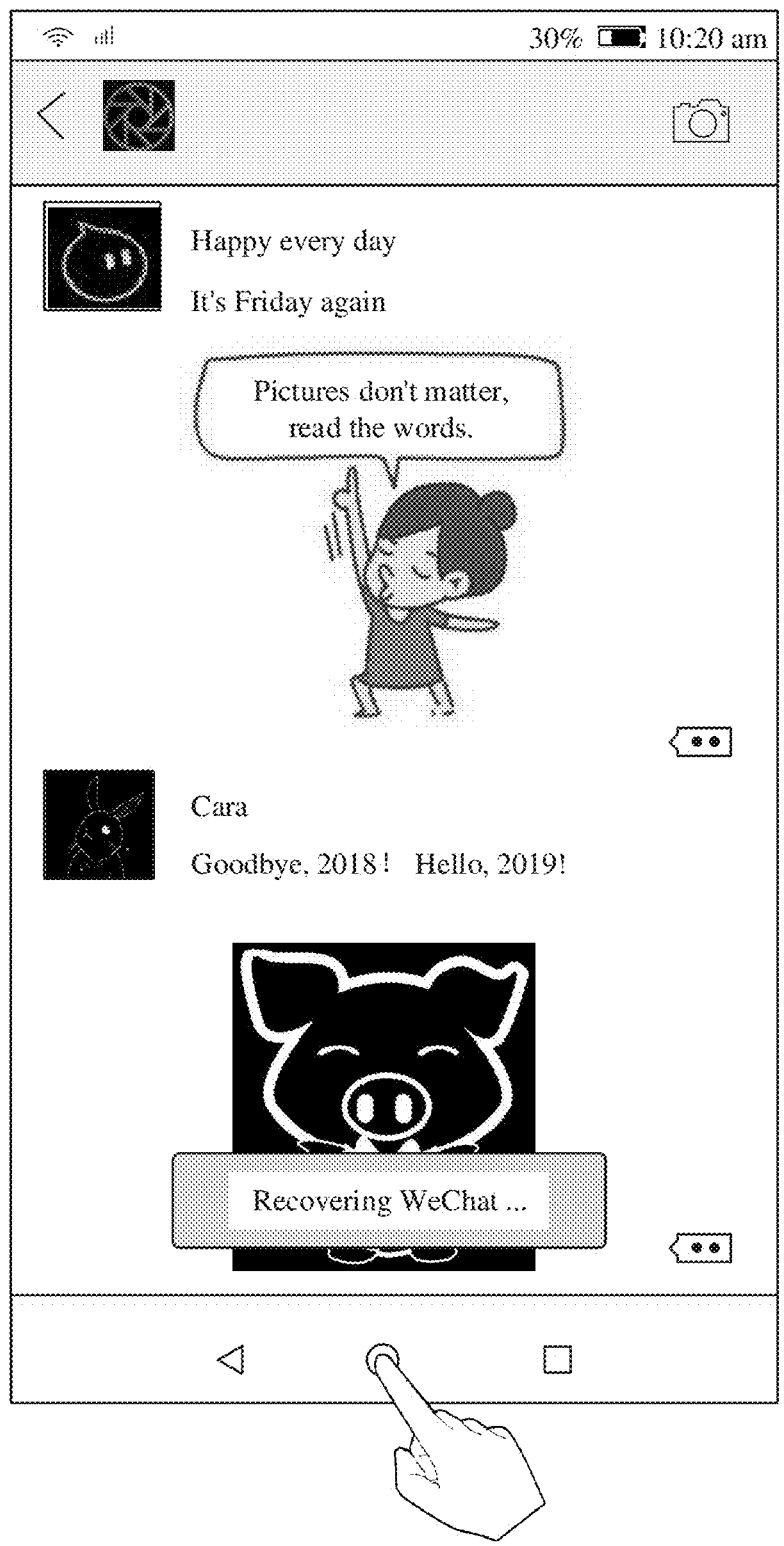
Figures 2, 18B:
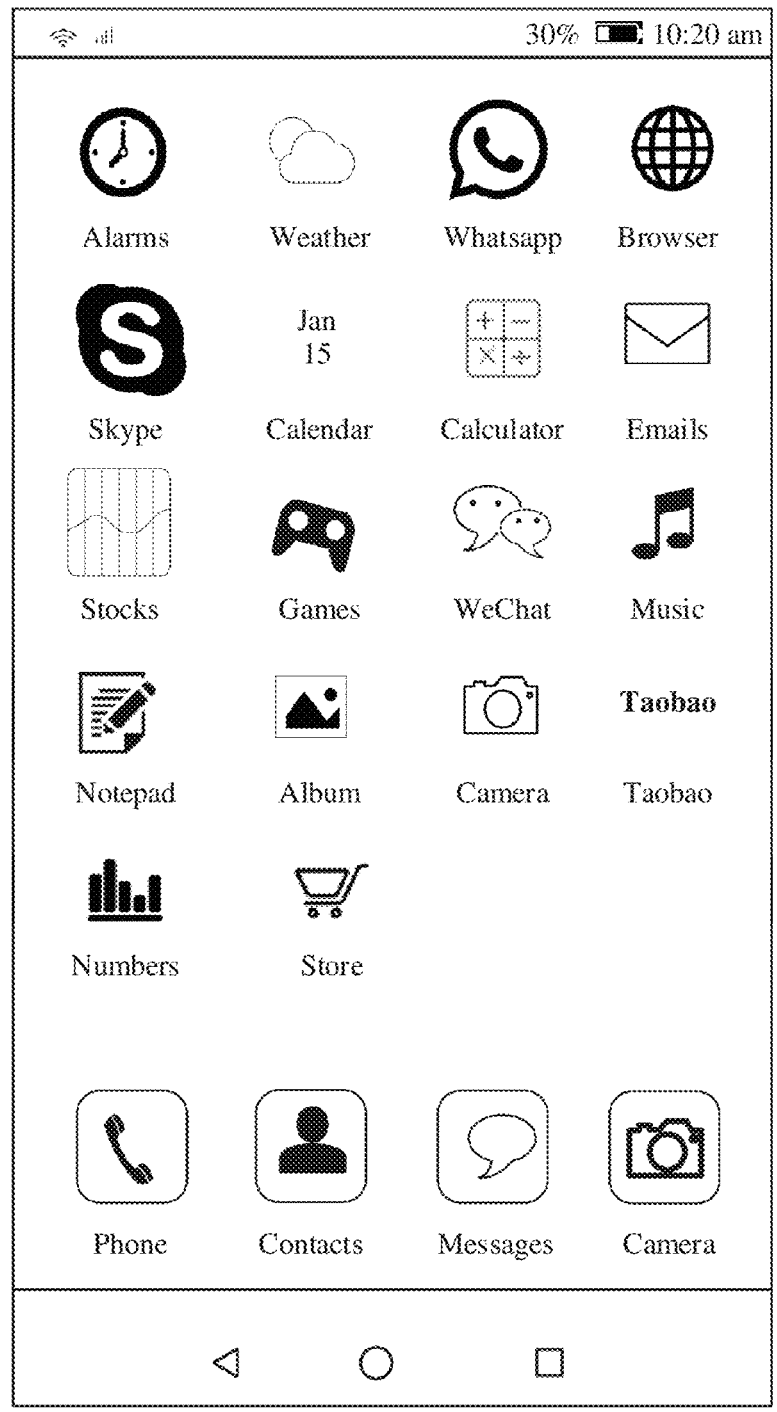

FIG. 18B-01 and FIG. 18B-02 show an application exception recovery method according to an embodiment of this application and an application scenario of an application exception recovery apparatus according to the embodiment of this application. FIG. 18B-oi shows that an application is being recovered. In this embodiment, only a snapshot of an exception page is displayed on an application window as a mask, and a navigation bar is not hidden and can be operated. A home button on the navigation bar is tapped to return to a home screen of the electronic device, as shown in FIG. 18B-02.

Figure 19A:
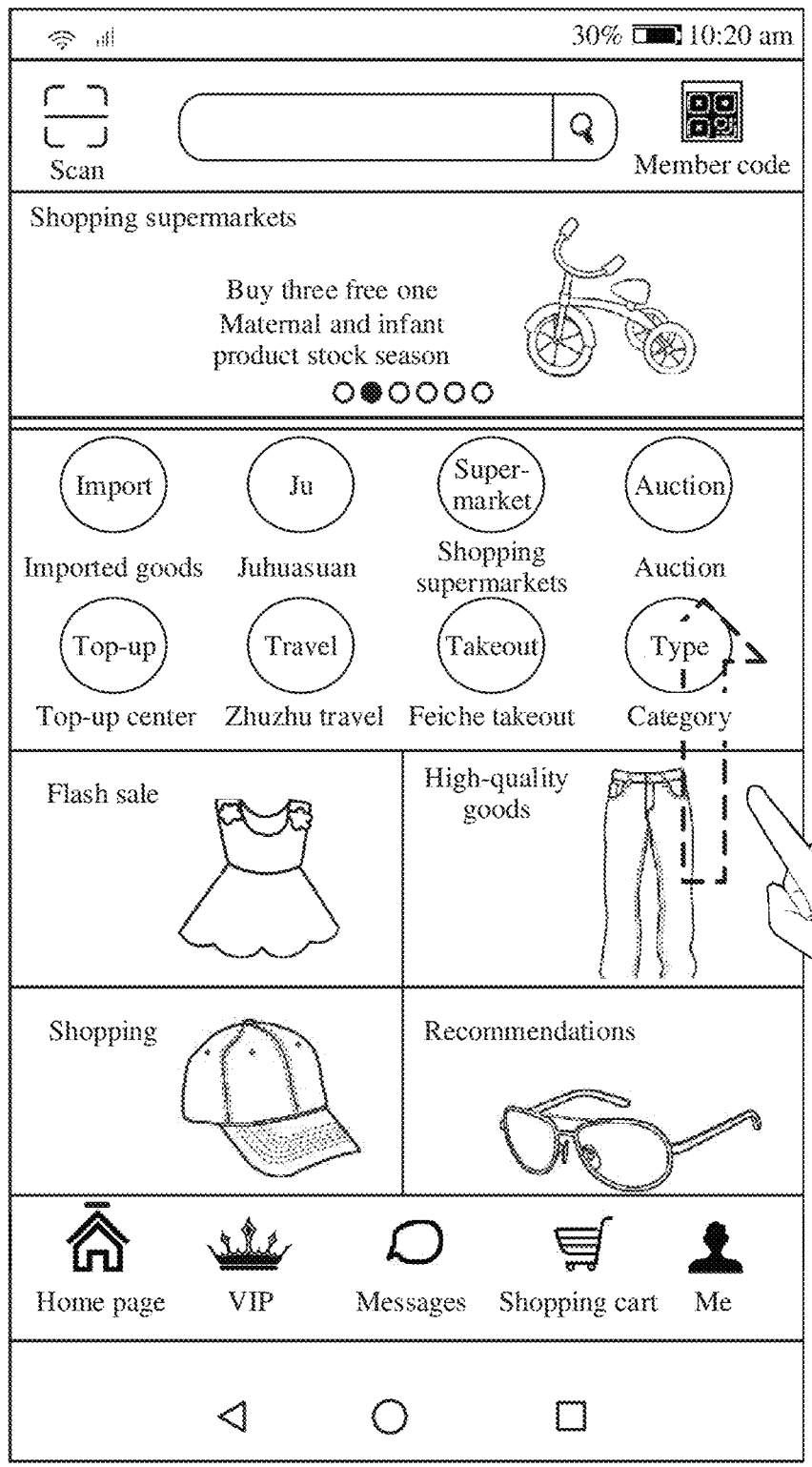
FIG. 19A to FIG. 19E show an application exception recovery method according to an embodiment of this application and an application scenario of an application exception recovery apparatus according to the embodiment of this application.
Figure 19B:
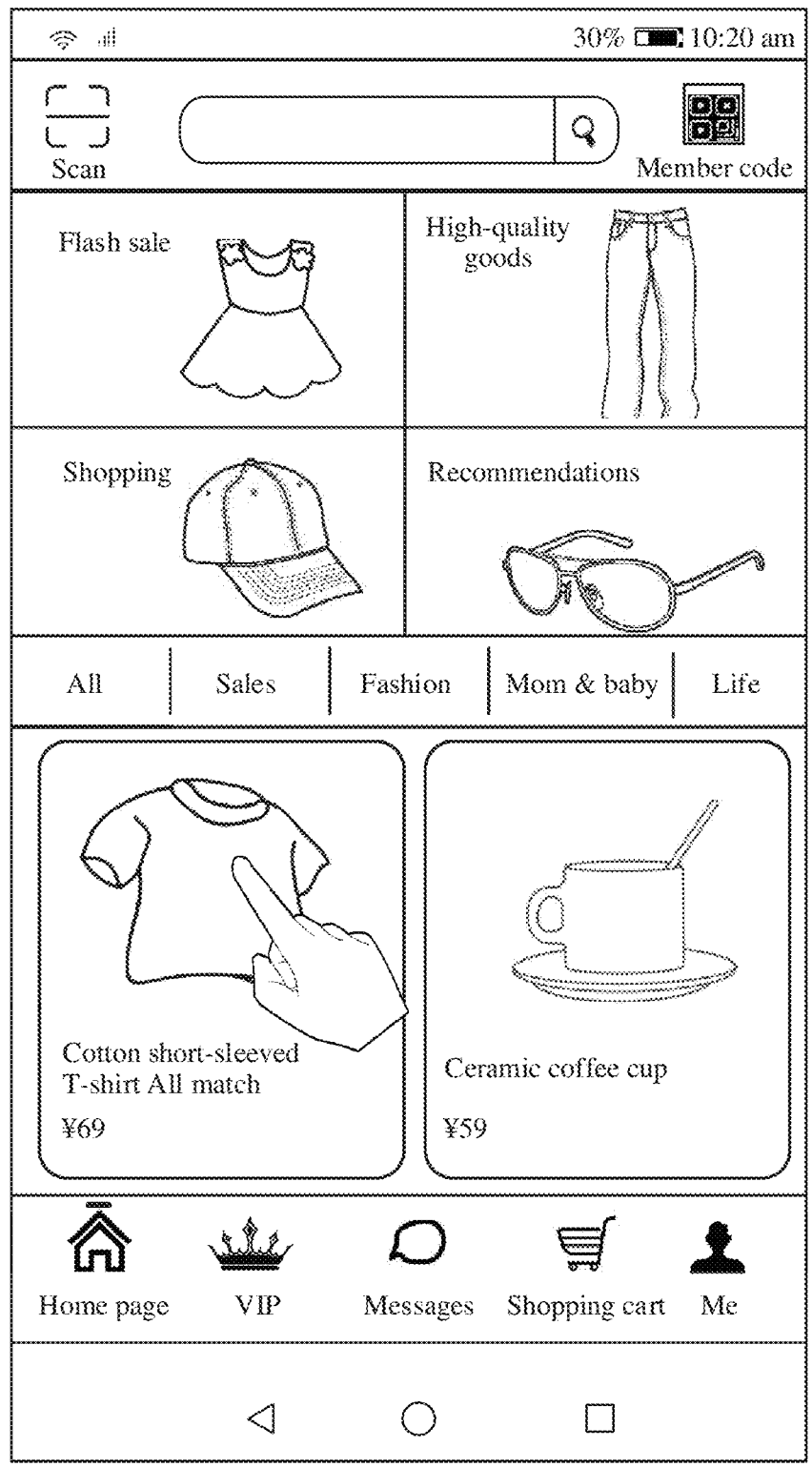
Figure 19C:
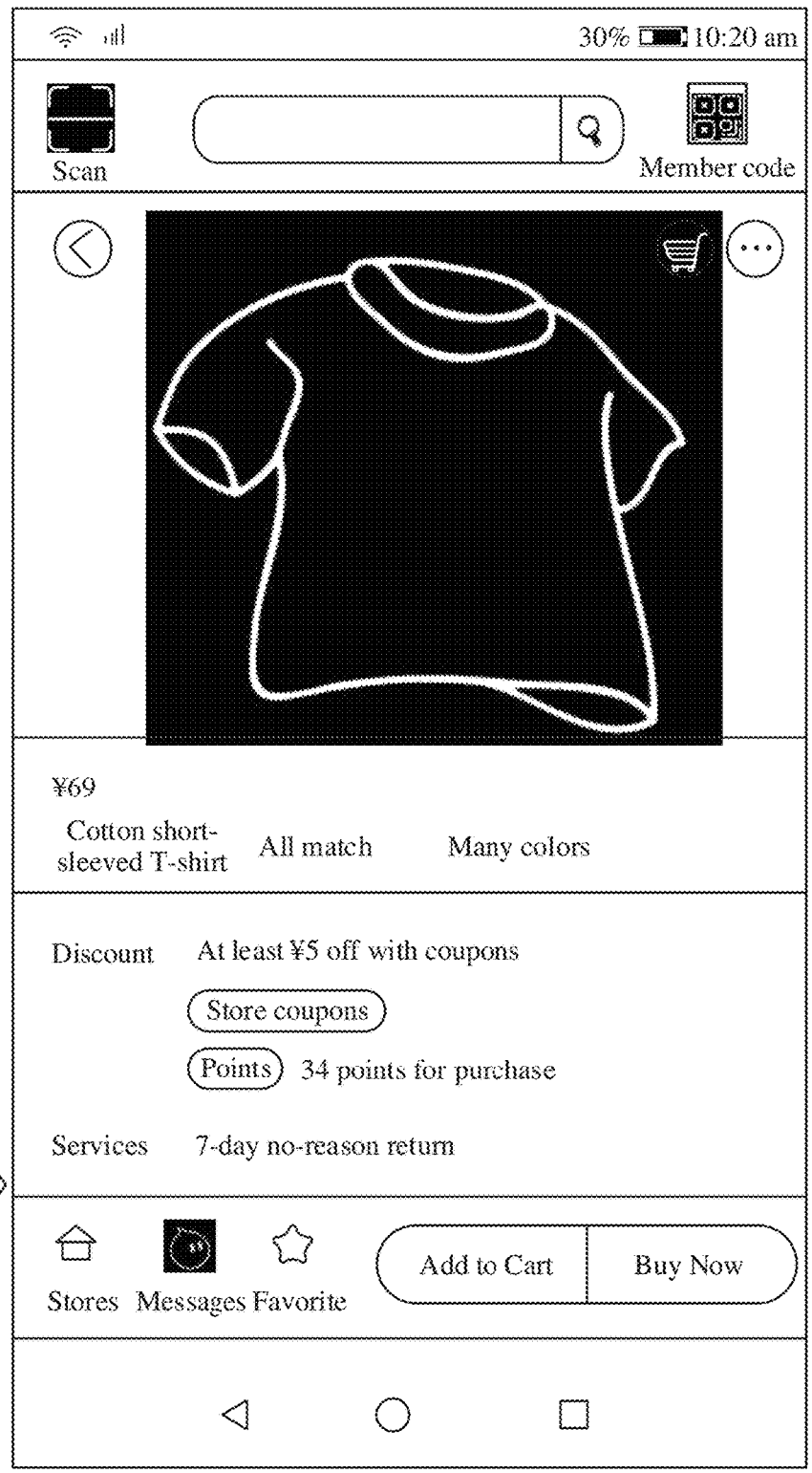
Figure 19D:
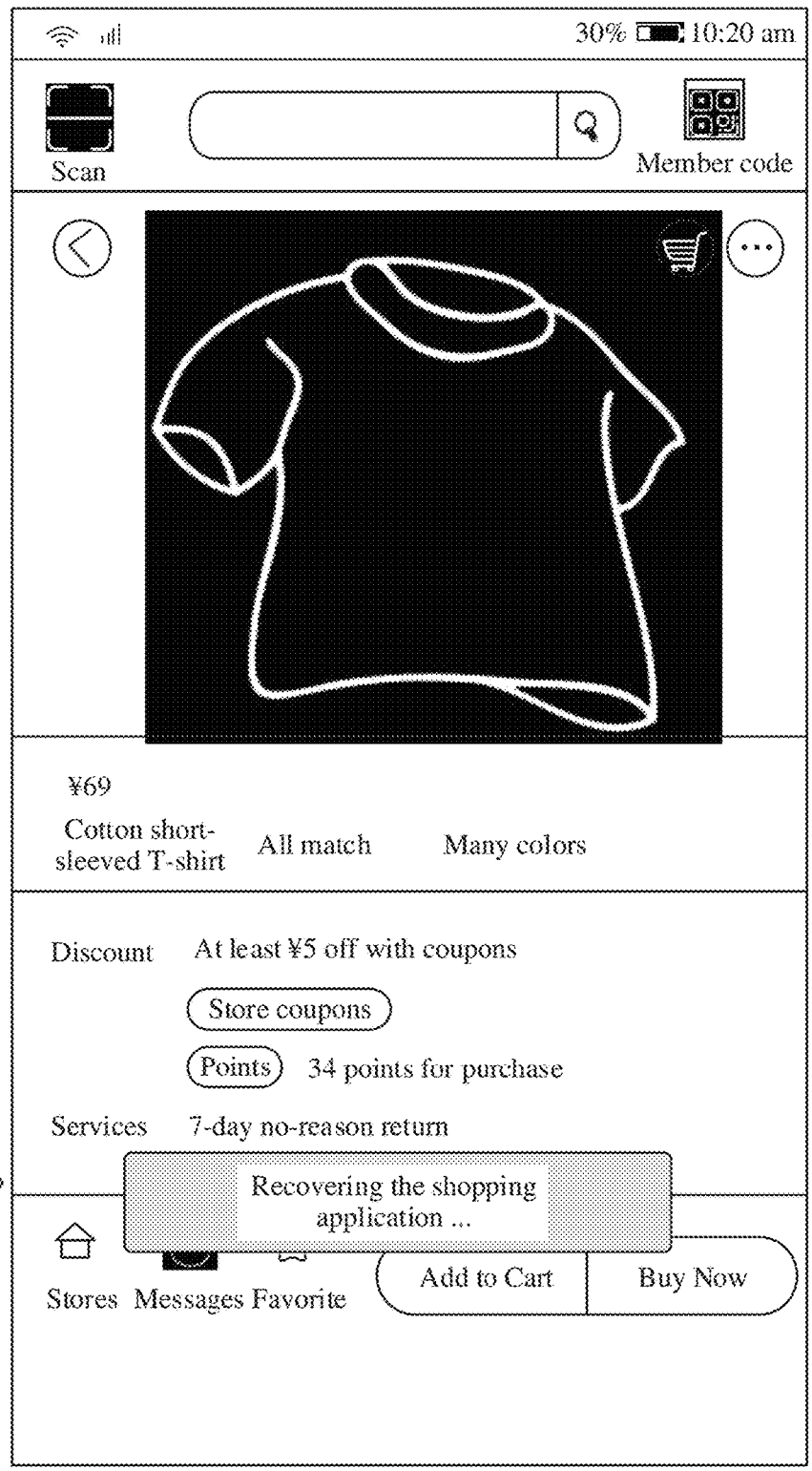
Figure 19E:
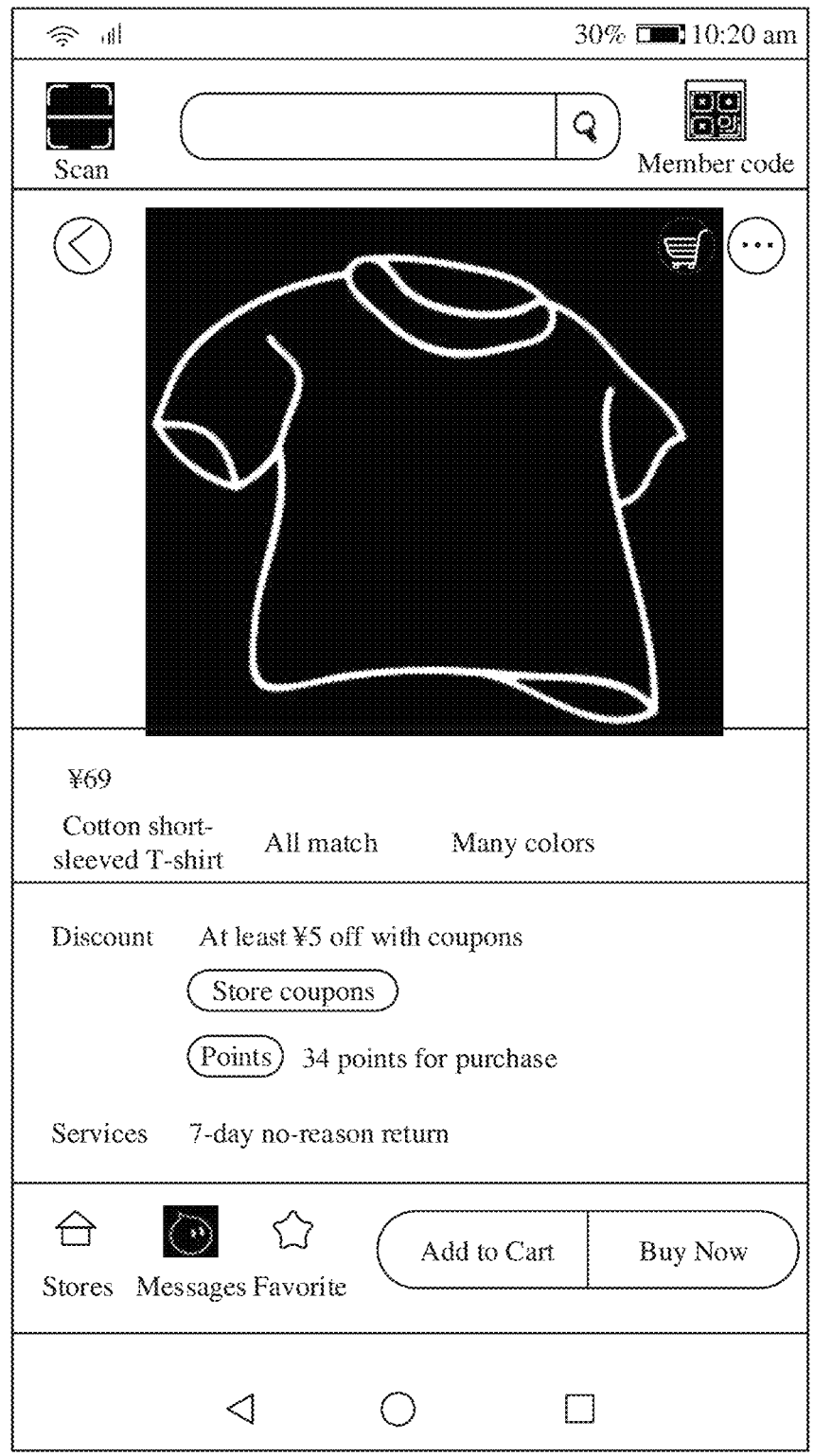

FIG. 19A to FIG. 19E show an application exception recovery method according to an embodiment of this application and an application scenario of an application exception recovery apparatus according to the embodiment of this application. FIG. 19A shows that a shopping application is running on an electronic device, and a top of a home page of the shopping application is displayed on the foreground. The home page is slid up to display a lower part of the home page, as shown in FIG. 19B. A commodity 1 is a short-sleeved T-shirt in this embodiment and is taped and selected, so that a detailed information page of the commodity 1 is displayed on the foreground, as shown in FIG. 19C. An exception occurs in an application on the detailed information page. Therefore, the application exception recovery method provided in this embodiment of this application and the application exception recovery apparatus provided in this embodiment of this application are provided to recover the application. A snapshot of an exception page, that is, a snapshot of the detailed information page of the short-sleeved T-shirt, is displayed on an application window as a mask. Optionally, a pop-up box is displayed to indicate that the application is being recovered, as shown in FIG. 19D. It may be noted that, in this embodiment, the mask is displayed in a manner of hiding a navigation bar. After the recovery is completed, the application window displays the re-created exception page, that is, the detailed information page of the short-sleeved T-shirt. It can be learned from this embodiment that the recovery method and the recovery apparatus provided in this embodiment can recover the application to the page displayed when the exception occurs, so that an operation performed by the user before the exception occurs is not lost, thereby bringing convenience to the user.

This application further provides a method for manufacturing an electronic device. The method includes: arranging the application exception recovery apparatus according to the fifth aspect of the present invention in the electronic device, where the arranging the application exception recovery apparatus according to the fifth aspect of the present invention in the electronic device includes: arranging an exception service module at an application framework layer of an operating system, arranging code of an exception handler at the application framework layer, and registering the exception handler with runtime of the operating system, so that the exception handler runs in a process of an application when the application runs on the electronic device; and installing the operating system on the electronic device.

In conclusion, according to the application exception recovery method, the electronic device, the storage medium, the computer program product, and the application exception recovery apparatus provided in the embodiments of this application, a solution of implementing automatic application recovery by retaining a user operation to a maximum extent is provided. In addition, because the information about the historical page is obtained from the system, there is no need to burden the application process to record the information about the historical page. The application exception recovery method and the application exception recovery apparatus provided in the embodiments of this application may be provided for each application in a form of a software development kit (Software Development Kit, SDK). If the application adapts to triggering of the solution, the system automatically provides the function for the application. This function takes effect only for an application having such a requirement. This prevents a function exception from occurring in an application that cannot be recovered. For example, a field is read from ApplicationInfo. If the system allows automatic recovery of an application that crashes, the application is helped to perform automatic recovery.

The application exception recovery method, the electronic device, the storage medium, the computer program product, and the application exception recovery apparatus provided in the embodiments of this application may also be used for application crash recovery of various operating systems, such as Android®, iOS®, and Windows®. The core procedure is the same:

1. Capture information about an application exception on the operating system.

2. The system stores last-frame display data of an application for mask display.

3. The system stores all page display data and page redirection data.

4. Overwrite the last-frame display data of the application.

5. The system restarts the application, and displays a page to which the application redirects when the exception occurs.

6. Cancel the last-frame display data after the application is recovered.

All or some of the foregoing embodiments may be implemented by using software, hardware, firmware, or any combination thereof. When the software is used to implement the embodiments, the embodiments may be implemented completely or partially in a form of a computer program product. The computer program product may include one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive solid state disk (SSD)), or the like.

A person of ordinary skill in the art may be aware that, the units and algorithm steps in the examples described with reference to the embodiments disclosed in this specification can be implemented by electronic hardware or a combination of computer software and electronic hardware. Whether the functions are performed by hardware or software depends on at least one particular application and design constraints of the technical solutions. A person skilled in the art may use different methods to implement the described functions for the at least one particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division, and may be another division during actual implementation. For example, a plurality of units or components may be combined or integrated into another system, or some features may be ignored or may be not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected according to actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing an electronic device (which may be a personal computer, a server, a network device, or the like) to perform all or some of the steps of the methods described in the embodiments of this application. The foregoing storage medium includes any medium that can store program code, for example a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An application exception recovery method, comprising:
storing page information of an exception page, in response to that an exception occurs in at least one application installed on an electronic device, wherein the exception page is a page displayed by the at least one application in response to the exception occurring;
displaying a mask comprising a page snapshot of the exception page, wherein the mask is a picture displayed on at least a window of the at least one application during restart of the at least one application;
restarting the at least one application, wherein restarting the at least one application comprises creating the exception page; and
removing the mask.

2. The recovery method according to claim 1, further comprising: determining, in response to the exception occurring, a case in which the exception page does not have a security label as a case in which the page information of the exception page can be stored, and storing the page information of the exception page.

3. The recovery method according to claim 1, wherein the page information comprises redirection information used to redirect to the page to which the page information belongs and further comprises user operation information on the page to which the page information belongs.

4. The recovery method according to claim 1, further comprising storing page information of a historical page in response to the exception occurring, wherein the historical page comprises all pages that are displayed between a moment at which the at least one application is started and a moment at which a previous page of the exception page is displayed.

5. The recovery method according to claim 4, further comprising combining, in response to that the page information of the historical page being stored, the page information of the exception page and the page information of the historical page, and restarting the at least one application.

6. The recovery method according to claim 5, wherein the combining the page information of the exception page and the page information of the historical page comprises:
  constructing the page information of the historical page and the page information of the exception page into an array in a form of a stack, wherein the page information of the historical page is pushed into the stack first, and wherein the page information of the exception page is pushed on the top of the stack.

7. The recovery method according to claim 6, wherein the restarting the at least one application comprises initiating page creation based on the array, wherein the exception page is first created.

8. The recovery method according to claim 1, wherein the exception comprises at least one of an application crash or an application not responding.

9. The recovery method according to claim 1, further comprising:
  checking, during display of the mask, whether the exception is a repeated crash; and
  ending a procedure of the recovery method in response to the exception being a repeated crash.

10. The recovery method according to claim 4, further comprising:
  checking, in response to the page information of the historical page being stored, whether the exception page and the historical page belong to a same application; and
  combining, in response to the exception page and the historical page belonging to a same application, the page information of the exception page and the page information of the historical page, and restarting the at least one application.

11. The recovery method according to claim 10, further comprising intercepting, in response to the historical page and the exception page belonging to a same application, a prompt pop-up box of an operating system of the electronic device for the exception.

12. The recovery method according to claim 1, further comprising performing an exception learning method comprising detecting an application exception signal about the exception provided by an operating system of the electronic device.

13. The recovery method according to claim 1, further comprising performing an exception learning method comprising registering a signal catcher with an operating system of the electronic device to detect the exception.

14. The recovery method according to claim 1, further comprising performing an exception learning method comprising:
  detecting a processing duration of a message queue in a process of the at least one application; and
  determining that the exception occurs in response to detecting that a user operation is not processed within a first duration.

15. The recovery method according to claim 1, further comprising:
  querying whether the at least one application specifies a picture as the mask, wherein the mask comprises the picture specified by the at least one application when the at least one application specifies a picture as the mask, and wherein the mask comprises the page snapshot of the exception page when the at least one application does not specify a picture as the mask.

16. An electronic device, comprising:
  a processor; and
  a non-transitory memory connected to the processor and storing a computer program for execution by the processor, to implement application exception recovery, the computer program including instructions for:
  storing page information of an exception page, in response to that an exception occurs in at least one application installed on an electronic device, wherein the exception page is a page displayed by the at least one application in response to the exception occurring;
  displaying a mask, wherein the mask is a picture displayed on at least a window of the at least one application during restart of the at least one application, and wherein the mask comprises a page snapshot of the exception page;
  restarting the at least one application, wherein restarting the at least one application comprises creating the exception page; and
  removing the mask.

17. An application exception recovery apparatus, comprising a non-transitory computer readable medium storing computer executable instructions for execution by a processor of an electronic device, the computer executable instructions including instructions for:
  providing an event handler that runs in a process of at least one application disposed on the electronic device, and wherein the at least one application is configured to learn that an exception occurs in response to an exception detection module detecting that the exception occurs in the at least one application, wherein the at least one application is further configured to store page information of an exception page in response to the learning of the exception, wherein the at least one application is further configured to provide the stored page information of the exception page to an exception service module, wherein the exception page is a page displayed by the at least one application in response to the exception occurring, and wherein the event handler is configured in an operating system of the electronic device;
  displaying a mask in response to receiving the page information of the exception page from the at least one application, wherein the mask is a picture displayed on at least a window of the at least one application during restart of the at least one application, and wherein the mask comprises a page snapshot of the exception page;
  restarting the at least one application, wherein restarting the at least one application comprises creating the exception page; and
  removing the mask.

18. The recovery apparatus according to claim 17, wherein the instructions for providing the event handler include instructions for providing a stack storage interface that stores page information of a historical page in response to the exception occurring, wherein the historical page comprises all pages that are displayed between a moment at which the at least one application is started and a moment at which a previous page of the exception page is displayed.

* * * * *